US010402910B1

(12) United States Patent
Kunz et al.

(10) Patent No.: US 10,402,910 B1
(45) Date of Patent: Sep. 3, 2019

(54) SYSTEMS AND METHODS FOR PROJECTING AND MANAGING CASH FLOW FOR FINANCIAL ACCOUNTS

(71) Applicant: The PNC Financial Services Group, Inc., Pittsburgh, PA (US)

(72) Inventors: Thomas Kunz, Pittsburgh, PA (US); Michael Golden, Pittsburgh, PA (US); Michael Kirch, Venetia, PA (US); Darcel Steber, Erie, PA (US); Janet Hoyt, McMurray, PA (US); Peter Bird, Pittsburgh, PA (US); Francisca Barros, Brookline, MA (US); Daniel DeRuntz, Somerville, AZ (US); Islam Elsedoudi, Cambridge, MA (US); Anna Engström, Brookline, MA (US); Michelle Kwasny, Cambridge, MA (US); Scott Mackie, Somerville, MA (US); Stacey McCullough, Arlington, MA (US); Pierre-Alexandre Poirier, Boston, MA (US); Todd Vanderlin, Cambridge, MA (US); Colin Raney, Lexington, MA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 14/098,736

(22) Filed: Dec. 6, 2013

Related U.S. Application Data

(60) Provisional application No. 61/734,196, filed on Dec. 6, 2012, provisional application No. 61/734,174, filed
(Continued)

(51) Int. Cl.
*G06Q 40/00* (2012.01)

(52) U.S. Cl.
CPC .................................. *G06Q 40/12* (2013.12)

(58) Field of Classification Search
None
See application file for complete search history.

(56) References Cited

U.S. PATENT DOCUMENTS 7,849,012 B2 * 12/2010 Pinsonnault ........... G06Q 10/10
705/1.1
8,719,132 B1 * 5/2014 Diggdon et al. ............... 705/35
(Continued)

*Primary Examiner* — Paul Danneman
(74) *Attorney, Agent, or Firm* — Buchanan Ingersoll & Rooney PC; Robert J. Pugh

(57) ABSTRACT

Systems and methods are disclosed for managing cash flow, including incoming and outgoing transactions, and mitigating unconfirmed cash shortfalls for an entity's accounts. In an embodiment, a system comprises a processor configured to render an interactive graphical user interface ("GUI") for the cash flow timeline on a display device. The cash flow timeline displays past and unconfirmed Cash In and Cash Out transactions and any cash shortfalls, which can be mitigated by selecting automatically displayed options. The GUI has a plurality of selectable, actionable user interface ("UI") elements. In an embodiment, the GUI comprises a UI element selectable to display bar graphs for selected time periods of the cash flow timeline. The GUI also comprises Cash In and Cash Out centers. In embodiments, methods employ the Cash In/Out centers to add, edit, schedule and delete Cash In and Cash Out transactions such as transfers, expenses, bills, receivables, and payables.

20 Claims, 32 Drawing Sheets

Related U.S. Application Data on Dec. 6, 2012, provisional application No. 61/734,132, filed on Dec. 6, 2012, provisional application No. 61/734,101, filed on Dec. 6, 2012, provisional application No. 61/734,154, filed on Dec. 6, 2012.

(56) References Cited

U.S. PATENT DOCUMENTS

| | | | | |
|---|---|---|---|---|
| 2001/0037294 | A1* | 11/2001 | Freishtat | G06Q 20/10 |
| | | | | 705/39 |
| 2002/0174006 | A1* | 11/2002 | Rugge | G06Q 10/10 |
| | | | | 705/36 R |
| 2006/0247987 | A1* | 11/2006 | Busch | G06Q 40/12 |
| | | | | 705/30 |

* cited by examiner

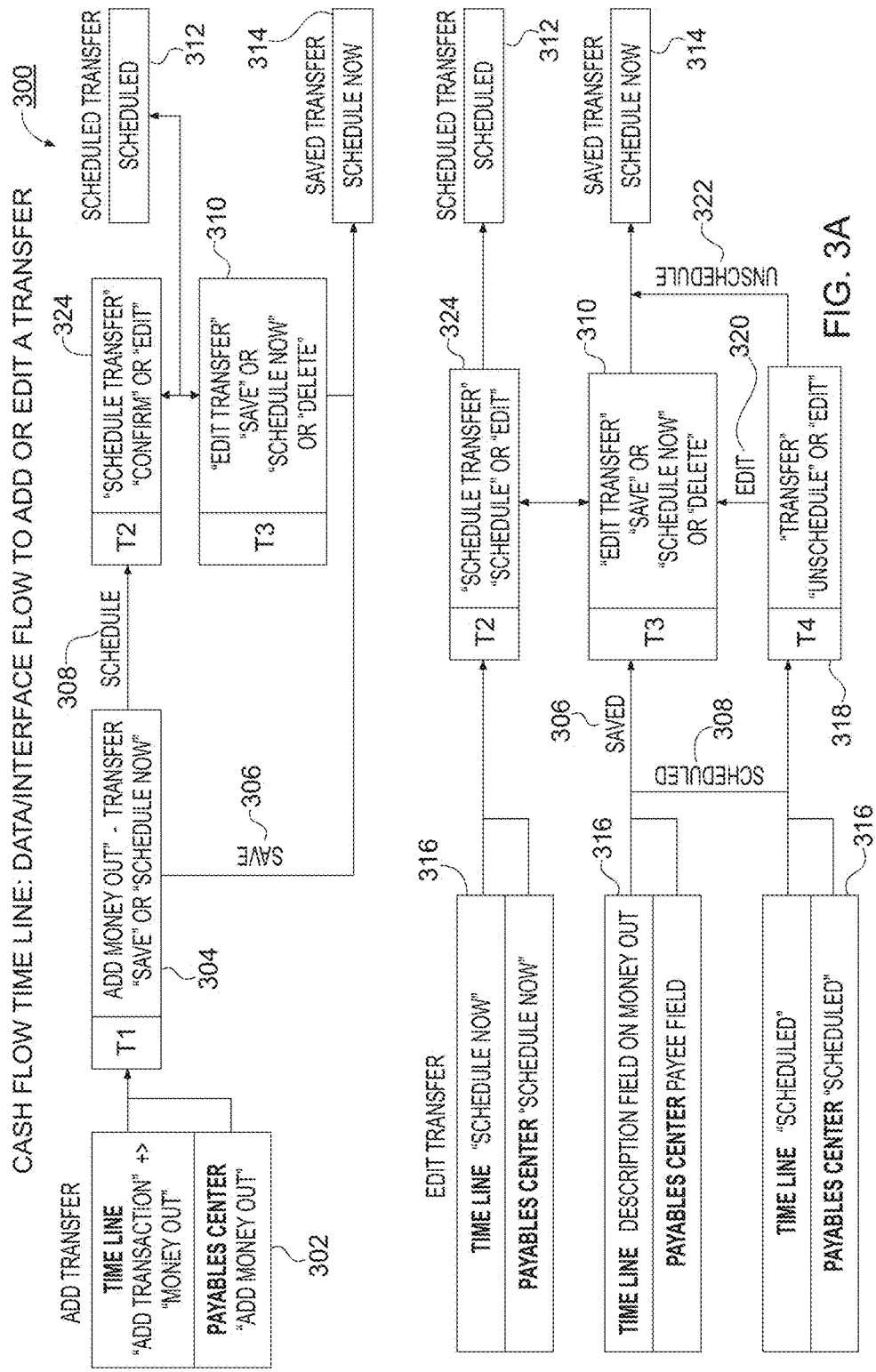

Transactions from Sep 15 2013 - Sep 21 2013

| Date | Description | Cash Out | | Cash In | |
|---|---|---|---|---|---|
| 09/15/2013 | ONLINE CREDIT CARD PMT | $1,794.09 | Paid | | |
| 09/15/2013 | ONLINE PAYMENT TO XXXXX1234 | $1,144.16 | Paid | | |
| 09/15/2013 | CHECK 1234 | $529.28 | Paid | | |
| 09/15/2013 | CHECK 1234 | $439.20 | Paid | | |
| 09/16/2013 Due 08/12/2013 | Interior Design Consulting Other | $5,705.18 | Complete | | |
| 09/16/2013 | Creek Farm Bill | $7,733.20 | Paid | | |
| 09/17/2013 Due 08/20/2013 | Paper and Supplies Corporation Online Bill | $20,010.01 | Scheduled | | |
| 09/17/2013 | Greene Catering Invoice | | | $496.23 | Outstanding |
| 09/17/2013 Due 09/13/2013 | Vincent Berner Check | $593.82 | Complete | | |
| 09/17/2013 | Weekly Cash Receivable | | | $2,000.00 | Complete |
| 09/18/2013 Due 08/12/2013 | Sonny's Sandwich Shop Receivable | | | $76.33 | Complete |
| 09/18/2013 | Daily Merchant Receivable | | | $20.00 | Complete |

Showing 1 to 12 of 12 entries

EDIT OR DELETE A TRANSACTION OR DUE DATE DIRECTLY ON A SPREADSHEET OR LIST

Edit Recurring Payment – just this one

Payee
Flour and Sugar Suppliers Inc ((XX928))    Edit Payee — 1466

Amount
$125.00

Due Date
12/03/2013

Transaction Date
12/03/2013

Note (for your own records)

Recurring Payment Details
Repeat Weekly indefinitely    Edit recurring payment — 1467
Only show your next payment Making these changes will remove this payable from its related Recurring Payments. You can edit all Recurring Payment via the link above.

Save | Delete 2412    2414

---

Edit Recurring Payment – all payments

Payee
Flour and Sugar Suppliers Inc ((XX928))    Edit Payee — 1466

Next Payment
04/01/2013 (due 04/01/2013) — 1409

Payment Details
Repeat Monthly until 04/14/2014 — 1409
Only show your next payment

Amount
Note that the next payment and all other associated payments will change amount.
2,000.00

Save | Delete recurring payment | Cancel 2412    2414

FIG. 24

SYSTEMS AND METHODS FOR PROJECTING AND MANAGING CASH FLOW FOR FINANCIAL ACCOUNTS

CROSS-REFERENCE TO RELATED APPLICATIONS

This patent application claims the benefit of, and priority to, U.S. Provisional Patent Application Nos. 61/734,154; 61/734,132; 61/734,101; 61/734,174; and 61/734,196, which are all incorporated herein by reference in their entireties.

The present application is related to concurrently-filed U.S. patent application Ser. No. 14/098,698, entitled "SYSTEMS AND METHODS FOR PROJECTING AND MANAGING CASH-IN FLOW FOR FINANCIAL ACCOUNTS"; concurrently-filed U.S. patent application Ser. No. 14/098,844, entitled "SYSTEMS AND METHODS FOR PROJECTING AND MANAGING CASH-OUT FLOW FOR FINANCIAL ACCOUNTS"; concurrently-filed U.S. patent application Ser. No. 14/098,814, entitled "SYSTEMS AND METHODS FOR FINANCIAL PLANNING BASED UPON CASH POSITIONS"; and concurrently-filed U.S. patent application Ser. No. 14/098,873, entitled "SYSTEMS AND METHODS FOR CREATING AND MANAGING FINANCIAL ACCOUNTS", which are all incorporated herein by reference in their entireties.

FIELD OF THE INVENTION

The present disclosure is generally directed towards systems, methods and user interfaces for network-type banking and, more particularly, toward systems, methods and user interfaces for managing cash flow for financial accounts associated with entities such as companies or organizations using in part a financial transaction processing system or network as a part thereof.

BACKGROUND OF THE INVENTION

Popularity of online banking for individual, personal checking, savings and credit card accounts has grown as banks and other financial institutions have expanded the banking services they provide to their clients from traditional banking operations. With online banking, financial transactions are no longer exclusively effectuated in person at a banking institution's physical locations or branches, and are instead conducted via financial networks, the Internet, or online banking networks offered by banking institutions so that individual account holders (i.e., bank customers) can effectuate transactions via these communications networks. Some online banking systems allow customers to use graphical user interfaces (GUIs) rendered on a variety of platforms, including smart phones, mobile computing devices, tablet computers, personal computers, laptops, and other computing devices, which has led to new avenues of managing personal banking accounts. A major benefit that customers enjoy with online banking, is convenience. This is because more often than not, individual customers using online banking systems and interfaces can easily complete multiple tasks to manage their financial accounts without leaving their homes or workplaces to visit a physical 'brick and mortar' branch of their banking institution. Efficiency and convenience are what set online banking apart from traditional banking.

With online banking, customers are able to pay their bills, move, deposit, or withdraw money to another account, reconcile multiple bank accounts, and enjoy related services designed to expedite their bank transactions, even when they are just at home. In a matter of seconds, bank transactions can be completed and the customer can even print his or her receipts for recording purposes. With online banking, various transactions are more efficient and it also saves the valuable time of customers which they can use to do other tasks. Online banking allows customers to enjoy unlimited access to his or her bank account, no matter what the time of day, including holidays and weekends. In addition, accounts can be accessed even if the customer is in another country, as long as there is an Internet connection.

Despite these advances, traditional online banking systems are directed towards individual, personal users and account holders, and not to institutional customers such as business owners and users responsible for managing financial accounts of entities such as organizations and businesses. This is even more apparent in the context of small entities such as small businesses and their managers. For example, in the cases of a small business or sole proprietorship, traditional online banking systems lack interfaces that enable the business owner, proprietor, or manager to view and dynamically adjust the business' projected or unconfirmed cash flow, cash reserve, and react to projected or unconfirmed shortfalls in real time based upon expected incoming and outgoing transactions (i.e., 'Cash In' and 'Cash Out') for a given future time period (e.g., days, weeks, or months in the future). This is because traditional online banking interfaces for individual user accounts are primarily focused on displaying actual, not unconfirmed, credits and debits and scheduling future recurring electronic transfers and payments, such as utility, mortgage, loan, and credit card payments.

Even if conventional online banking interfaces were adapted to the context of an entity such as small business, they would not enable the owner(s) of the small business to dynamically adjust the business' cash reserve and mitigate unconfirmed shortfalls because of their focus on previously posted debits and credits that have already occurred. For example, interfaces that are limited to displaying historical data such as past accounts receivable and accounts payable activity do not allow a business owner or user associated with an entity to visualize and react to a business' or organization's unconfirmed future monetary positions in a simple fashion. This is because conventional online banking interfaces are primarily focused on historical and current data needed to show past account activity and current account balances. Accordingly, what is needed are technical solutions that present an entity's unconfirmed monetary positions based on predicted cash in (i.e., money in) and cash out (i.e., money out) transactions that can be readily and easily understood by individuals and users without accounting backgrounds or financial management expertise. Accordingly, what is needed are methods and systems that provide GUIs which depict an entity's historical, current, and unconfirmed future monetary positions in a simple fashion that can be readily and easily understood without requiring that users have a financial. For example, there is a need for online banking systems that render GUIs that can be used by users with backgrounds business administration and similar fields to visualize an entity's historical, current, and unconfirmed monetary positions in a simple fashion that can be readily and easily understood.

Interfaces of currently available online banking systems and platforms lack a way for a business owner or institutional user associated with an organization to predict cash flow, potential deficits, cash reserves, and monetary positions based on past, current, and future incoming and outgoing monetary transactions (i.e., accounts receivable and accounts payable payments) in an easily understood fashion.

Accordingly, what is also needed are systems and methods that provide user interfaces that allow business owners and other users responsible for managing financial accounts associated with an entity to predict cash flow and monetary positions based on historical data and future incoming and outgoing monetary transactions (i.e., accounts receivable and accounts payable cash in and cash out transactions). What is further needed are GUIs that display and present hints as to how to remedy potential future deficits (i.e., by adjusting incoming or outgoing payment dates) and view and adjust cash reserves in an easily understood fashion.

SUMMARY OF THE INVENTION

Various other objects, aspects and advantages of the present disclosure can be obtained from a study of the specification, the drawings, and the appended claims.

In exemplary embodiments, a system and method allows customers, including business owners and institutional users responsible for managing one or more financial accounts on behalf of an entity to establish and adjust a desired 'cash reserve' or cash reserve based on the entity's needs and projected or unconfirmed cash flow. In one embodiment, the cash reserve is adjusted in a GUI rendered on a display of a computing device using a slidable element of a user interface (UI). Examples of methods and systems for financial planning based on actual cash positions of entities such as businesses are described in concurrently-filed and commonly assigned U.S. patent application Ser. No. 14/098,814, entitled "SYSTEMS AND METHODS FOR FINANCIAL PLANNING BASED UPON CASH POSITIONS", which is incorporated herein by reference in its entirety.

According to one embodiment, a system renders an interactive graphical user interface (GUI) for a tunable cash reserve that can be dynamically adjusted (i.e., tuned) based upon cash flow projections calculated and forecast by the system.

In other exemplary embodiments, systems and methods categorize incoming funds such as, but not limited to, receivables, and outgoing funds, such as, but not limited to payables, for financial accounts associated with an entity.

In yet another embodiment, a system renders a GUI that enables account holders and authorized users to change predicted dates of payments and receipts by sliding/dragging GUI elements on a cash flow timeline. In accordance with other exemplary embodiments, a user is notified of a forecasted shortfall or deficit (i.e., a 'cash shortfall'). In one embodiment, cash shortfall indicators are displayed as actionable user interface (UI) elements, such as, but not limited to, an icon displayed in a cash flow timeline GUI. According to certain exemplary embodiments, a user, using an input device, can select a cash shortfall UI element to display additional data associated with the cash shortfall, such as, but not limited to, a predicted amount of a shortfall, account(s) associated with the shortfall, suggested actions (e.g., actionable tips) for an entity having a plurality of financial accounts associated with it. For example, a user, using an input device, can select or click on a cash shortfall UI element such as an icon to learn more, and through a dialog box, modal window, or a speech/thought balloon anchored to the UI element, see that he can either delay an outgoing transfer such as a bill payment, which the entity may not want to do due to penalties and/or negative customer relations ramifications, or he contact phone to the parties who owe the entity money in order to determine the likelihood and expected date of incoming payment(s) and/or credit(s).

According to embodiments, a system renders an interactive GUI displaying an entity's cash flow timeline. In embodiments, the cash flow timeline GUI includes actionable user interface (UI) elements to navigate to a Cash In/Out centers, a cash flow trend display, a docking interface providing an overview of online banking (OLB) accounts associated with the entity, a linking interface allowing OLB accounts to be linked to each other, a high level overview display, an account activity display, a past/future view of a cash flow timeline, and a preferences interface wherein a user responsible for managing one or more financial accounts associated with the entity can set and change preferences for accounts, cash reserves, durations to display for a cash flow timeline, and other preferences. Example systems and methods for displaying and using the docking and linking interfaces to create, link, and access overviews of OLB accounts associated with an entity are described in concurrently-filed and commonly assigned U.S. patent application Ser. No. 14/098,873, entitled "SYSTEMS AND METHODS FOR CREATING AND MANAGING FINANCIAL ACCOUNTS"), which is incorporated herein by reference in its entirety.

Embodiments use algorithms/logic to predict/project incoming and outgoing cash flows for a given cash flow timeline to identify cash shortfalls, and establish rule sets. The rule sets can be used to select initial cash flow models and to automatically handle cash shortfalls. In one embodiment, the rule sets can be based upon a predefined profile for an entity corresponding to the given entity. For example, a single-location restaurant profile of a restaurant offering a given cuisine in a given geographic location and having a given size (e.g., square feet of the restaurant's kitchen(s), serving area(s) and/or number of seats), can be selected to establish initial rule sets for financial account(s) of a corresponding restaurant. In an alternative embodiment, the rule sets can be based on historical data for the entity. According to this embodiment, historical cash flow, incoming/outgoing transaction and expense amounts and schedules, and cash reserves over selected past durations are used to establish initial rule sets. For example, an entity may furnish, or the financial institution may have access to, historical account balance and accounts receivable and payable data for one or more financial accounts associated with the entity. For both of these embodiments, the initial rule sets can be subsequent revisited and altered as-needed to reflect current and predicted operations of the entity.

Exemplary embodiments are disclosed herein for using historical and unconfirmed payment data to display an editable cash flow timeline. In embodiments, an interactive GUI displays a cash flow timeline as a visualization of unconfirmed business or entity cash flow in a timeline format that reflects incoming and outgoing payments for tunable durations such as, but not limited to, one or more years, months, weeks, and days. The tunable durations can span past, present and future time periods and can be selected via the GUI.

According to an embodiment, a system renders a graphical indication of predicted or unconfirmed cash shortfalls and provides users such as business owners with the ability to interactively address unconfirmed cash flow shortfalls through online interactions.

In another embodiment, a system renders a GUI that provides a visualization of Cash In and Cash Out over time using bar charts. As used herein, the terms 'Cash In' (or money in) and 'Cash Out' (or money out) are not synonymous with accounts receivable/receivables and accounts payable/payables. However, in embodiments, Cash In transactions can include payments and credits to accounts receivable and Cash Out transactions can comprise payments and outgoing transfers from accounts payable. Accordingly, references to payables in the exemplary Cash Out center and to receivables Cash In center interfaces described herein do not imply that these interfaces are limited to for displaying, adding, and editing accounts payable and accounts receivable transactions.

In yet another embodiment, a system and method enables users to define a cash reserve as part of their entity's unconfirmed cash flow to assist with financial management of one or more accounts associated with the entity. According to certain exemplary embodiments, such accounts can include one or more sweep accounts with defined and tunable rules-based balance targets where the cash reserve equals the value of the sweep account(s).

BRIEF DESCRIPTION OF THE DRAWINGS

Further possible embodiments are shown in the drawings. The present invention is explained in the following in greater detail as an example, with reference to exemplary embodiments depicted in drawings. In the drawings:

FIG. 3A is a flowchart depicting steps by which transfers out of an entity's financial accounts can be added, edited and scheduled, in accordance with embodiments of the present disclosure;

FIG. 8 illustrates an exemplary spreadsheet portion of the GUI shown in FIG. 4;

FIGS. 10 and 11 depict exemplary interfaces for editing and deleting items in the spreadsheet and list portions of the GUIs shown in FIGS. 4, 8, 16, and 25;

FIG. 12 illustrates a GUI of an exemplary system for splitting transactions;

FIG. 24 illustrates exemplary embodiments of the GUI when an Edit Recurring Payment UI element is selected;

DETAILED DESCRIPTION OF THE INVENTION

Figure 1:
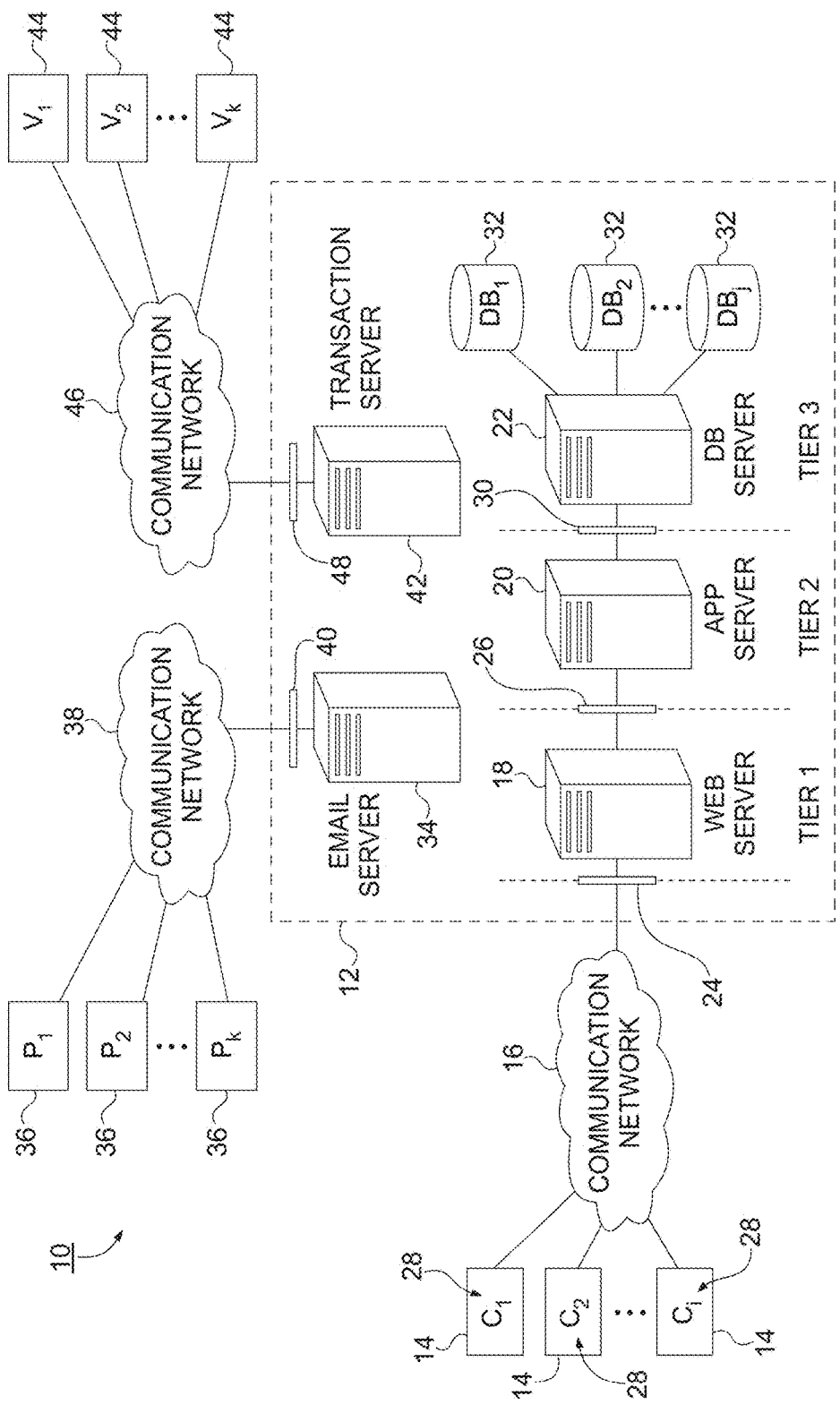
FIG. 1 illustrates exemplary network architecture for various exemplary embodiments of the present disclosure.

As used herein, the terms "entity", "organization", and "business" can be used interchangeably and can include any entity or group associated with one or more financial accounts. In certain exemplary embodiments, entity, business and organization may be interchangeable used herein to identify a company, a corporation, a sole proprietorship, an association, a non-profit organization, a charitable organization, a learning institution such as a university or school, a hospital, a chamber of commerce, a government agency or organization at the federal, state, or local level, a professional services firm, a partnership, a foundation, a political action committee ("PAC"), or another entity associated with or having one or more financial accounts.

Further, as used herein, the terms "financial accounts" and "accounts" can be used interchangeably and can include any financial account associated with an entity, its owner(s), its financial manager(s), or its creditor(s). Unless specifically stated differently or from context, in exemplary embodiments, financial accounts may be interchangeably used herein to identify payroll accounts, merchant accounts, credit card accounts, sweep accounts, lines of credit for the entity, personal lines of credit for the entity's owner(s), and personal savings, checking, overdraft, or home equity accounts of the entity's owner(s).

Further, as used herein, the terms "business owner", "user", "customer", "proprietor", "manager", and "bookkeeper" can be used interchangeably and can include any user that manages financial accounts on behalf of an entity. Unless specifically stated differently or from context, in exemplary embodiments, a user may be interchangeably used herein to identify a human user associated with an entity, such as a business owner, accountant, manager, or bookkeeper, or other person responsible for managing the entity's finances; a software application, or a group of users and/or software applications executed by one or more users to manage the entity's financial transactions. Besides a natural person who can manage financial accounts associated with an entity using an online banking user identification ("user ID"), a software application can be used to process and schedule incoming and outgoing transactions for the entity in accordance with a selected cash reserve and in response to unconfirmed cash shortfalls. Accordingly, unless specifically stated, the terms business owner, user, customer, proprietor, manager and bookkeeper as used herein do not necessarily pertain to a human being.

Further, as used herein, in certain embodiments, the term "vendors" can refer to natural persons or entities who are suppliers, payees, or creditors of a paying entity (i.e., the payor). In embodiments, vendors can be a person or entity a user may have, or desires to have, a financial relationship with. Such parties may include, but are not limited to, billing entities for Cash Out transactions, which include outgoing transactions and expenses for accounts payable of a paying entity. For example, vendors can include, but are not limited to, utility companies, suppliers, mortgage companies, property management firms, landlords/lessors, credit card issuers, lenders, creditors, government agencies (in cases like taxes, fees, or fines) insurers/insurance agents (in the case of insurance premiums), and other parties with an existing financial relationship with the user's entity whereby the entity makes outgoing payments to the vendor.

Also, as used herein, in certain embodiments, the term "party" can refer to a natural person or entity who is a payor for a Cash In transaction, which includes an accounts receivable transaction for a receiving, payee, entity. By way of example and not limitation, a party may be an existing or new customer of the payee, a merchant account (i.e., a credit card account the payee entity has established for receiving credit card payments), an investor, a business partner, a government agency (in cases of tax refunds, credits, or incentives) an insurance company/agent (in cases of payable claims, premium rebates, or premium refunds) or other parties having a financial relationship with the payee entity whereby the payee receives incoming payments or transfers from the parties to a financial account associated with the payee. For example, a party can be a financial advisor making a payment to a brokerage account associated with a payee entity for stock dividends and/or proceeds from the sale of securities.

Finally, as used herein, the term "host institution" include, for example, a financial institution (e.g., a bank or credit union an entity has an account with), a credit card issuer, a merchant account issuer (e.g., for a merchant's incoming credit card payments), a stand-in processor configured to act on-behalf of a card issuer or account issuer, or any other suitable institution configured to process financial transactions for an entity's financial accounts. In an embodiment, a "host system" is a financial system administered or owned by a host institution. The host system may include a plurality of sub-systems and tools, such as, but not limited to OLB systems, automated bill pay systems, electronic fund transfer systems, credit card issuer systems, merchant account systems, and a financial planning tool.

Example Network and System Implementations

Figure 2:
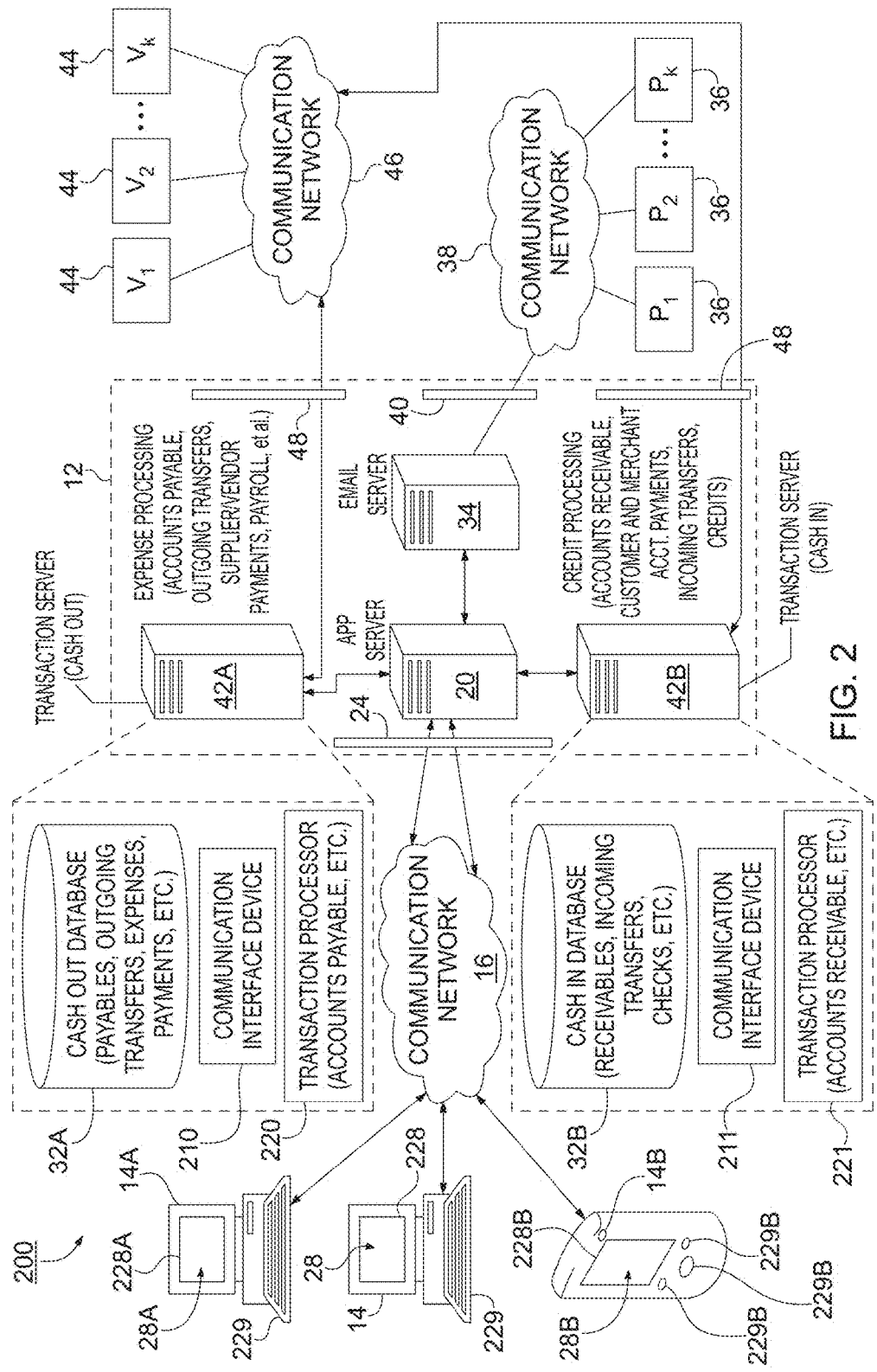
FIG. 2 depicts an exemplary system in which cash flow for financial accounts associated with an entity can be managed, in accordance with an exemplary embodiment of the present disclosure.

FIGS. 1 and 2 illustrate a network architecture and system, respectively for managing cash flow for financial accounts associated with companies or organizations. The exemplary network architecture and system depicted in FIGS. 1 and 2 comprise a financial transaction processing network and system, respectively.

FIG. 1 illustrates a system 10 according to embodiments of the present disclosure for FIG. 1 illustrates a system 10 according to embodiments of the present disclosure for providing network-based banking services to customers via a UI, including products for creating and managing financial accounts. Examples of systems and methods for projecting and managing cash flow for an entity's financial accounts are described in concurrently-filed and commonly assigned U.S. patent application Ser. No. 14/098,698, entitled "SYSTEMS AND METHODS FOR PROJECTING AND MANAGING CASH-IN FLOW FOR FINANCIAL ACCOUNTS"; and concurrently-filed and commonly assigned U.S. patent application Ser. No. 14/098,844, entitled "SYSTEMS AND METHODS FOR PROJECTING AND MANAGING CASH-OUT FLOW FOR FINANCIAL ACCOUNTS", which are all incorporated herein by reference in their entireties. Examples of methods and systems for financial planning based on actual cash positions of entities such as businesses are described in concurrently-filed and commonly assigned U.S. patent application Ser. No. 14/098,814, entitled "SYSTEMS AND METHODS FOR FINANCIAL PLANNING BASED UPON CASH POSITIONS", which is incorporated herein by reference in its entirety. Exemplary systems and methods for creating and managing an entity's financial accounts are described in concurrently-filed and commonly assigned U.S. patent application Ser. No. 14/098,873, entitled "SYSTEMS AND METHODS FOR CREATING AND MANAGING FINANCIAL ACCOUNTS", which is incorporated herein by reference in its entirety. As shown in FIG. 1, the system 10 includes a host system 12 in communication with one or more client devices $C_1, C_2, \ldots, C_i$ 14 (hereinafter referred to as "clients 14") via a communications network 16. The communications network 16 may be the Internet, although it will be appreciated that any public or private communication network, using wired or wireless channels, suitable for enabling the electronic exchange of information between the client 14 and the host system 12 may be utilized.

According to exemplary embodiments, the host system 12 may be implemented by a bank or other financial institution (hereinafter referred to as a 'host institution') and can be configured to provide network-based product and service features to users (e.g., customers of the host institution that access the host system 12) associated with the clients 14. The customers can be individuals, users responsible for managing accounts of an organization, or an organization associated with one or more financial accounts offered by the host institution.

In embodiments, the clients 14 may include any form of mobile or portable network-enabled computing device configured to transmit and receive information via the communications network 16 using wired or wireless connections. Clients 14 are capable of receiving user input via an input device. According to embodiments, the input device may be one or more of a touch-sensitive display such as a touch screen interface, a keyboard, a microphone, or a pointing device such as a mouse or stylus (see input devices 229 of FIG. 2). Clients 14 also include a display device (see display devices 228 of FIG. 2 and display 2030 of FIG. 20) capable of rendering an interactive GUI, such as the user interface ("UI") 28 discussed below. The input device allows a user to interact with the GUIs described below with reference to FIGS. 4-29 to instruct the network 100 and systems 200 and 2000 discussed herein with respect to FIGS. 1, 2 and 30, respectively, to display and edit financial account information, which is then rendered in the display device. For example, the interactive interfaces for the cash flow timeline, cash shortfall interface, and Cash In/in centers described below with reference to FIGS. 4-29 can be rendered in a UI 28 of a client 14 via the display device of the client 14. Alternatively, the GUIs of FIGS. 4-29 can be rendered on a display device of one or more servers, such as the email server 34, transaction server 42, web server 18, application server 20, and database server 22 shown in FIG. 1.

In exemplary embodiments, a client 14 can be, but is not limited to, a personal computer ("PC"), a Personal Digital Assistant ("PDA"), a tablet computing device, an iPhone™, an iPod™, an iPad™, a device operating the Android operating system ("OS") from Google Inc., a device running the Microsoft Windows® Mobile OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile computing device having a capability to communicate via the communications network 16. Certain embodiments of clients 14 are depicted in FIG. 2, which is described below.

In the exemplary embodiment depicted in FIG. 1, the host system 12 can be based on a multi-tiered network architecture, and can include one or more of a web server 18 (Tier 1), an application server 20 (Tier 2), and a database server 22 (Tier 3). According to this embodiment, the web server 18 corresponds to the first tier of the host system 12 and is configured to communicate with the communication network 16 via a border firewall 24, and with the application server 20 via an application firewall 26. The web server 18 can be configured to accept information requests, such as, for example, HTTP requests, from one or more of the clients 14 via the communication network 16 and provide responses thereto. The responses may include, for example, HTTP responses including static and/or dynamic HTML documents for providing an Internet banking user interface ("UI") 28 to users via the clients 14. Additionally, the web server 18 may further be configured to authenticate each user before allowing access to the UI 28 and other resources associated with the host system 12. Authentication may be performed, for example, by validating a received account identifier ("ID") or user name and a corresponding password. The ID/user name and password may be input in the UI 28 using an input device of the client 14.

With continued reference to the exemplary embodiment of FIG. 1, the application server 20 corresponds to the second tier of the host system 12 and can be configured to communicate with the web server 18 via the application firewall 26, and with the database server 22 via an internal firewall 30. The application server 22 may host one or more applications executing logic to provide banking product and financial service features to each user via their respective user interfaces ("UI") 28. The application server 30 receives account credentials (e.g., an account ID/user name and password), input and selections (e.g., a request to access particular banking features) from the UI 28 of each client 14 via the web server 18. Based on this and other information received from the clients 14, applications hosted by the application server 30 may be invoked to perform financial transactions (e.g., transfer funds between accounts, retrieve account balances, schedule payments for bills/payables, link accounts, create new accounts, etc.) and generate corresponding informational content (e.g., transfer confirmations, account balance information, bill payment confirmation, account creation confirmation, etc.). Information regarding such transactions may be communicated to the web server 18 and subsequently presented to the users using, for example, a dynamic web page or interactive GUI of the UI 28. Additionally, the application server 22 may also host an application for enabling users to conduct email communication with the host system 12 and other parties, as well as an application for enabling transactions and vendors.

In the embodiment shown in FIG. 1, the database server 22 corresponds to the third tier of the host system 12 and is configured to communicate with the application server 20 via the internal firewall 30. The database server 22 manages one or more databases $DB_1, DB_2, \ldots, DB_i$ 32 (hereinafter referred to as "databases 32") which store data to support one or more applications hosted by the application server 20 or elsewhere. Such databases may include, for example, account information databases, account configuration databases, new account opening databases, document identification/authentication databases, user information databases, user identification/authentication databases, user preferences/settings databases, as well as databases for storing other settings and/or configuration data. Database information requested by a particular application is retrieved from the databases 32 by the database server 22, communicated to the requesting application, and updated by the database server 22 as needed.

The host system 12 may further include an email server 34 which is configured to communicate with the application server 20. In some embodiments, the host name of the email server 60 is determined by a registered domain name of the host financial institution (e.g., xyzbank.com), but other nomenclature may be used. In embodiments, the email server 34 includes an email client application configured to enable exchange of electronic communications between the clients 14 and one or more parties $P_1, P_2, \ldots, P_k$ 36 (hereinafter referred to as "parties 36") external to the host system 12 via a communications network 38. The communication networks 16, 38 may be a common communication network (e.g., the Internet).

Although only a single email server 34, transaction server 42, web server 18, application server 20, and database server 22 are depicted in FIG. 1 it is to be understood that in certain embodiments, the functionalities of one or more of these servers can be implemented cluster of computing devices operating in a cluster or server farm. One such example is described below with reference to the exemplary embodiment shown in FIG. 2, wherein multiple transaction servers 42 are used in an exemplary system.

The parties 36 may be any person or entity with whom a user desires to communicate regarding particular aspects of his/her finances or financial matters generally. The user may have, or desire to have, a financial relationship with the parties 36. Such parties 36 may include, but are not limited to, paying parties 36 for accounts receivable. For example, parties 36 can include, but are not limited to, an existing or new customer, a merchant account (i.e., a credit card account the organization or business has established for receiving credit card payments), an investor, a business partner, a government agency (in the case of tax refunds or incentives) an insurance company/agent (in the case of payable claims) or other paying parties 36 having a financial relationship with the user's organization or business whereby the organization receives incoming payments or transfers from the parties 36 to a financial account associated with the organization or business. For example, a party 36 can be a financial advisor making a payment to a brokerage account associated with the organization for stock dividends and/or proceeds from the sale of securities.

As illustrated in FIG. 1, the host system 12 may include an email firewall 40 disposed between the email server 34 and the communication network 38 to protect network traffic and electronic communications between the parties 36 and the host system 12. To supplement network traffic protection provided by the email firewall 40, the email server 34 may implement one or more policies and anti-virus scanning software for intercepting email (e.g., "spam" email) unrelated to financial matters and possibly including malicious content. A user may be allowed to view intercepted email and authorize trusted senders, such as a party 36.

The host system 12 may further include a transaction server 42 which is configured to communicate with the application server 20. The transaction server 42 typically includes a client transaction application for enabling transaction between the clients 14 (customers) and one or more vendors $V_1, V_2, \ldots, V_k$ 44 (hereinafter referred to as "vendors 44") external to the host system 12 via a communications network 46. The communication networks 16, 38, 46 may be a common communication network (e.g., the Internet). The transaction 42 server includes functionality to allow customers to remit payment to any of the vendors 44 directly from one of their financial accounts. When a transaction is authorized (e.g., by signature, by PIN number, etc.), the vendor 44 may communicate a request for payment to the transaction server 42 via the communications network 46. When a request for payment is received from a vendor 44, the transaction server 42 and/or the application server 22 may initiate appropriate steps to remit payment to the vendor 44 from a financial account (e.g., checking account, savings account, money market account, etc.) of the customer. According to certain embodiments, the vendors 44 can include billing vendors 44 for an entity's accounts payable (i.e., payees). For example, the vendors 44 can be, but are not limited to, utility companies, suppliers, mortgage companies, property management firms, landlords/lessors, credit card issuers, lenders, creditors, government agencies (in the case of taxes, fees, or fines) insurers/insurance agents (in the case of insurance premiums), and other vendors 44 having an existing financial relationship with the user's entity whereby the entity makes outgoing payments to the vendors 44 from a financial account associated with the entity. In other examples, employees and contractors paid from one or more payroll accounts associated with the user's entity can be conceptualized as vendors 44.

As shown in FIG. 1, a transaction firewall 48 is disposed between the transaction server 42 and the communications network 46 for protecting network traffic and communications between the vendors 44 sent via the communication network 46 and the host system 12.

The clients 14, as discussed above and below with reference to FIG. 2, may be PCs and/or other network-enabled devices (e.g., cell phones, mobile phones, mobile tablets, PDAs, etc.) configured to transmit and receive information via the communication network 16 using a wired or wireless connection. The clients 14 may include a suitable browser software application (e.g., Internet Explorer, Internet Explorer Mobile, Chrome, Safari, Firefox, Blazer, etc.) for enabling the user to display and interact with information exchanged via the communication network 16. The clients 14 may thus access and navigate static and/or dynamic HTML documents of the UI 28.

To allow business and organization customers to open accounts remotely, the application server 20 can include applications to enable users to transmit, and the host system 12 to identify and authenticate, various materials required for opening financial accounts. This provides added convenience for customers in that they do not have to travel to a branch or other location to open an account. Similarly, the client 14 will include applications thereon, accessible via the UI 28, that communicate with the applications in the application server 20 to effectuate opening of an account remotely. According to one embodiment, in order to provide for the transmission of documents and other materials that may be required for opening an account, the client 14 can have a camera built into the device to facilitate taking pictures of the documents and transmitting them to the host system 12. Additionally, while paper signature cards are typically preferred, the client 14 can also include a touch screen signature feature that provides for the transmission of touch screen signatures that may be used for comparison paper-based signatures. Alternately, a touch screen signature device may be operatively connected to the client 14 to provide for the transmission of touch screen signatures.

FIG. 2 depicts an exemplary system 200 in which cash flow for one or more financial accounts associated with an organization can be managed. FIG. 2 is described with continued reference to the embodiment illustrated in FIG. 1. However, FIG. 2 is not limited to that example embodiment.

As shown in FIG. 2, the cash flow management system 200 can be configured to view, edit, and create cash flow timelines between and among a plurality of clients 14, including mobile client devices 14 and a plurality of transaction servers 42 through communications sent via communications networks 16, 38, and/or 46. The transaction servers 42A and 42B can be any type of server or computing device capable of serving data from databases 32A or 32B to one or more client devices 14, including the mobile clients 14A and 14B depicted in FIG. 2. For example, the transaction servers 42 can include, but are not limited to, a computer or a cluster of computers that may be a part of a server farm.

As depicted in FIG. 2, the display devices 228 of the clients 14 can differ depending on the type of computing device used as a particular client 14. For example, a display device 228A of a tablet device, netbook, or laptop such as client 14A is typically an integrated LCD screen, which is often smaller than a monitor or console such as the display device 228 for a workstation or desktop PC such as client 14. Similarly, the display device 228B of a mobile computing device such as client 14B may be a relatively small display such as mobile phone display.

The input devices 229 can also vary depending on the characteristics of a particular client 14 and its display device 228. For example, the input device 229 of a tablet, netbook, or laptop client 14A may include a relatively small physical or touchscreen keyboard, an integrated camera, track pad, and/or microphone, while the input device 229 of a desktop PC or workstation client such as client 14 will typically include a physical QWERTY or Dvorak keyboard and a mouse. Also, for example, an input device 229B of a mobile client 14B will typically lack a full physical keyboard and may instead comprise one or more of a touch-screen keyboard, a microphone, an integrated camera, a track pad, a scroll wheel, a track ball, a T9 keyboard, a button, and a touch screen display device 228B. In embodiments, any of the display devices 228 can be a touch screen display. It is to be understood that in the case of a touch screen interface, the input device 229 can be anything capable of interacting with the touch screen, including a user's fingers, which can be used to select, slide, drag, and resize (i.e., expand, maximize, shrink, and/or minimize) interactive UI elements through pointing, pinching, and scrolling gestures.

In accordance with embodiments, the UI 28 can be tailored to or customized for a particular client 14 based on the capabilities of the platform used by that client 14. The platform comprises physical capabilities of the client's 14 computing device such as, memory capacity in terms of random access memory (RAM) and read only memory ("ROM"), central processing unit ("CPU") capabilities in terms of clock speed and available processing capacity, available storage in terms of disk space or flash memory, communications capabilities in terms of current wired and/or wireless network connectivity and a communications interface (see, e.g., communications interface 2024 of FIG. 20) such as a network interface card ("NIC") of the computing device, capabilities of the display device 228, and capabilities of the input device 229. These physical capabilities and others can be determined based on a manufacturer, model number, serial number, a Media Access Control address ("MAC address") and/or another unique identifier of a computing device used as a client 14.

The platform of a client 14 also comprises software and firmware components, such as an operating system ("OS") running on the client 14, Internet browser(s), native software applications installed, and privileges/permissions associated with the client 14. The privileges/permissions may be controlled by the host system 12 based on a user and/or an entity associated with the client 14 and can include data access, communications, and application execution privileges.

According to embodiments, the UIs 28A and 28B for mobile clients 14A and 14B may be rendered as streamlined 'mobile friendly' versions of the 'full' UI 28 for ease of use on relatively small display devices 228A and 228B. In embodiments, mobile friendly UIs 28A, 28B may have reduced capabilities and/or display a lesser level of detail as compared to UI 28. A mobile friendly UI 28B can also be tailored to accept input from input devices 229B for a specific platform of a mobile client 14B. The mobile friendly UIs 28A and 28B can be automatically selected by the system 200 in response to detecting one or more platform characteristics of a particular mobile client 14A or 14B. Alternatively, a user of a mobile client 14A or 14B can be prompted within the full UI 28 to opt-in to using the mobile friendly UIs 28A and 28B in response to detecting that the client 14A or 14B is accessing the host system 12 via a mobile computing device. In cases where a user's mobile client 14A, 14B has a display device 228A, 228B and input device 229A, 229B capable of using the UI 28, the user may not wish to use the mobile friendly UI 28A or 28B.

According to embodiments, such as those depicted in FIGS. 4-29, the UI 28 allows cash flow management operations and transactions to be performed and displayed with a greater level of detail than the mobile friendly UIs 28A and 28B. For example, as described with reference to FIGS. 3A and 3B below, the granularity of editing and scheduling transfer and expense transactions may be finer (i.e., more detailed) in the UI 28 as compared to the mobile friendly UIs 28A and 28B.

The one or more of the communications networks 16, 38 and 46 can be any network or combination of networks that can carry data communications. Such networks can include, but are not limited to, wireless data networks such as a Wi-Fi, 3G, and a 4G/LTE network. In addition, the communications networks 16, 38 and 46 shown in FIG. 2 can include, but are not limited to a wired Ethernet network, a local area network ("LAN"), a medium area network, and/or a wide area network ("WAN") such as the Internet. In exemplary implementations of system 200 including wireless networks, one or more of the communications networks 16, 38 and 46 can support protocols and technology including, but not limited to, Internet or World Wide Web protocols and/or services. Intermediate network routers, gateways, or servers (not shown) may be provided between components of the architecture 10 and the system 200 depending upon a particular application or environment.

With continued reference to the exemplary embodiment of FIG. 2, multiple transaction servers 42 can be used as part of the system 200. For example, a first transaction server 42A can be used for processing Cash Out transactions and second, separate transaction server 42B can be employed to process Cash In transactions. In alternative embodiments, the functionality and components of transaction servers 42A and 42B can reside on a single transaction server 42, such as the transaction server 42 shown in FIG. 1.

As shown in FIG. 2, a transaction server 42A can process an entity's Cash Out transactions, such as, but not limited to, expenses, accounts payable, debits, outgoing transfers, including transfers to accounts not handled by host system 12, payments such as those made to entity's suppliers and vendors, and the entity's payroll. Data for such Cash Out transactions can be stored in and retrieved from a Cash Out database 32A. Although the Cash Out database 32A is depicted in FIG. 2 as being hosted locally on the transaction server 42A, it is to be understood that in alternative embodiments, the Cash Out database 32A can be hosted on a server remote from the transaction server 42A, such as a dedicated relational database management server ("RDBMS").

The transaction server 42A can communicate with other components of system 200 via communications networks 16, 38 and 46 using a communications interface device 210. For example, communications between the transaction server 42A and clients 14, the application server 20, the email server 34 and the transaction server 42B can be handled by the communications interface device 210. In the embodiment illustrated in FIG. 2, the transaction server 42A includes a transaction processor 220 comprising modules configured to process Cash Out transactions such as, but not limited to, accounts payable transactions. In embodiments, these modules can be comprised of computer-executable instructions or program logic that use information from and store data in the Cash Out database 32A. The modules can also obtain from and send information to other components of the system 200 using the communications interface device 210 to communicate via communications networks 16, 38 and 46. As shown in FIG. 2, because this data can include sensitive financial account information, communications may be received from clients 14 via a border firewall 24 between the communications network 16 and the host system 12, an email firewall 40 disposed between the email server 34 and the communication network 38, and/or a transaction firewall 48 disposed between the transaction servers 42 and the communications network 46.

With continued reference to FIG. 2, another transaction server 42B can process an entity's Cash In transactions, such as, but not limited to, credits, accounts receivable, merchant account payments from the entity's customers, and incoming transfers, including those from external accounts not handled by the host system 12. Data for these Cash In transactions can be stored in and retrieved from a Cash In database 32B. Although the Cash In database 32B is depicted in FIG. 2 as being hosted locally on the transaction server 42B, it is to be understood that in alternative embodiments, the Cash In database 32B can be hosted on a server remote from the transaction server 42B, such as a remote RDBMS.

The transaction server 42B can communicate with other components of the system 200 via communications networks 16, 38 and 46 using a communications interface device 211. For example, communications between the transaction server 42B and clients 14, the application server 20, the email server 34 and the transaction server 42A can be handled by the communications interface device 211. In the embodiment illustrated in FIG. 2, the transaction server 42B includes a transaction processor 221 comprising modules configured to process Cash Out transactions such as, but not limited to, incoming transfers and accounts receivable transactions. In embodiments, these modules can be comprised of computer-executable instructions or program logic that use information from and store data in the Cash In database 32B. The modules can also obtain from and send information to other components of the system 200 using the communications interface device 211 to communicate via communications networks 16, 38 and 46. As shown in FIG. 2, because this data can include sensitive financial account information, communications may be received from clients 14 via a border firewall 24 between the communications network 16 and the host system 12, an email firewall 40 disposed between the email server 34 and the communication network 38, and/or a transaction firewall 48 disposed between the transaction servers 42 and the communications network 46.

Cash Flow Timeline

Features of an exemplary cash flow timeline are described below.

Entities such as organizations and businesses can use the cash flow timeline disclosed herein to make informed cash flow decisions in response to many questions. Some of these questions can include 'what is (are) the entity's bank balance(s) in its account(s)?', 'what incoming and outgoing transactions have occurred since the last time balances for the entity's account(s) were checked?', 'how have those affected how much money the entity has today/now?', 'what is the current and unconfirmed cash reserve for the entity', 'is the entity well prepared to deal with the short-term future (i.e., will there be sufficient cash flow to cover unconfirmed short-term expenses, bills, and payroll)?', 'are there any unconfirmed cash shortfalls (also called "danger days") in the near future', 'what bills need to be paid out in the near future?', 'what money is coming to the entity in the near future via Cash In transactions?', and 'what can the entity pay now?', and 'what should the entity delay in order to avoid a unconfirmed cash shortfall/danger day?'

Before making financial decisions for the future, understanding the past is important, and particularly the recent past. Embodiments of the cash flow timeline disclosed herein enable entities to make such decisions by graphically depicting Cash In and Cash Out in the recent past using historical data.

In this way, each time an entity (such as the restaurant) checks in on their cash flow, they can understand what has happened since the last time they checked. For example, the cash flow timeline GUI described below with reference to FIGS. 4-15 enables entities to look at balances and transactions that just cleared, while also allowing the entities to put those singular transactions in context with the broader picture of their cash flow. After they understand what's just happened, the cash flow timeline provides a GUI that allows entities to readily understand their position for the near future (i.e., in terms of what can be paid now, what can be scheduled, what can be committed, and what could be delayed for payment at a future date/time).

In cases where there is insufficient (or no) historical data available because the entity is newly-formed and/or has no prior account history accessible by the host system 12, an embodiment can model the entity's 'past' transactions and cash flow based on a rule set and predefined profile for an entity with similar characteristics as the given entity. In accordance with embodiments, depictions of past Cash In and Cash Out transactions for a newly-established entity with no historical data can be simulated based upon a rule set established for the entity based upon one or more of expected/unconfirmed Cash In/Out transactions (recurring and otherwise, which may be estimated and entered by a user) and/or profile of a like entity. For example, a profile of a single-location restaurant profile of a restaurant offering a given cuisine in a given geographic location and having a given size (e.g., square feet of kitchen(s), serving area(s), payroll and personnel information, number of parking spaces, and/or number of seats), can be selected to establish initial rule sets for financial account(s) of a corresponding restaurant with no historical financial data so that its cash flow time line can display simulated 'past' cash flow.

To draw conclusions about cash flow, entities need to be able to readily visualize their cash flow timeline in terms of account balance(s), past, near-term, and future Cash Out transactions such as payables, and past, near-term, and future Cash In transactions such as receivables, in a single system with a unified interface. By using such systems and interfaces to render an interactive cash flow timeline interface, methods disclosed herein provide an optimal way to get an organization's total cash flow picture in one place. Once businesses have a clear picture of what they can do, the systems, methods, and GUIs disclosed herein provide a way to manage their financial accounts immediately without separating the act of paying a bill from the information needed to determine when it can be paid (i.e., without triggering a cash shortfall). Similarly, by using the cash flow timeline and its associated Cash Out center interface described herein, entities can reschedule a payment, while also being able to display the impact of such rescheduling. The systems for providing the cash flow timeline, and Cash In/Out center GUIs described herein enable business owners to access financial account information as needed without burdening them or their bookkeepers with relying on spreadsheets and models or their own institutional memories and experiences to assess and project their near-term and future cash flow.

The following terms are defined and used throughout. A scheduled transaction or cash flow event is one in which a cash or money movement is set to take place and is predetermined, such as, for example an automatic transaction that will occur on a given date. A committed transaction or cash flow event is one which may act as a placeholder and does not necessarily require that a cash or money movement happen automatically. Some action (e.g., writing a check) must take place for the money movement to occur. Therefore, a committed transaction encompasses a scheduled transaction, however, the opposite is not always true.

Additionally, the words confirmed and unconfirmed are used to describe transactions, cash flow events, and/or balances based on a degree of certainty at which the transactions, cash flow events, and/or balances will occur or will be present. An unconfirmed transaction or cash flow event is one which may act as a placeholder and does not necessarily require that a cash or money movement happen automatically. The degree of certainty of a confirmed transaction may be based on a user's subjective belief, the type of transaction (recurring electronic deposit), and the date or past historical data regarding cash in transactions. The confirmation of a transaction is provided by a user via a manual input value or it may be calculated by the system using historical data, a specified algorithm, or other programmed method.

Certain exemplary embodiments of methods, systems, and GUIs for creating, displaying and editing Cash In and cash out transactions and reflecting them in an entity's cash flow timeline are described below with reference to FIGS. 3A, 3B and 4-29.

Methods for Adding and Editing Transfers and Expenses in a Cash Flow Timeline

Figure 3B:
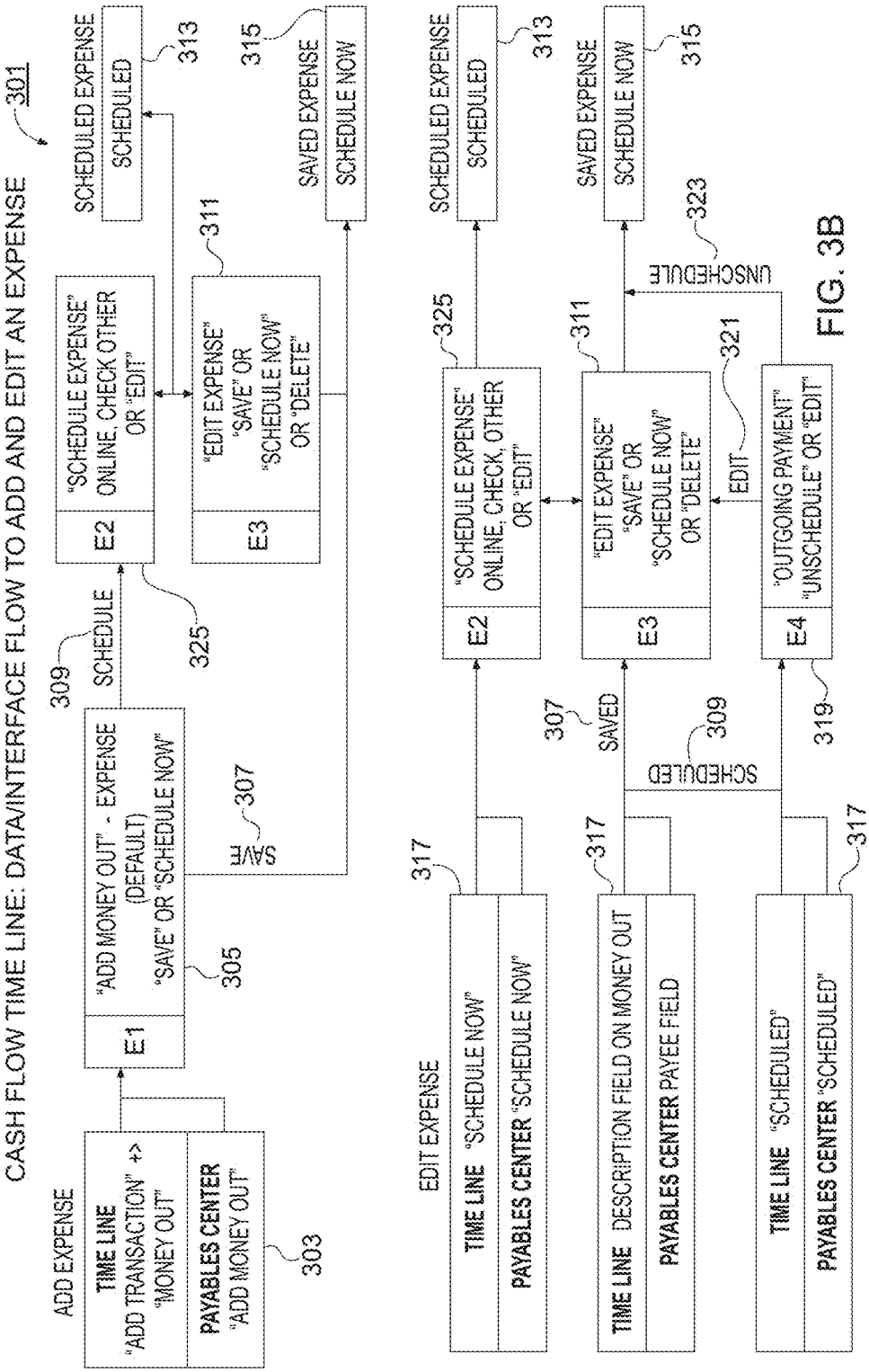
FIG. 3B is a flowchart depicting steps by which an entity's expense transactions can be added, edited and scheduled, in accordance with embodiments of the present disclosure.

FIGS. 3A and 3B are flowcharts depicting steps by which an entity's transfers and expenses can be added, edited, and scheduled. In particular, FIGS. 3A and 3B depict the step-by-step data and user interface flows for steps by which entities perform processes for setting up, scheduling, and editing transactions and expenses. FIGS. 3A and 3B are described with continued reference to the embodiments illustrated in FIGS. 1 and 2. However, FIGS. 3A and 3B are not limited to those embodiments. The steps of the transfer and expense management methods 300 and 301 shown in FIGS. 3A and 3B, respectively, do not necessarily have to occur in the order described. Further, as described below, some of the steps are optional.

FIGS. 3A and 3B depict the steps to add or edit fund transfers and expenses as part of a cash flow timeline. In embodiments, this cash flow timeline comprises part of the UI 28 rendered on a display device of a client 14 or a display of a server of the host system 12. In particular, FIG. 3A is a flow chart depicting steps of a method 300 for adding and editing fund transfers into and out of an organization's financial accounts. According to embodiments, once created and scheduled, these transfers can be depicted as part of the organization's cash flow timeline, such as, but not limited to the cash flow timeline GUI described below with reference to FIGS. 4-15. In other embodiments, outgoing transfers can be displayed in a Cash Out center as illustrated in FIGS. 16-24. In yet other embodiments, incoming transfers can be displayed in a Cash In center as illustrated in FIGS. 25-29.

Example Data and Interface Flow for Adding New Transfers

By completing steps 302-324, new transfers can be added and scheduled to run either now (i.e., immediately) or at future date and/or time.

The transfer creation and editing method 300 begins in step 302 where adding a transfer is initiated. As shown in FIG. 3A, step 302 can comprise adding a money/Cash Out transaction using a Cash Out center so that the outgoing transfer will be displayed as part of an entity's cash flow timeline. Embodiments of interfaces for an exemplary Cash Out center are provided in FIGS. 16-24. In the exemplary embodiment of FIG. 3A, the Cash Out center is labeled as a Payables Center. However, as discussed herein and shown in FIGS. 16-24, outgoing transfers and other Cash Out transactions are not limited to payables from an entity's accounts payable. Alternatively, the step 302 invokes a Cash Out center interface indirectly as a result of input received via a displayed cash flow timeline GUI. Exemplary embodiments of a GUI for an interactive cash flow timeline as part of UI 28 are depicted in FIGS. 4-15, which are described below. According to the exemplary embodiment of FIG. 3A, step 302 can be initiated from a cash flow timeline GUI by selecting actionable UI elements such as selecting an icon, button, or drop-down menu to 'Add a Transaction' for a 'Money Out' transaction. An exemplary implementation of a Cash Out center as part of UI 28 are described below with reference to FIGS. 16-24. After the transfer creation is initiated, control is passed to step 304.

In step 304, a determination is made as to whether the money out transfer being added is to be saved and scheduled to be run now or scheduled to occur at a later time. This step can comprise receiving, via an input device, a selection from a user to either save a transfer to be executed now or to schedule the transfer to occur at a later time/date. If it is determined that the transfer is to be saved, control is passed to step 306, where the transfer is saved as a transfer scheduled to run now. If it is determined that the transfer is to be scheduled to occur at a later date and/or time, control is passed to step 308.

In step 306, the transfer information is saved. In one embodiment, the Cash Out information for the transfer transaction is saved in the Cash Out database 32A of the Cash Out transaction server 42A.

In step 308, a specific time and/or date for the transfer is received. The scheduled time/date can be a specific, user-specified date and time (e.g., 9 A.M. the following day), or a selected number of days/weeks/months in the future (i.e., 10 business/working days or 2 weeks from the current date). After selection of the scheduling is received, control is passed to step 310.

In step 324, the user is prompted to confirm or edit the scheduled time/date for the new transfer. In the example shown in FIG. 3A, this step can comprise prompting the user to save the transfer as is, schedule the transfer to occur now, or delete the newly-added transfer. In an embodiment, the prompting is displayed as one or more dialog boxes with selectable buttons for 'Confirm', 'Edit', 'Save/Schedule now', and/or 'Delete' in a GUI, such as the exemplary GUIs depicted in FIGS. 10, 11, 13, 19, 20, and 27.

In certain exemplary embodiments, the scheduling of future transfers in steps 308 and 324 can be fine-grained, such as receiving a selection, via UI 28 of a client 14, for a specific hour or minute of a day, including a future time of the current day. This fine-grained scheduling can be time-based (i.e., one hour from the current time or 5 P.M. of the current day) or based upon one or more dependencies. Accordingly, as used herein, the term 'future date and time' can refer to a time in a current or future date.

In other embodiments, scheduling of future transfers in steps 308 and 324 can be more coarsely-grained such that transfers scheduled to run 'now' are run during the current day (or the next business day if the method 300 is performed after hours or on a non-business day) and future scheduling is limited to a time range of a selected date in the future. In one embodiment, method 300 uses coarsely-grained scheduling in order simplify or streamline the UI 28 to be 'mobile friendly' in response to determining that a user is using a mobile client 14A or 14B with a relatively small display device 228. According to embodiments using coarsely grained scheduling in steps 308 and 324, future transfers can be scheduled to run on specific date, a relative date (i.e., one week in the future or on the last Wednesday of a month), and/or during a time range of a day (i.e., during the morning or afternoon), or on a date based upon one or more dependencies.

In embodiments, dependencies used for scheduling transfers in steps 308 and 324 can be date or time-based (i.e., the first business day after the end of a month) or based upon other transactions. For example, transfers can be scheduled based upon dependencies to occur a user-selectable time in hours or days after another transfer transaction has completed (e.g., posted to an account) or after the entity's account balance(s) exceed a cash reserve by a certain percentage or amount. According to embodiments, the percentage or amount can be predefined and tunable by a user. In accordance with embodiments, recurring transactions can be used as dependencies. For example, a transfer can be scheduled to run some time before or after the date of a recurring transfer or transaction (i.e., one day before or after a payroll, rent, utility, loan, insurance, or mortgage payment date). In the case of recurring transfers that may occur weekly, bi-weekly, or monthly such as payroll payments, a dependency for a scheduled transfer can be based on one or more of the recurring payments (i.e., a selected number of days before or after the last payroll payment of a month).

If it is determined in step 324 that a selection to edit the scheduled time to occur at a future time/date has been received, control is passed to step 312 where the newly-added transfer is scheduled to occur at the desired future date and time. Otherwise, control is passed to step 310, where the newly-added transfer can be further edited.

In step 310, an interface is provided to edit transfer details. This step can comprise receiving selections to save the transfer, schedule it to run now, or to delete the transfer. If it is determined that a selection to save the transfer has been received, control is passed back to step 306 where the transaction is saved with any edits from step 310. If it is determined that a selection to delete the transfer has been received, the transfer is deleted and the method 300 ends. If a selection to schedule the transfer to run at a later date is received in step 310, control is passed back to step 324 for scheduling the transfer. Otherwise, if it is determined in step 310 that a selection to schedule the transfer to run now has been made, control is passed to step 314.

In step 314, the newly created transfer saved in step 306 and scheduled to be run now is queued for processing. In one embodiment, step 314 is performed by the accounts payable transaction processor 220 executing on the Cash Out transaction server 42A. According to an embodiment, transfers scheduled to be run now in step 314 are queued to run in the same business day as part of a sequence of a plurality of other transfers scheduled to run that day and are processed in the order they are received (i.e., first in, first out, or FIFO). In another embodiment, transfers scheduled to be run now are prioritized to be run immediately in step 314 (i.e., in near real time), possibly before previously-queued transfers.

Example Data and Interface Flow for Editing Existing Transfers

By completing steps 316-324, existing, outgoing transfers can be edited and re-scheduled to run either now or at future date and time.

In step 316, editing a transfer is initiated. According to certain exemplary embodiments depicted in FIG. 3A, step 316 can comprise editing a money/Cash Out transaction using the Cash Out center user interface to edit a description field, a payee field, or to schedule a transfer in the cash flow timeline for the entity. In the exemplary embodiment of FIG. 3A, the Cash Out center used in this step is labeled as a Payables Center. However, as noted above with regard to step 302, outgoing transfers and other Cash Out transactions are not limited to payables from an entity's accounts payable. According to the exemplary embodiment of FIG. 3A, step 316 can be initiated from a cash flow timeline GUI by selecting actionable UI elements such as selecting an icon, button, or drop-down menu to edit a description or payee field, view a scheduled transfer, or selecting a 'Schedule now' UI element for an existing 'Money Out' transaction. After the transfer editing is initiated for a transfer to schedule the transfer to run now, control is passed to step 310, which is described above with reference to editing a newly-added transfer. If editing of a description and/or payee fields is initiated in step 316 for a saved transfer that is scheduled to be run at a future date and/or time, control is passed to step 306 where the description and/or payee information is saved, which is described above with reference to saving a newly-added transfer. If it is determined in step 316 that editing has been initiated for transfer scheduled to run at a later date, control is passed to step 318.

In step 318, a determination is made as to whether the money out transfer being is to be further edited or un-scheduled prior to additional editing. This step can comprise receiving, via an input device and a user interface ("UI"), a selection from a user to either un-schedule a transfer or to continue editing it. If it is determined that the transfer is to be un-scheduled, control is passed to step 322 where the transfer is un-scheduled before control is passed to back to step 310. Otherwise, if it is determined that the transfer is to be further edited without un-scheduling it first, control is passed to step 320.

In step 320, an editing interface is rendered to accept/receive additional edits to the details and data fields of the transfer. If additional edits are received via the editing interface, control is passed to step 310.

As shown in FIG. 3A, for newly-created and edited transfers, step 310 can pass control back to step 324 for scheduling the transfer in response to receiving a selection to schedule the transfer without performing additional edits is received. As described above with regard to the process for adding new transfers, in step 310, an interface is provided to edit transfer details. This step can comprise receiving selections to save the transfer, schedule it to run now, or to delete the transfer. If it is determined that a selection to save the transfer has been received, control is passed back to step 306 where the transaction is saved with any edits from step 310. If it is determined that a selection to delete the transfer has been received, the transfer is deleted and the method 300 ends. If a selection to schedule the transfer to run at a later date is received in step 310, control is passed to step 324 for scheduling the transfer. Otherwise, if it is determined in step 310 that a selection to schedule the transfer to run now has been made, control is passed to step 314.

In step 314, the edited transfer is saved and scheduled to run now. According to an embodiment, transfers scheduled to be run now in step 314 are queued to run in the same business day as part of a sequence of a plurality of other transactions scheduled to run that day and are processed in the order they are received (i.e., first in, first out, also called FIFO). In another embodiment, transfers scheduled to be run now are prioritized to be run immediately in step 314 (i.e., in near real time), possibly before previously-queued transactions.

Although not shown in FIG. 3A, in an embodiment, a similar data and interface flow is implemented for money in/incoming transfers. For example, an entity can add and edit new incoming Cash In transfers via a Cash In center interface. It is to be understood that scheduling of incoming, cash/money in transfers may not be a mirror image of the method 300 because an entity does not typically have full control for scheduling the date and time of incoming transfers. However, method similar to the method 300 can be used to create new Cash In transactions that an entity is aware of that will be processed as money in transactions. Such transactions can be created and scheduled based upon a user's input and selections indicating approximately when the incoming transfer is expected along the lines of steps 304-314 described above and its amount. Additional incoming transfer transaction information can be edited, such as, but not limited to a description and the payor (similar to step 316). For example, instead of the Cash Out center used in steps 302 and 316, a Cash In center can be used to set up and edit incoming 'money in' transactions for an entity. An exemplary implementation of a Cash In center as part of UI 28 is described below with reference to FIGS. 25-29.

As indicated in the key of FIG. 3A, the above-described steps can be invoked by or implemented using certain interfaces. In the exemplary outgoing transfer creation and editing method 300, steps 304, 310, 318, and 324 can be performed via modal windows and steps 302 and 316 can be initiated via input received in a cash flow timeline interface or a Cash Out center. As noted in the preceding paragraph and shown in the key, in a transfer creation and editing process similar to method 300 for incoming transfers, steps analogous to 302 and 316 can be initiated via input received in a cash flow timeline interface or a Cash In center. Exemplary embodiments of the cash flow timeline, Cash Out/In centers, and the modal windows used to perform the steps of method 300 are provided in FIGS. 4-29, which are discussed below.

FIG. 3B is a flow chart depicting steps of a method 301 for adding and editing expenses for an entity. According to embodiments, once created and scheduled, these expenses can be depicted as part of the organization's cash flow timeline, such as, but not limited to embodiments of the cash flow timeline GUI described below with reference to FIGS. 4-15. In other embodiments, these expenses can be displayed in a Cash Out center as illustrated in FIGS. 16-24.

Example Data and Interface Flow for Adding New Expenses

By completing steps 303-325 of the method 301, new expenses can be added and scheduled to run either now (i.e., immediately) or at future date and/or time.

The expense creation and editing method 301 begins in step 303 where adding an expense is initiated. As shown in FIG. 3B, step 303 can comprise adding a money/Cash Out transaction using a Cash Out center interface so that the expense will be displayed as part of an entity's cash flow timeline. Alternatively, the step 303 invokes a Cash Out center interface as a result of input received via a displayed cash flow timeline GUI. In the exemplary embodiment of FIG. 3B, the Cash Out center used step 303 is labeled as a Payables Center. However, as noted above with regard to steps 302 and 316 of FIG. 3A, expenses and other Cash Out transactions are not limited to payables from an entity's accounts payable. Exemplary embodiments of a GUI for an interactive cash flow timeline as part of UI 28 are depicted in FIGS. 4-15, which are described below. According to the exemplary embodiment of FIG. 3B, step 303 can be initiated from a cash flow timeline GUI by selecting actionable UI elements such as selecting an icon, button, or drop-down menu to 'Add a Transaction' for a 'Money Out' transaction. Similar to the above description, an exemplary implementation of a Cash In center as part of UI 28 are described below with reference to FIGS. 25-29. After the expense creation is initiated, control is passed to step 305.

In step 305, a determination is made as to whether the money out expense being added is to be saved and scheduled to be run now or scheduled to occur at a later time. This step can comprise receiving, via an input device, a selection from a user to either save an expense to be executed now or to schedule the expense to occur at a later time/date. If it is determined that the expense is to be saved, control is passed to step 307, where the expense is saved as an expense scheduled to run now. If it is determined that the expense is to be scheduled to occur at a later date and/or time, control is passed to step 309.

In step 307, the expense information is saved. In one embodiment, the Cash Out information for the expense transaction is saved in the Cash Out database 32A of the Cash Out transaction server 42A.

In step 309, a specific time and/or date for the expense is received. The scheduled time/date can be a specific, user-specified date and time (e.g., 9 A.M. the following day), or a selected number of days/weeks/months in the future (i.e., 10 business/working days or 2 weeks from the current date). After selection of the scheduling is received, control is passed to step 311.

In step 325, the user is prompted to confirm or edit the scheduled time/date for the new expense. In the example shown in FIG. 3B, this step can comprise prompting the user to save the expense as is, schedule the expense to occur now, or delete the newly-added expense. In an embodiment, the prompting is displayed as one or more dialog boxes with selectable buttons for 'Confirm', 'Edit', 'Save/Schedule now', and/or 'Delete' in a GUI, such as the exemplary GUIs depicted in FIGS. 10, 11, 13, 19, 20, and 27.

In certain exemplary embodiments, the scheduling of future expenses in steps 309 and 325 can be fine-grained, such as receiving a selection, via UI 28 of a client 14, for a specific hour or minute of a day, including a future time of the current day. This fine-grained scheduling can be time-based (i.e., one hour from the current time or 5 P.M. of the current day) or based upon one or more dependencies. Accordingly, as used herein, the term 'future date and time' can refer to a time in a current or future date.

In other embodiments, scheduling of future expenses in steps 309 and 325 can be more coarsely-grained such that expenses scheduled to run 'now' are run during the current day (or the next business day if the method 301 is performed after hours or on a non-business day) and future scheduling is limited to a time range of a selected date in the future. In one embodiment, method 301 uses coarsely-grained scheduling in order simplify or streamline the UI 28 to be 'mobile friendly' in response to determining that a user is using a mobile client 14A or 14B with a relatively small display device 228. According to embodiments using coarsely grained scheduling in steps 309 and 325, future expenses can be scheduled to run on specific date, a relative date (i.e., one week in the future or on the last Wednesday of a month), and/or during a time range of a day (i.e., during the morning or afternoon), or on a date based upon one or more dependencies.

In embodiments, dependencies used for scheduling expenses in steps 309 and 325 can be date or time-based (i.e., the first business day after the end of a month) or based upon other transactions. For example, expenses can be scheduled based upon dependencies to occur a user-selectable time in hours or days after another expense transaction has completed (e.g., posted to an account) or after the entity's account balance(s) exceed a cash reserve by a certain percentage or amount. According to embodiments, the percentage or amount can be predefined and tunable by a user. In accordance with embodiments, recurring transactions can be used as dependencies. For example, an expense can be scheduled to run some time before or after the date of a recurring expense or transaction (i.e., one day before or after a payroll, rent, utility, loan, insurance, or mortgage payment date). In the case of recurring expenses that may occur weekly, bi-weekly, or monthly such as payroll payments, a dependency for a scheduled expense can be based on one or more of the recurring payments (i.e., a selected number of days before or after the last payroll payment of a month).

If it is determined in step 325 that a selection to edit the scheduled time to occur at a future time/date has been received, control is passed to step 313 where the newly-added expense is scheduled to occur at the desired future date and time. Otherwise, control is passed to step 311, where the newly-added expense can be further edited.

In step 311, an interface is provided to edit expense details. This step can comprise receiving selections to save the expense, schedule it to run now, or to delete the expense. If it is determined that a selection to save the expense has been received, control is passed back to step 307 where the transaction is saved with any edits from step 311. If it is determined that a selection to delete the expense has been received, the expense is deleted and the method 301 ends. If a selection to schedule the expense to run at a later date is received in step 311, control is passed back to step 325 for scheduling the expense. Otherwise, if it is determined in step 311 that a selection to schedule the expense to run now has been made, control is passed to step 315.

In step 315, the newly created expense saved in step 307 and scheduled to be run now is queued for processing. In one embodiment, step 315 is performed by the accounts payable transaction processor 220 executing on the Cash Out transaction server 42A. According to an embodiment, expenses scheduled to be run now in step 315 are queued to run in the same business day as part of a sequence of a plurality of other expenses scheduled to run that day and are processed in the order they are received (i.e., first in, first out, also called FIFO). In another embodiment, expenses scheduled to be run now are prioritized to be run immediately in step 315 (i.e., in near real time), possibly before previously-queued expenses.

Example Data and Interface Flow for Editing Existing Expenses

By completing steps 317-325 of the method 301, existing expenses can be edited and re-scheduled or recommitted to run either now or at future date and time.

In step 317, editing an expense is initiated. According to certain exemplary embodiments depicted in FIG. 3B, step 317 can comprise editing a money/Cash Out transaction using the Cash Out center user interface to edit a description field, a payee field, or to schedule an expense in the cash flow timeline for the entity. In the exemplary embodiment of FIG. 3A, the Cash Out center used in this step is labeled as a Payables Center. However, as noted above with regard to step 303, expenses and other Cash Out transactions are not limited to payables from an entity's accounts payable. According to the exemplary embodiment of FIG. 3B, step 317 can be initiated from a cash flow timeline GUI by selecting actionable UI elements such as selecting an icon, button, or drop-down menu to edit a description or payee field, view a scheduled or committed expense, or selecting a 'Schedule now' UI element for an existing 'Money Out' transaction. After the expense editing is initiated for an expense to schedule the expense to run now, control is passed to step 311, which is described above with reference to editing a newly-added expense. If editing of a description and/or payee fields is initiated in step 317 for a saved expense that is scheduled to be run at a future date and/or time, control is passed to step 307 where the description and/or payee information is saved, which is described above with reference to saving a newly-added expense. If it is determined in step 317 that editing has been initiated for expense scheduled to run at a later date, control is passed to step 319.

In step 319, a determination is made as to whether the money out expense being is to be further edited or un-scheduled or uncommitted prior to additional editing. This step can comprise receiving, via an input device, a selection from a user to either un-schedule or uncommit an expense or to continue editing it. If it is determined that the expense is to be un-scheduled or uncommitted, control is passed to step 323 where the expense is un-scheduled or uncommitted before control is passed to back to step 311. Otherwise, if it is determined that the expense is to be further edited without un-scheduling or uncommitting it first, control is passed to step 321.

In step 321, an editing interface is rendered to accept/receive additional edits to the details and data fields of the expense. If additional edits are received via the editing interface, control is passed to step 311.

As shown in FIG. 3B, for newly-created and edited expenses, step 311 can pass control back to step 325 for scheduling the expense in response to receiving a selection to schedule the expense without performing additional edits is received. As described above with regard to the process for adding new expenses, in step 311, an interface is provided to edit expense details. This step can comprise receiving selections to save the expense, schedule it to run now, or to delete the expense. If it is determined that a selection to save the expense has been received, control is passed back to step 307 where the transaction is saved with any edits from step 311. If it is determined that a selection to delete the expense has been received, the expense is deleted and the method 301 ends. If a selection to schedule the expense to run at a later date is received in step 311, control is passed to step 325 for scheduling the expense. Otherwise, if it is determined in step 311 that a selection to schedule the expense to run now has been made, control is passed to step 315.

In step 315, the edited expense is saved and scheduled to run now. According to an embodiment, expenses scheduled to be run now in step 315 are queued to run in the same business day as part of a sequence of a plurality of other transactions scheduled to run that day and are processed in the order they are received (i.e., first in, first out, also called FIFO). In another embodiment, expenses scheduled to be run now are prioritized to be run immediately in step 315 (i.e., in near real time), possibly before previously-queued transactions.

As indicated in the key of FIG. 3B, the above-described steps can be invoked by or implemented using certain interfaces. In the exemplary expense creation and editing method 301, steps 305, 311, 319, and 325 can be performed via modal windows and steps 303 and 317 can be initiated via input received in interactive interfaces for a cash flow timeline and/or a Cash Out center. Exemplary cash flow timeline and Cash Out center interfaces are described below with reference to FIGS. 4-15 and 16-24, respectively.

Example User Interfaces for a Cash Flow Timeline and Cash In/Out Centers

FIGS. 4-29 illustrate exemplary graphical user interfaces ("GUIs") according to embodiments of the present disclosure. The embodiments of GUIs depicted in FIGS. 4-29 are described with reference to the embodiments of FIGS. 1, 2, and 30. However, the GUIs are not limited to those example embodiments. FIGS. 4-29 illustrate an exemplary cash flow management interface comprising various GUIs for displaying data related to an entity's cash flow timeline, cash shortfalls, and Cash In/Cash Out center interfaces, in accordance with exemplary embodiments.

The terms 'console display', display, 'display screen', and screen are used interchangeably herein to refer broadly and inclusively to any type of display device or screen coupled to or integrated with a computing device for displaying content viewable by a user of the computing device, such as a user of a client 14. In an embodiment, the client 14 is a mobile computing client 14A or 14B. Such a display screen can include, for example and without limitation, a touch-screen liquid crystal display ("LCD"). In embodiments of the invention, the GUIs of a mobile client 14A or 14B is viewed on a display. In other embodiments, the GUIs shown in FIGS. 4-29 are viewed on a display of a server (i.e., a server console) such as consoles of servers 18, 20, 22, 34, or 42 shown in FIG. 1, a desktop computer (i.e., a PC monitor), or a laptop display, such as display devices 228 of clients 14 and 14A depicted in FIG. 2.

In the example GUIs shown in FIGS. 4-29, the user interface and consoles are rendered in a dedicated, native interface. In alternative embodiments, the console interface can be web based and rendered within a web browser. In other embodiments, the console interface and dashboards illustrated in FIGS. 4-29 can be displayed on server or workstation displays having a touch-sensitive (i.e., touch screen) display. For ease of explanation, the operation of the GUIs, displays and console interfaces are discussed in the context of a computing device platform with an input device such as a mouse or pointing device (including a touch-screen), but is not intended to be limited thereto. Examples of such computing device platforms include, but are not limited to, OSX server and workstation operating systems (OSs) from Apple, Inc.; WINDOWS® server and workstation OSs from the MICROSOFT™ Corporation; UNIX-based OSs, and Linux OSs, such as, but not limited to, Linux from RedHat™ Inc.

In alternative embodiments, the GUIs of FIGS. 4-29 can be rendered on a display 228 of a mobile client 14 implemented as a mobile computing device such as, but not limited to a personal digital assistant (PDA), an iPhone™, an iPod™ touch, or iPad™ tablet device, a device operating the Android operating system (OS) from Google Inc., a device running a MICROSOFT™ WINDOWS® Mobile or Phone OS, a device running a Symbian OS, a device running a PALM OS®, a BLACKBERRY® device running a Blackberry OS from Research In Motion ("RIM"), a smart phone, a hand held computer, a netbook computer, a palmtop computer, a laptop computer, an ultra-mobile PC, or another similar type of mobile device capable of processing instructions and receiving and transmitting data to and from users and other computing devices.

It is to be understood that the GUIs and console interfaces illustrated in the exemplary embodiments of FIGS. 4-29 can be readily adapted to execute on a display of mobile device platforms and operating systems, a computer terminal, a display of a client 14, a display console of a server, or other display of a computing device. Thus, the exemplary GUIs illustrated in FIGS. 4-29 can be rendered on a display of mobile clients 14A and 14B using an online banking application, within a web browser session, on a display console of a server, or on a display of a client 14 running an online banking application.

Throughout FIGS. 4-29, displays are shown with various icons, tabs, folders, dialog boxes, panes, command regions, interfaces, scroll buttons, scroll bars, toggle elements, windows, modal windows, check boxes, slide-able elements, tiles, data entry fields, drop-down menus, context menus, list boxes, and buttons that are used to initiate action, invoke routines, display and edit cash flow timeline and Cash In/Cash Out data for an entity's financial accounts, or invoke other functionality such as adding payees, customers, and payors. Some exemplary embodiments depicted in FIGS. 4-29 and described below employ modal windows implemented as child windows that require users to interact with them before they can return to operating the parent interface that invoked them. The use of such modal windows may temporarily interrupt or halt activities in the parent interface window until data entry or selections are made in the child window.

The initiated actions include, but are not limited to, establishing an entity's cash reserve, modifying a cash reserve, displaying cash shortfalls, mitigating cash shortfalls, adding transactions for transfers and expenses, viewing transactions, editing transactions, inputting user/entity preferences, and other cash flow timeline navigation inputs and gestures. For brevity, only the differences occurring within the figures, as compared to previous or subsequent ones of the figures, are described below.

Example Cash Flow Timeline Interfaces

FIGS. 4-15 depict exemplary embodiments of a cash flow timeline interface. FIGS. 4-15 are described with continued reference to the embodiments illustrated in FIGS. 1, 2, and 30. However, FIGS. 4-15 are not limited to those example embodiments.

Cash flow Timeline Default View

Figure 4:
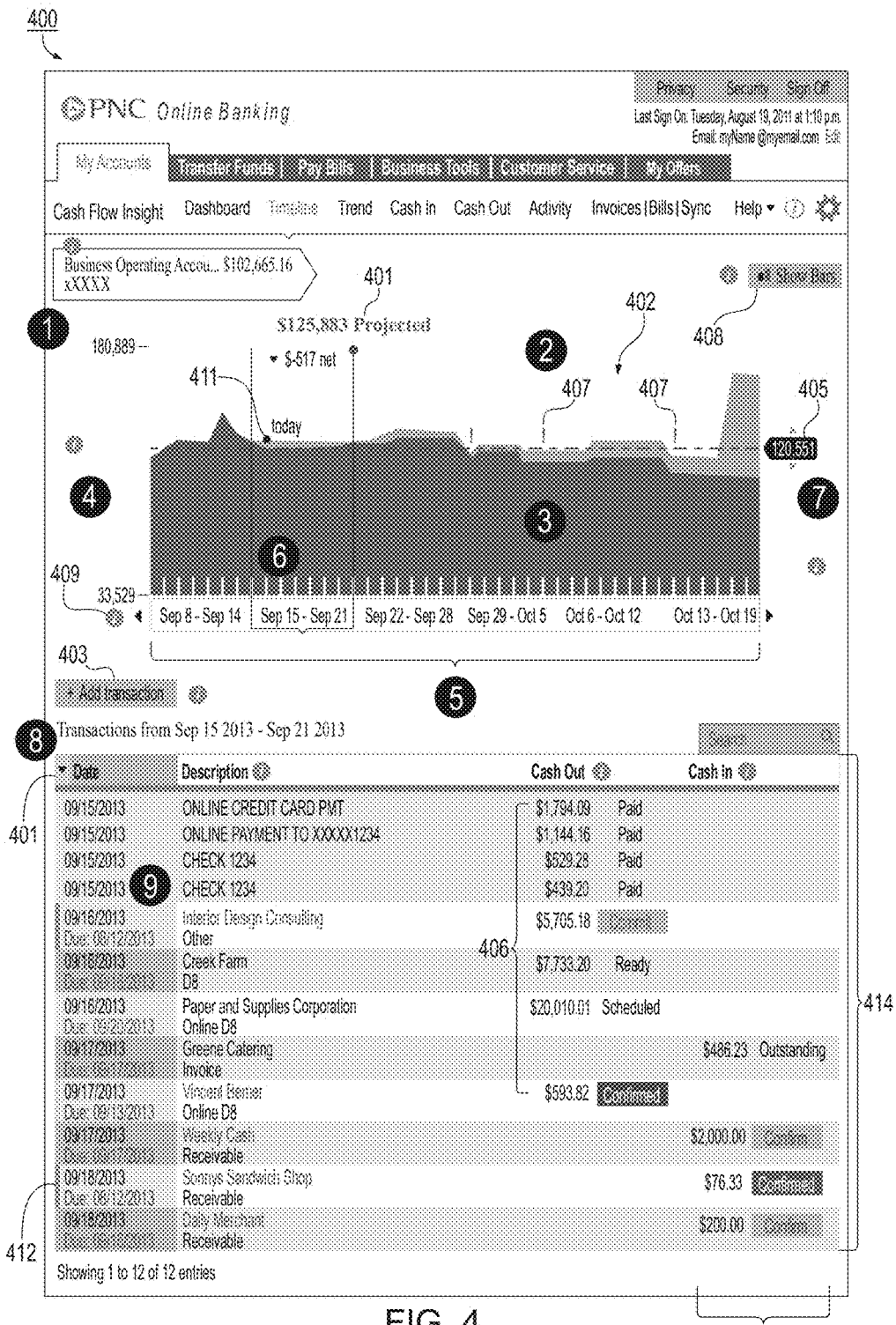
FIG. 4 illustrates a preferred embodiment of a graphical user interface ("GUI") for a cash flow timeline of an exemplary system.

FIG. 4 illustrates a graphical user interface ("GUI") for a cash flow timeline 400 interface of an exemplary system, such as the cash flow management system 200. The sequentially numbered, encircled elements 1-9 of FIG. 4 point out various exemplary features of the cash flow timeline 400 and are described in the following paragraphs along with user interface elements 401-412.

A timeline header 1 includes high-level account information, such as, for example the account type, balance, and the last few digits of the account number. In accordance with an embodiment, the balance displayed in the timeline header 1 is the amount of funds available today in the account (i.e., an available balance for the displayed account as of the date indicated by a current day indicator 411). As shown in the exemplary embodiment of FIG. 4, when there is more than one account associated with an entity, an expand/collapse button 401 is displayed adjacent to or within the timeline header 1. When a user, using an input device 229, selects the expand/collapse button 401 to expand the list of accounts, a drop-down list (not shown) of accounts and linked accounts associated with the entity is displayed and the user can select one or more of the accounts in the drop-down list to display a cash flow timeline 400 for. A user can select another account from the list of accounts and that account's information will then be displayed in the cash flow timeline 400. In cases where multiple accounts are selected, the information displayed in the cash flow timeline 400 is presented as a consolidated view for the selected accounts. By clicking, using an input device 229, the account header drop-down 401, an actionable list or drop-down menu of the entity's accounts and any linked accounts can be displayed.

In FIG. 4 and other embodiments of user interfaces in FIGS. 5-29, the expand/collapse button 401 is context sensitive in that it can be used to expand or collapse lists of items based on the type of item(s) and information being displayed in a given interface. For example, the expand/collapse button 401 can be used to expand and collapse lists of transactions 10, in addition to other items such as due dates, transaction dates, amounts, balances, payees, payors, customers, time increments, status, transaction descriptions, and/or other data fields. In certain embodiments, the expand/collapse button 401 can be selected within a displayed, expanded list or drop-down menu to sort the listed items. For example, by right clicking or hovering over the expand/collapse button 401, a user can sort a displayed list in ascending or descending order relative to a selected column of the list. The sorting can be context sensitive based upon the data type for the column being sorted. For example, numerical sorting can be performed for lists of amounts, balances, time increments, due dates, and transaction dates. Also, for example, sorting using the expand/collapse button 401 can be alphabetical for lists of customer, payees, payors, status, and transaction descriptions.

As would be appreciated by someone skilled in the relevant art(s), the expand/collapse button 401 can indicate that a list that has previously been expanded and can be collapsed. In the exemplary embodiments of FIGS. 4-29, when a list of items can be expanded, the expand/collapse button 401 is displayed as a downward facing or upside down triangle. Conversely, expand/collapse button 401 can indicate when a list of items is already expanded and can be collapsed. For example, as shown in FIG. 4, the expand/collapse button 401 can be displayed as a downward-facing triangle when a list can be collapsed. In alternative embodiments, the expand/collapse button can be displayed as plus or positive sign (e.g., "+") icon or button when a list of items can be expanded and as a minus or negative sign (e.g., "−") icon or button when a list of items can be collapsed.

A timeline graph 2 including a timeline graph area 402 is where the cash flow timeline data described in the following paragraphs is displayed. A balance graph 3 is displayed with reference to the past, current and unconfirmed balances for the account displayed in the timeline header 1. The balance graph 3 also reflects the current cash reserve 7 for the entity. In one embodiment, the cash reserve 7 will default to $15,000 the first time in the cash flow timeline 400 is invoked or launched by a user.

Figure 9:
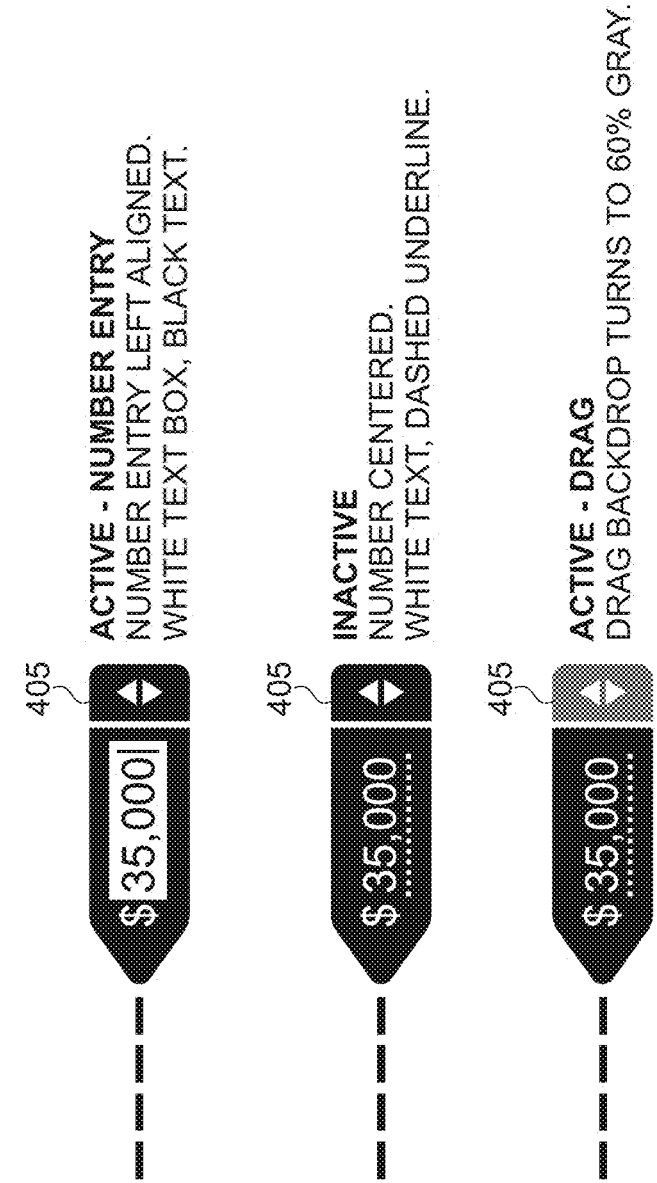
FIG. 9 illustrates a cash reserve adjuster in accordance with an exemplary embodiment of the present disclosure.

As shown in FIG. 4, the cash reserve 7 can be adjusted or tuned by a user by moving a UI element, called the cash reserve handle or adjuster 405. As illustrated in FIGS. 4 and 9, the cash reserve adjuster 405 can indicate a numeric currency amount (e.g., $35,000 in the embodiment of FIG. 9) for the entity's current cash reserve 7. In an alternative embodiment, the cash reserve 7 can be set by cash reserve adjuster 405 to be a percentage (e.g., relative to the entity's balance shown in the timeline header 1 or relative to the entity's consolidated balance for all of its linked accounts). In such an embodiment, the value of the cash reserve adjuster 405 may illustrate the cumulative change in percent of a balance over a preselected or user-defined time period, past, present, or future.

As the cash reserve adjuster 405 is moved, dragged, or slid, either up or down to increase or decrease the entity's desired cash reserve 7, the balance graph 3 is readjusted, and the new cash reserve 7 number (e.g., a currency amount or a percentage) is reflected within the cash reserve adjuster 405. By using an input device 229 (or a finger in the case of a touch screen display device 228), to move or scroll the cash reserve adjuster up or down, the cash reserve 7 will be set to whatever amount the user changes it to. The next time the cash flow timeline 400 is invoked or launched, the cash reserve 7 remains what it was previously set to the last time an adjustment was made.

As shown in the embodiments of FIG. 9, the cash reserve adjuster 405 may be indicated as active for number entry when numbers are able to be entered in the text box such that the text box is white and the text is black. In addition, the cash reserve adjuster 405 may be indicated as active for dragging when the draft backdrop turns to gray. In that case, dragging the cash reserve adjuster 405 will change the number shown in text. The cash reserve adjuster 405 may be indicated as inactive such that the text is white and has a dashed underline. In addition, a button to revert to a default amount for the cash reserve adjuster 405 may be provided for ease of use.

In another embodiment, the cash reserve 7 can be a set using the cash reserve adjuster 405 to vary at different times. This can be accomplished by dragging or moving selectable points of the cash reserve adjuster 405 along the time periods 5 to increase or reduce the entity's cash reserve 7 so that it is not linear as shown in FIG. 4. In this way, the cash reserve 7 can be set higher during certain days, weeks, or months when the entity expects to have a higher available balance (i.e., at the beginning of each month and/or based on recurring, scheduled, or committed Cash In transactions). Similarly, the cash reserve 7 can be set lower during certain time periods when the entity expects to have a lower available balance (i.e., at the end of each month and/or based on recurring, scheduled, or committed Cash Out transactions such as payroll payments).

A scale 4 indicates a number range, in currency units for the balance graph 3 and the data displayed in the graph area 402. In the example of FIG. 4, the scale 4 is in tens of thousands of US dollars. However, as would be understood by persons skilled in the relevant art(s), the scale 4 of the cash flow timeline 400 can dynamically change based on the balance of an account in the timeline header 1, past, current, or unconfirmed balances, and/or the size of the entity's cash reserve 7. For example, in cases involving currency units with low values and/or relatively large or prosperous entities with account balance in millions, rather than tens of thousands of currency units, the scale 4 will be adjusted accordingly to express the graph area 402 data in terms of millions, tens of millions, hundreds of millions, or billions of currency units as needed. The reverse is true for scenarios involving smaller entities with lower balances.

Time periods 5 are indicated along the X axis of the graph area 402 and can include past (i.e., historical balance data), present (i.e., the current day, week or month), and future time periods presently being displayed in the cash flow timeline 400. In other embodiments, additional details may be displayed in the graph area 402 for a selected time period 6 (e.g., November 6-12 in the example of FIG. 4). Such details can include the current day (e.g., November 6 in FIG. 4), a unconfirmed or projected balance (e.g., $125,883 in FIG. 4) for the last day of a selected time period 6 that spans into future dates, and a unconfirmed net balance for the end of the present day (e.g., $-517 shown in FIG. 4). As shown in FIG. 4, the current day indicator 411 is displayed in the graph portion 402 to delineate past time periods 5 from current and future time periods 6.

The left and right scroll buttons 409 and 410 can be used to navigate further into the past or into the future of the entity's cash flow timeline 400. For example, by clicking, using an input device 299, left scroll button 409, a user can scroll left along the X axis of the graph area 402 to display time periods 5 occurring prior to the earliest currently displayed time period 5. In an embodiment, actual and net balances for the entity's account(s) can be displayed instead of unconfirmed balances when the last day of a selected time period 6 is in the past (i.e., to the left of the current day indicator 411).

Conversely, by selecting the right scroll button 410, a user can scroll right along the X axis of the graph area 402 to display additional time periods 5 occurring farther in the future than the right-most, most current time period 5 currently being displayed. This will cause the display of time periods 5 in the graph area 402 to shift to the right, along the X-axis of the current day indicator 411 of the most current time period 5 or the time period farthest in the future that is currently displayed in the graph area 402. If a user navigates, by clicking the right scroll button 410 repeatedly, far enough into the future, the current day indicator 411 may no longer be displayed in the graph area 402. As explained below, in alternative embodiments, cash shortfall indicator(s) 407 for a future date whose corresponding time period 5 is no longer displayed in the graph area 402 may either be persistently displayed (e.g., as a floating icon with a date indicator) or not displayed in the graph area 402.

A summary of spreadsheet data 8 is also displayed for the selected time period 6 as shown in FIG. 4. The summary of spreadsheet data 8 can indicate the date range for the selected time period 6. Also as shown in FIG. 4, an Add transaction button 403 can be selected to add a new Cash In or Cash Out transaction for the entity to the spread sheet, such as an incoming/outgoing transfer, a payment, and/or an expense.

A spreadsheet portion 9 of the cash flow timeline 400 includes a listing of total transactions entries 414 (there are twelve in the example of FIG. 4), which includes Cash In transactions 404 and Cash Out transactions 406. As shown in FIG. 4, details for these transactions such as dates, amounts, descriptions, and statuses can be displayed in the spreadsheet portion 9. The spreadsheet portion 9 can be navigated by dragging, clicking, or scrolling, using an input device 229, UI elements of a scroll bar 412. As would be appreciated by someone skilled in the relevant art(s), the scroll bar 412 can be used to scroll forward or backwards through a list of items. In the embodiment of FIG. 4, the scroll bar 412 can be used to navigate upwards along the Y-axis in the vertically aligned lists of Cash In and Cash Out transactions 406 and 406 to display transactions with dates prior to the oldest, top-most transactions currently being displayed. Conversely, the scroll bar 412 can be used to navigate downwards in the lists of transactions 414 in the spreadsheet portion 9 to display transactions with dates after to the most-recent, bottom-most transactions currently being displayed. In other embodiments, for horizontally aligned lists, either the scroll bar 412 or the scroll left/right buttons 409 and 410 can be used to navigate along the X-axis of such lists. In exemplary embodiments, such as, FIGS. 4, 8, 16 and 25, scroll bars 412 may be used to navigate the list of transactions entries 414 of Cash In transactions 404 and Cash Out transactions 406 such as, but not limited to payments, transfers, and receivables.

In one embodiment, a default view of the cash flow timeline 400 includes at least one and up to two weeks of past cash flow history (e.g., posted transactions). In another embodiment, for example as shown in FIG. 8, the spreadsheet portion 9 may include a transaction category 736 under a payee/payor name 735 to indicate how a scheduled transaction will be processed based on its type (e.g., Check, Online, Invoice, or Other). Additional embodiments allow or alternatively prevent categorization for future/scheduled or committed transactions. According to another embodiment, 'uncashed' checks may be displayed in the timeline spreadsheet portion 9 between past and future Cash In transactions 404.

Other embodiments of the cash flow timeline 400 include view toggle options to view time periods 5 for an entity's past, current, and/or future, unconfirmed cash flow in monthly, weekly, or daily views. According to one embodiment, cash shortfall indicator(s) 407 will only appear on a first page of the cash flow timeline 400. In an alternative embodiment, the cash shortfall indicator(s) 407 are persistently displayed in the graph area 402 even when a user pages forward in time past the point of the unconfirmed shortfall day(s). For example, a floating cash shortfall indicator 407, icon, or symbol (e.g., an "!" in the exemplary embodiment of FIG. 4) can remain anchored to a portion of the graph area 402 regardless of whether that particular cash shortfall is within the currently displayed time periods 5.

In an embodiment, spreadsheet data in the spreadsheet portion 9, includes pending Cash In/Out transactions 404 and 406 primarily in the past view for time periods 5 in the past, with a default view of the cash flow timeline 400 comprising at least a single pending Cash In/Out transaction 404 or 406 and a single past Cash In/Out transaction 404 or 406.

Another embodiment of the cash flow timeline 400 can include a Credit Card toggle similar to the Show Bars toggle 408 to view credit card account information for credit card accounts, including merchant accounts associated with an entity. For example, by selecting a Credit Card toggle in the cash flow timeline 400, a visualization of an entity's credit card statement date(s) and/or bill payment due date(s) can be included in the graph portion 402 and/or the spreadsheet portion 9 as Cash Out transactions 406 for credit card accounts associated with the entity. When the Credit Card toggle is selected, the graph portion 402 can indicate the entity's running credit card balance(s) since the last credit card Statement has been cut (e.g., the running credit card balance since the last statement date). Embodiments of the cash flow timeline 400 and the Cash Out center 1100 described below with reference to FIG. 11 can include consumer credit card account information for sole proprietorship entities or businesses with linked consumer credit cards. According to these embodiments, the expand/collapse button 401 in the account header can be used to display a drop-down list of accounts such as credit card accounts for corporate credit cards, government credit cards, linked consumer credit cards, and/or merchant accounts that are associated with an entity. In the case of merchant accounts that an entity uses to accept incoming credit card payments from customers, selecting the Credit Card toggle can cause incoming credit card payments for these merchant accounts to be reflected in the graph portion and/or the spreadsheet portion 9 as Cash In transactions 404 and/or the Cash In center 1700 described below with reference to FIG. 25.

Further embodiments include categorization of future/ scheduled or committed Cash In/Out transactions 404 and 406, displaying data for a line of credit in the cash flow timeline 400, displaying merchant receivables in the cash flow timeline 400, and consolidating more than one account associated with an entity in one cash flow timeline 400 view. In accordance with embodiments, the cash flow timeline 400 includes selectable 'drag and drop' elements that can be, for example moved from one portion of the display to another to initiate actions.

An additional embodiment includes using past transactions to create recurring Cash In transactions 404 or Cash Out transactions 406. In certain embodiments, the cash flow timeline 400 displays invoicing Cash In transactions 404 and scheduled and/or committed payroll Cash Out transactions 406. As described below with reference to FIGS. 20 and 26, such recurring transactions can be established by selecting a recurring icon or checkbox 748.

In certain embodiments, elements of the cash flow timeline 400, and in particular, the graph area 402 can be color coded. For example, a dark green timeline can indicate today's available balance plus all Confirmed Cash In transactions 404 minus all scheduled and/or committed Cash Out transactions 406 for selected time period 6. Also, for example, a light green timeline can be displayed to indicate today's available balance plus all Cash In transactions 404 (for example, Confirmed and Unconfirmed) minus all Cash Out transactions 406 (for example, Committed or Uncommitted, Scheduled or Unscheduled) for the selected time period 6. Cash shortfalls and cash shortfall indicators 407 are described in more detail with reference to FIG. 13 below, but can be displayed in one or more of the time periods 5 to indicate when the prescheduled or committed future cash flow falls below the cash reserve 7. In other embodiments, the cash reserve line in the balance graph 3 and/or the cash reserve handle or adjuster 405 UI element may display in red, pulsate, or with some other audio/visual effect such as animation, until the cash shortfall is addressed.

According to embodiments, the Cash Out transactions 406 can include one or more of bill payments (one-time or recurring), outgoing internal transfers (one-time or recurring to accounts administered by the host institution on the host system 12), outgoing external transfers, user-entered 'Checks you wrote,' recurring Automated Clearing House (ACH) transactions (one time or recurring, user-entered), and payments via other methods (user-entered). In embodiments, the outgoing external transfers can be one-time or recurring outgoing transfers to accounts not affiliated with the host institution and external to the host system 12 and can be processed using online fund transfer services such as those offered by Fiserv, Inc. and their CashEdge division (formerly CashEdge, Inc.).

In certain embodiments, the Cash Out transactions 406 can include one or more of unconfirmed cash receivables (user-entered), incoming internal transfers (i.e., internal to the host institution and/or host system 12), incoming external transfers (i.e., from accounts and funding sources not associated with the host institution), and the entity's invoices.

As seen in FIG. 4, the cash flow timeline 400 can also include a clickable Show Bars toggle 408. In one embodiment, the cash flow timeline 400 shows only the graph portion 402 and the spreadsheet portion 9 by default and a user can view bar charts in the spreadsheet portion 9 by selecting the Show bars toggle 408. In the exemplary embodiment of FIG. 4, the Show Bars toggle 408 is toggle button, such that when it has not been selected, the label of the Show Bars toggle 408 is 'Show Bars' to indicate to a user that clicking on or selecting the Show Bars toggle will trigger display of a bar graph interface. Once selected, the bar graph view 500 of FIG. 5 is displayed.

In the full resolution cash flow timeline 400 depicted in FIG. 4, as a user scrolls up or down through the spreadsheet portion 9 to view incoming Cash In and outgoing Cash Out transactions 406 and 406, the graph area 402 is persistently displayed. In alternative embodiments, mobile friendly UIs 28A, 28B include a lower resolution or simplified version of the cash flow timeline (not shown) if it is determined that display device 228 of a user's client 14 has too small of a vertical resolution to display the full resolution cash flow timeline 400 shown in FIG. 4. According to one such embodiment of the mobile friendly UIs 28A, 28B when a user scrolls up or down through the spreadsheet portion 9, the graph portion 402 is now longer displayed and the table column headers of the spreadsheet portion 9 will lock in place at the top of the reduced resolution cash flow timeline.

Cash Flow Timeline Bar Graph View

Figure 5:
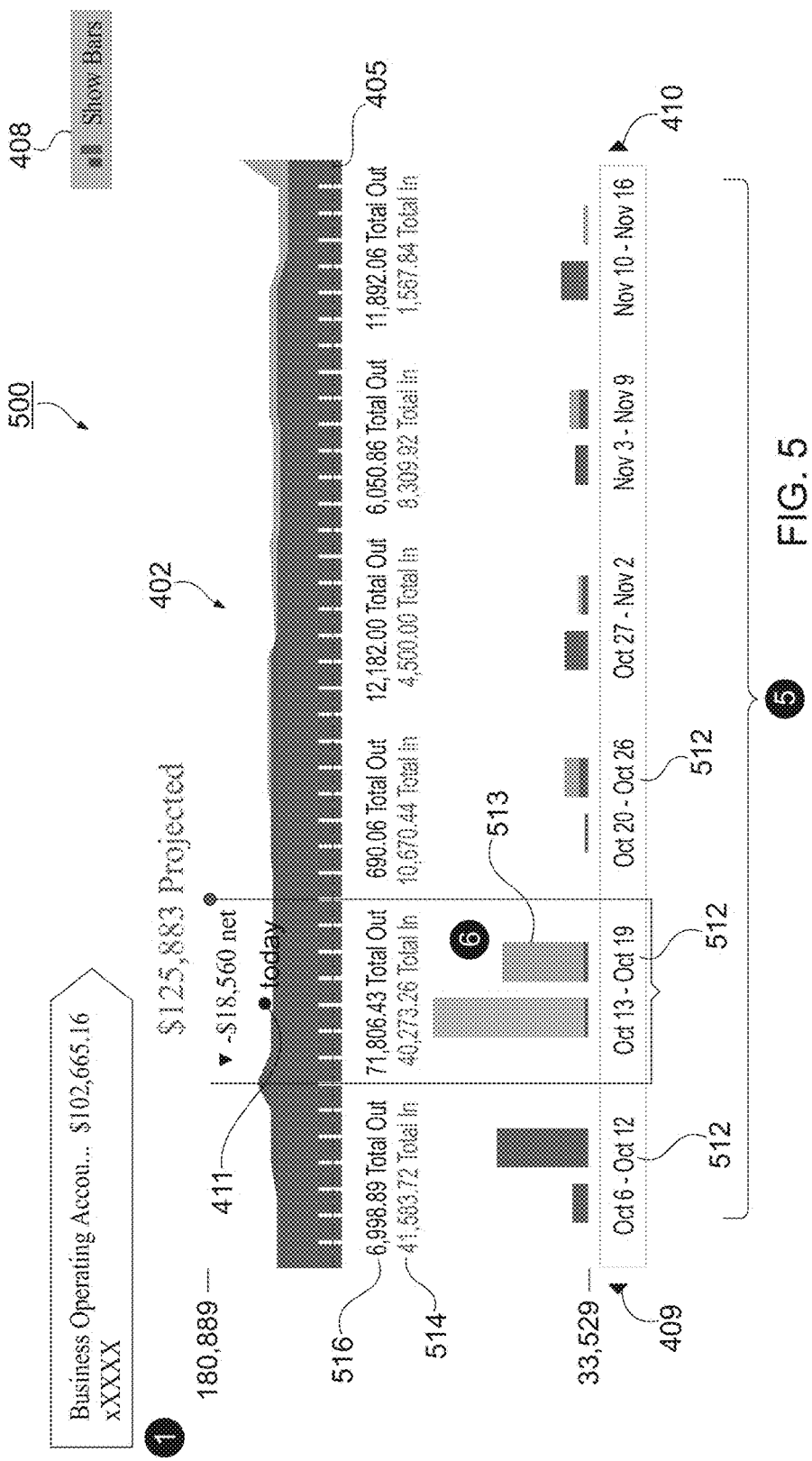
FIG. 5 illustrates a bar chart section of the GUI shown in FIG. 4 when a Show Bars toggle element is selected.

FIG. 5 illustrates a bar chart/graph section 402 of the GUI shown in FIG. 4 when the Show Bars toggle is selected in the cash flow timeline 400. FIG. 5 is described with continued reference to the embodiment illustrated in FIG. 4. However, FIG. 5 is not limited to that example embodiment.

As depicted in FIG. 5, the Show Bars toggle 408 is a toggle, such that once selected in cash flow timeline 400, the bar graph view 500 of FIG. 5 is displayed and the label of the Show Bars toggle 408 is changed to 'Hide Bars.' As shown in the exemplary embodiment of FIG. 5, the bar graph view 500 is an interactive interface depicting a plurality of bar graphs 512 depicting entity's cash flow information for a corresponding plurality of time periods 5, including a bar graph 513 for a selected time period 6. In the embodiment provided in FIG. 5, the bar graph 514 includes an indication of the totals 514 and 516 for the Cash In ("Total In") and Cash Out ("Total Out") transactions 406 and 406 for the selected time period 6.

In another embodiment, the bar graph view 500 may be displayed as a tile or child interface window partially overlaying the cash flow timeline 400 when the Show Bars toggle 408 is selected. In another alternative embodiment, the bar graph view 500 may be displayed as a pane of cash flow timeline 400 in place of the spreadsheet portion 9 of the cash flow timeline 400 when the Show Bars toggle 408 is selected.

Cash Flow Timeline Past and Future Views

Figure 6:
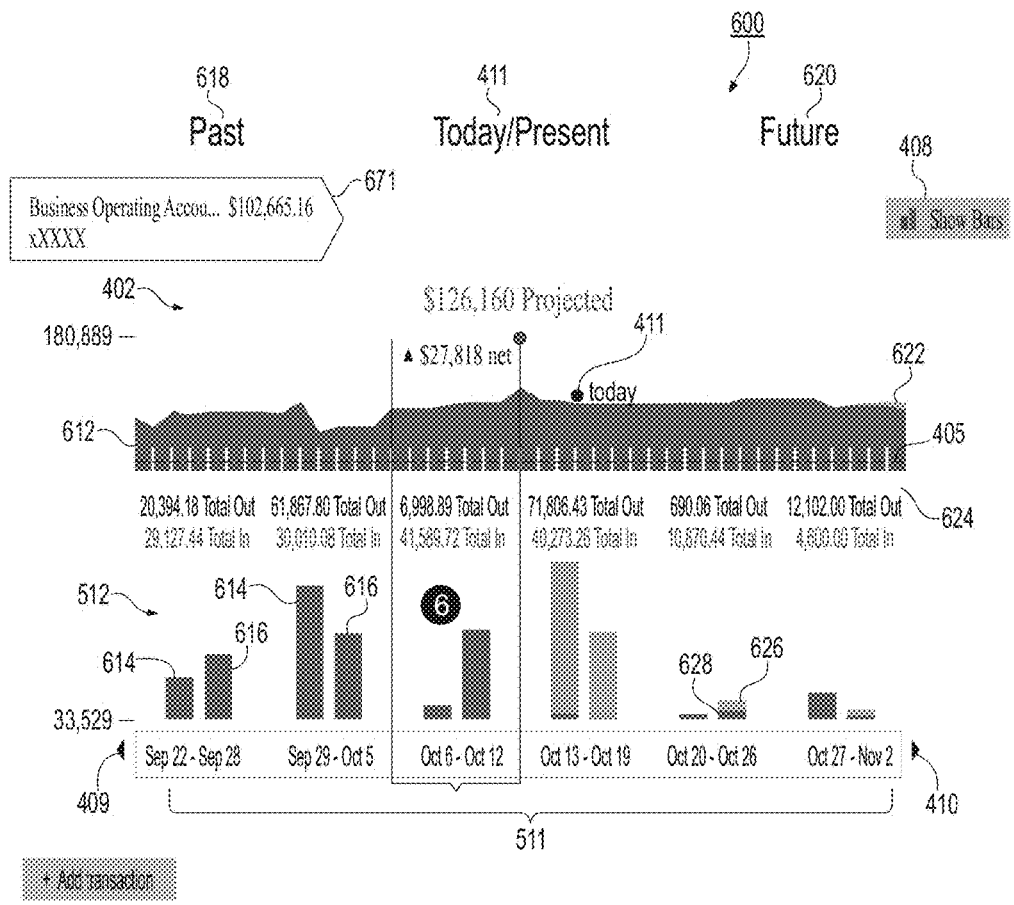
FIG. 6 illustrates a past and future view of a cash flow timeline, in accordance with an embodiment of the present disclosure.

FIG. 6 illustrates a past and future view 600 of a cash flow timeline 400. FIG. 6 is described with continued reference to the embodiments illustrated in FIGS. 4 and 5. However, FIG. 6 is not limited to those example embodiments.

Figure 7:
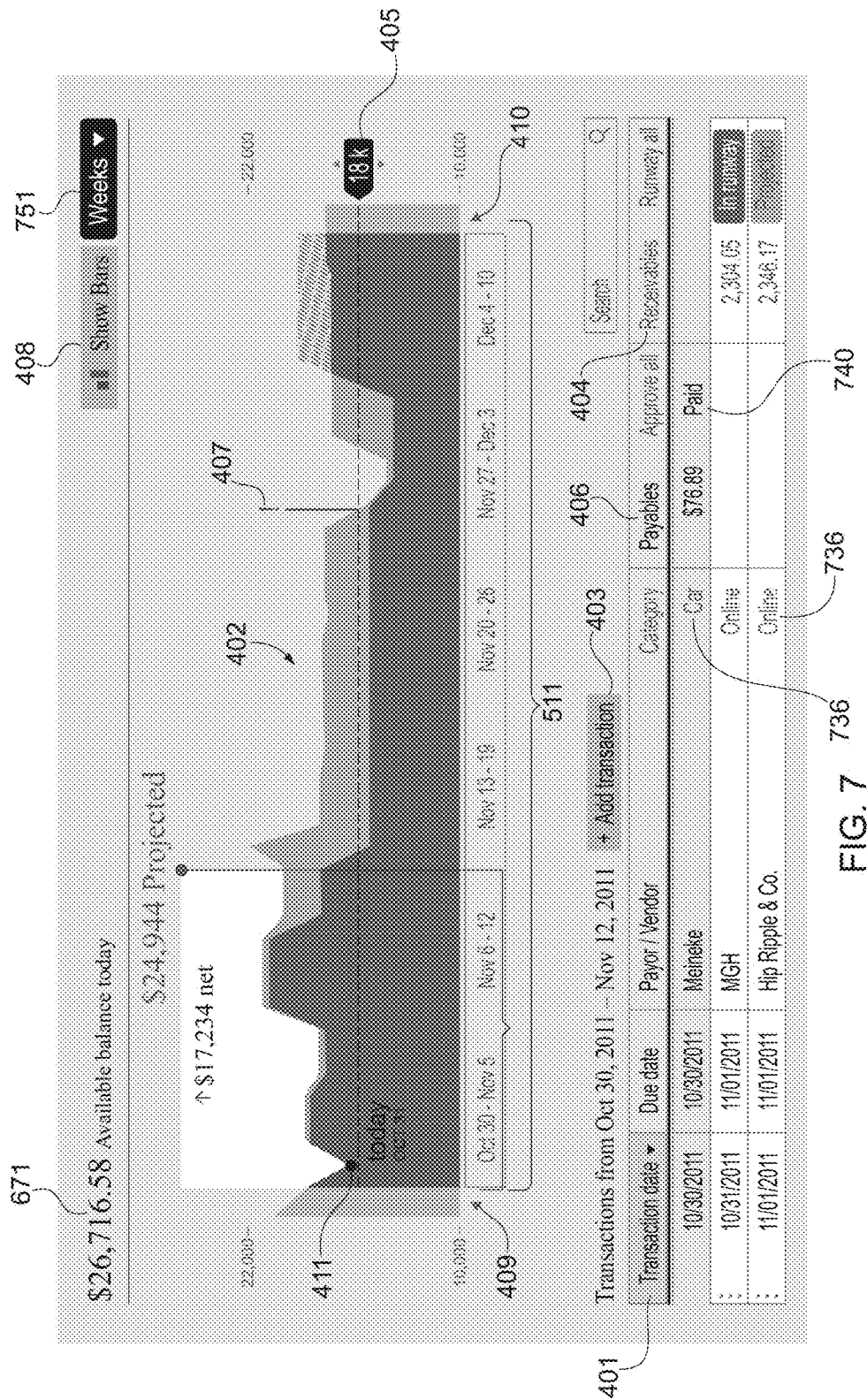
FIG. 7 illustrates a GUI for a cash flow timeline of an exemplary system that includes a column for categories of transactions.

As shown in FIG. 6, the past and future view 600 is an interactive interface displaying bar graphs 512 and timelines for time periods 511 spanning past cash flow transactions 618 and future cash flow transactions 620 for an entity, delineated by the current day indicator 411. The past and future view 600 also displays today's balance 671 indicating the current available balance for the entity's account(s) as of the current day indicated by the current day indicator 411 (e.g., $102,665.16 in the example of FIG. 6). The past cash flow transaction 618 information displayed the past and future view 600 in can include data shown in an account activity display in an OLB display for the entity's account(s). As illustrated in FIG. 7, the graph section 402 of a user interface according to preferred embodiments of the present disclosure may include a time increment drop down 751 to enable a user to select an increment of time (e.g., daily, weekly, monthly, quarterly, semiannual, or yearly) for the time periods 511. In a preferred embodiment, a similar time increment selection element may be provided for the time periods 511 and bar graphs 512 depicting past and future cash flow transactions 618 and 620 shown in FIGS. 5 and 6. In embodiments, the time increment is tunable and can be one or more of hours, days, weeks, months, or portions or aggregations thereof. The time increment also may be user defined or preselected by the host institution.

Figure 16:
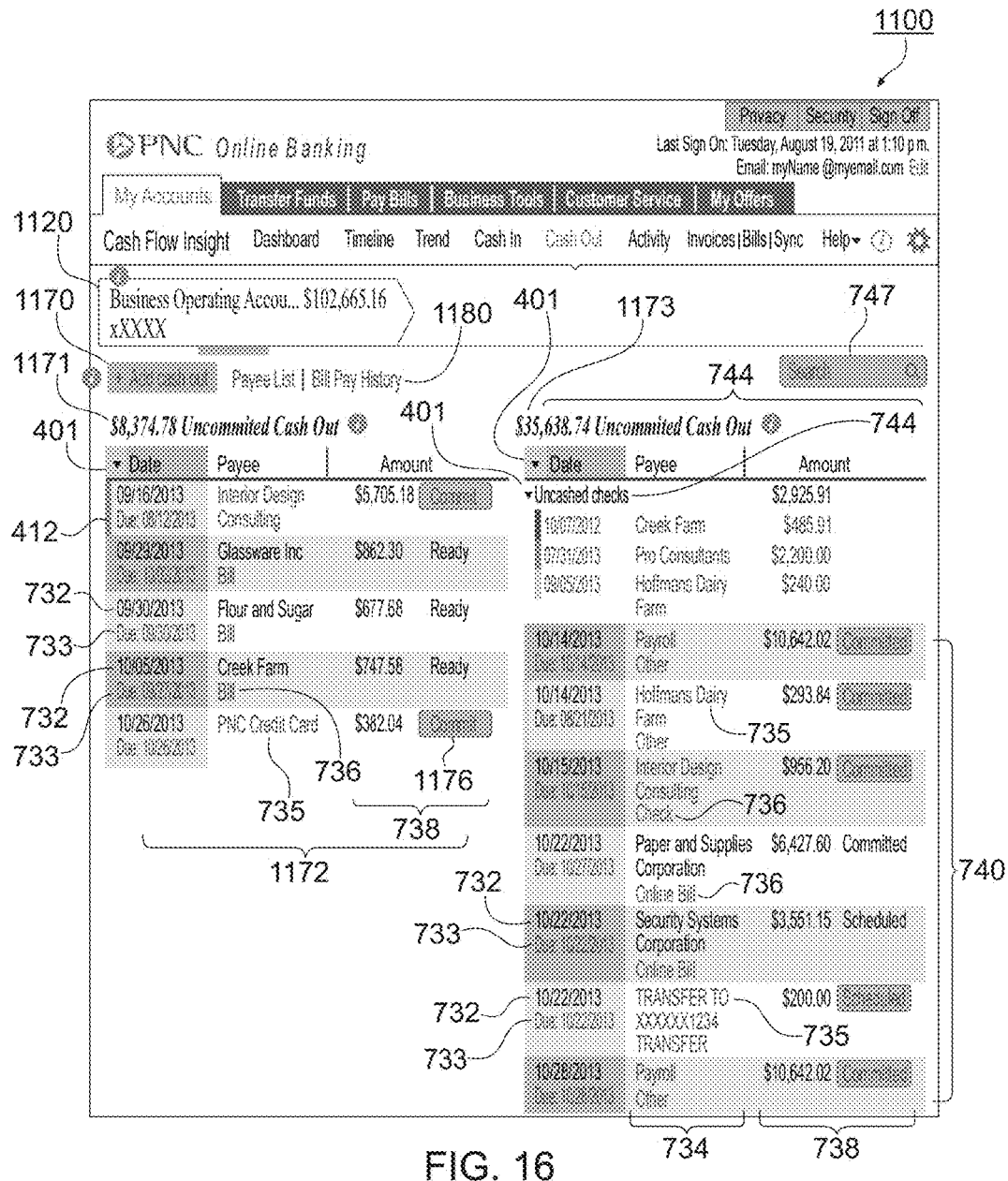
FIG. 16 illustrates a GUI for a Cash Out Center of an exemplary system.
Figure 25:
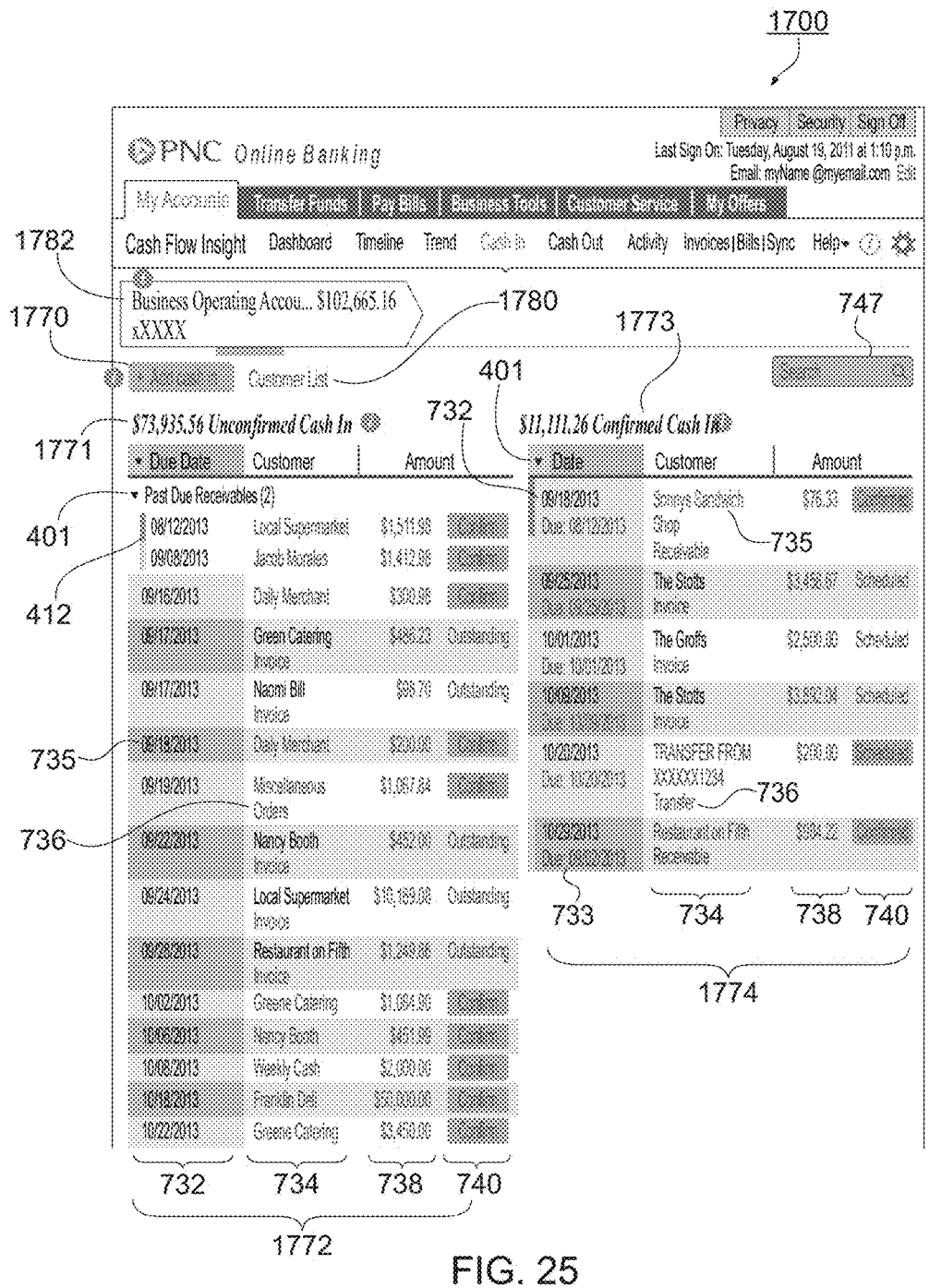
FIG. 25 illustrates a GUI for a Cash In center of an exemplary system.

In embodiments, the past cash flow transaction 618 data displayed in the past and future view 600 can include all posted and pending transactions for the entity's account(s) being displayed without placeholder transactions (i.e., pro forma transactions), past due bills (such as those displayed in the Cash Out center 1100 depicted in FIG. 16), and/or overdue invoices, which can be displayed in the Cash In center 1700 of FIG. 25. As shown in FIG. 6, pro forma transactions can optionally be displayed in the past and future view 600 by selecting the pro forma toggle 613.

In the exemplary embodiment of FIG. 6, the past cash flow transaction 618 data displayed in the past and future view 600 can include one or more of a Past Balance timeline 612 of past actual credits and debits for the entity; and/or a Past Cash Out bar graph 614 which is a bar graph of all outgoing transactions and a Past Cash In bar graph 616 of all past incoming transactions. According to one embodiment, the Past Cash Out and Cash in bars graph 614 and 616 include past payables and receivables, respectively. In another embodiment, these graphs are not limited to payables and receivables and instead graph all past incoming and outgoing transactions.

According to embodiments, the future cash flow transaction 620 data displayed in the past and future view 600 can display future incoming transactions such as invoices (confirmed or in runway transactions such as those shown in FIGS. 25 and 27), scheduled and/or committed incoming transfers, and/or placeholder transactions. As described below with reference to FIG. 25, the above-noted incoming transactions can also be displayed in the Cash In center 1700.

The future cash flow transaction 620 data displayed in the past and future view 600 can also include future outgoing transactions, such as, but not limited to, bills (scheduled or committed and un-scheduled or uncommitted), scheduled outgoing transfers, and/or committed (aka placeholder) transactions. As described below with reference to FIG. 16, the above-noted outgoing transactions can also be displayed in the Cash Out center 1100.

As depicted in the exemplary embodiment of FIG. 6, the future cash flow transaction 620 data displayed in the past and future view 600 can include one or more of a Future Possible Balance timeline 622 of today's balance 671 plus future approved/counted cash flow plus future unapproved cash flow; a Future Confirmed Balance timeline 624 of today's balance 671 plus future approved/counted cash flow; and a Future Cash Out bar graph with a first portion 626 representing unapproved (such as uncommitted and unscheduled) outgoing cash flow transactions and a second portion 628 representing all approved/counted (such as committed and scheduled) future outgoing cash flow transactions.

In other embodiments, the first portion 626 of the Future Cash Out bar graph is rendered with lighter shading and/or a different color than the second portion 628 so that a user can readily distinguish between the unapproved outgoing cash flow and the approved/counted future outgoing cash flow data. According to one embodiment, the Future Cash Out bar graph portions 626 and 628 include future payables. In another embodiment, these portions 626 and 628 of the Future Cash Out bar graph are not limited to payables and instead graph all future, unconfirmed or predicted outgoing transactions. Similar features and attributes may be implemented for a Future Cash In bar graph that is shown in FIG. 6 next to the Future Cash Out bar graph. In addition, in the example embodiments of FIGS. 5 and 6, the cash reserve 405 UI element is a slide-able dashed line in the graph section 402.

As illustrated in FIG. 7, a category column can also display categories 736 of transactions. In one embodiment, the category column only displays categories 736 of posted transactions, that is, all past transactions 618 that are not pending (e.g., the posted ACH debit with a status 740 of Paid in the 'Car' category 736 of FIG. 7). Alternatively, transaction categories 736 can also be displayed with transaction descriptions 734, as shown in FIG. 8. For example, as shown in FIG. 8, the categories 736 of "Check" and "Receivable" can be displayed below respective descriptions 734 of a cash out or cash in transaction, respectively. In one embodiment, categories 736 are displayed below transaction descriptions 734 in text that is relatively darker (e.g., bold) than the text of the corresponding descriptions 734.

Cash Flow Timeline Spreadsheet

FIG. 8 illustrates an interactive spreadsheet view 700 of line items and transactions in an entity's cash flow timeline 400. In one embodiment, the spreadsheet view 700 is the spreadsheet portion 9 displayed in a pane (e.g., the lower pane) of the cash flow timeline 400 shown in FIG. 4 when the Show Bars toggle 408 is not selected or de-selected. In another embodiment, similar to one embodiment of the bar graph view 500, the spreadsheet view 700 can be displayed a tile or child window partially overlaying the cash flow timeline 400 display. FIG. 8 is described with continued reference to the embodiments illustrated in FIGS. 4-6. However, FIG. 8 is not limited to those example embodiments.

In an embodiment, a user can drag and drop a Cash Out transaction 406, such as a payment, or Cash In transaction 404, such as an uncashed check or an incoming transfer, into the spreadsheet view 700.

As illustrated in FIG. 8, a date column displays transaction dates 732 for the displayed Cash In and Cash Out transactions 406 and 406. As described above with reference to FIG. 4, the expand/collapse button 401 can be used to sort column data, such as, but not limited to, the transaction dates 732. The transaction dates 732 dates displayed in the date column are context sensitive and can be displayed with, for example, due dates 733 for Cash In transactions 404 that may include for example, transactions that have not been processed. Also, for example, the date column can display scheduled or committed dates 732 for future Cash Out/In transactions 404 and 406 and posted dates 732 for completed transactions. For online bill payments, the date column can display an expected payment date 732 that a user chooses for a payment handled by Fiserv, Inc. or their CashEdge division (formerly CashEdge, Inc.).

In a preferred embodiment, the user can edit, enter, or choose an expected payment date 732 from an interactive calendar using the transaction date editing interface 900 described with reference to FIG. 11 below. For outgoing checks, the date column can display the date 732 the user sends out the check (which may be user entered or automatically updated). For other payments, the date column can display the user's expected transaction date 732. In one embodiment, the expected transaction dates 732 are user entered via the date editing interface 900 shown in FIG. 11. In the embodiment of FIG. 8, the date column displays due dates 733 near (e.g., underneath) the transaction date 732 as the date that the payment is due, which is not necessarily the same as the transaction date. In an embodiment, due dates 733 are user entered (i.e., via date editing interface 900), except in the case of electronic billing (i.e., ebills).

With continued reference to FIG. 8, a description column displays one or more data fields constituting transaction descriptions 734 of the displayed transactions. In the case of scheduled or committed Cash Out transactions, the transaction descriptions 734 for payments can include the name of a payer or payee and a transaction category 736. According to embodiments, transaction descriptions 734 for future transactions 620 is displayed in a different font (e.g., bold vs. regular for past transactions 618) or color (e.g., blue text vs.

black for past transactions 618) to indicate that a user can make changes to future transactions 620. In embodiments, the description column includes descriptions 734 that are selectable hyperlinks that when selected, cause the interface to additional details for the particular item. In the example of FIG. 8, clicking on a link for a transaction's description 734 in the description column will cause the spreadsheet view 700 to display additional transaction details for the payee, payor, or other information about the transaction.

Cash Out and Cash In columns of the spreadsheet view 700 can display transaction amounts 738 of the displayed Cash Out or Cash In transactions with a status 740 of each transaction. For example, the transaction status 740 can be Paid, Pending, Processing, Scheduled, or Committed for Cash Out transactions like payments, outgoing transfers, expenses, and payables. Also, for example, the transaction status 740 can be such as, for example, Confirmed, Unconfirmed, and Outstanding for Cash In transactions like incoming transfers and receivables. In accordance with embodiments, the status column can indicate a transaction status 740 as follows: pre-scheduled or precommitted payments that are scheduled or committed to run now are labeled as 'Schedule now'; payments scheduled or committed to run at a future date/time are labeled as Scheduled or Committed when the user can make changes; scheduled payments are labeled as Processing if they are online bill payments that are in-flight; and/or pre-scheduled or committed payments are labeled as 'Schedule now.' A transaction status 740 can also be indicated as Pending for a transaction that is between posted, past transactions 618 and future transactions 620.

According to embodiments, the transaction status 740 indicators are actionable buttons that, if selected by a user using an input device 229, can launch interfaces to change a transaction's status 740. For example, by clicking on a status indicator button for a transaction status 740 of Scheduled, a user can re-schedule the transaction or schedule the transaction to run now. Selecting a button for Scheduled transfers or expenses can initiate processes 300 or 301, respectively, described above with reference to FIGS. 3A and 3B. In a preferred embodiment, uncashed checks can appear in a collapsed state by default in the spreadsheet view 700, but can be expanded to see all by clicking on the expand/collapse button 401.

As shown in FIG. 8, scheduled Cash Out transactions can be displayed as a different transaction category 736, indicated, for example, in dark gray text underneath the corresponding transaction descriptions 734. Non-limiting, exemplary transaction categories 736 for scheduled Cash Out transactions are as follows: Online for online bill pay through a service offered by Fiserv, Inc. and/or their CashEdge division (formerly CashEdge, Inc.); Check for a check the customer has written, Transfer for any type of transfer; or Other for any other Cash Out transaction 406 that the host institution or host system 12 does not process or cannot track. In addition, a search dialog 747 allows a user to search for Cash In transactions 404 and Cash Out transactions 406.

Figure 19:
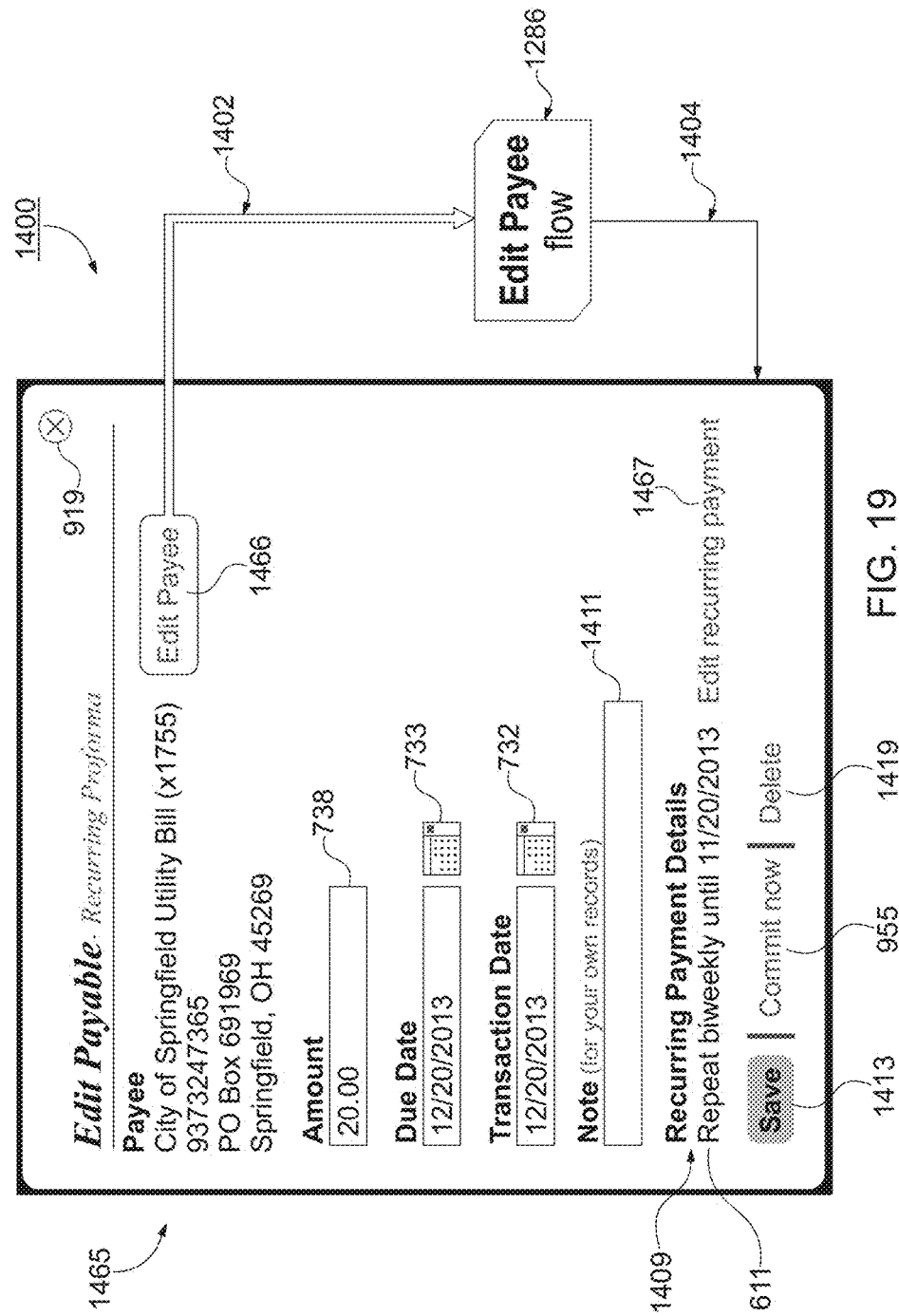
FIG. 19 illustrates an exemplary embodiment of the GUI shown in FIG. 16 when an Edit Payee UI element is selected.
Figure 20:
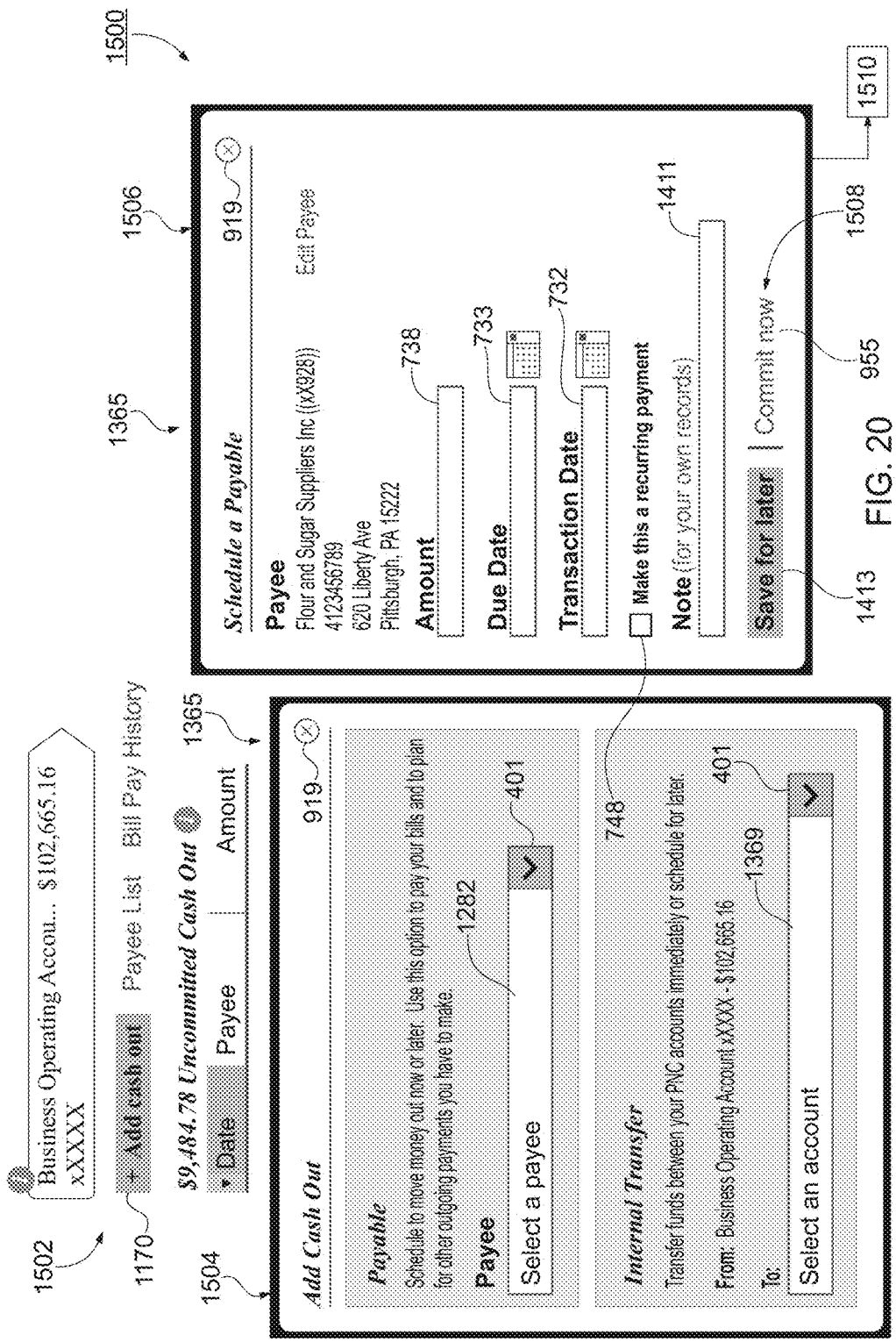
FIGS. 20 and 21 illustrate exemplary embodiments of the GUI shown in FIG. 16 when an Add Cash Out UI element is selected.
Figure 26:
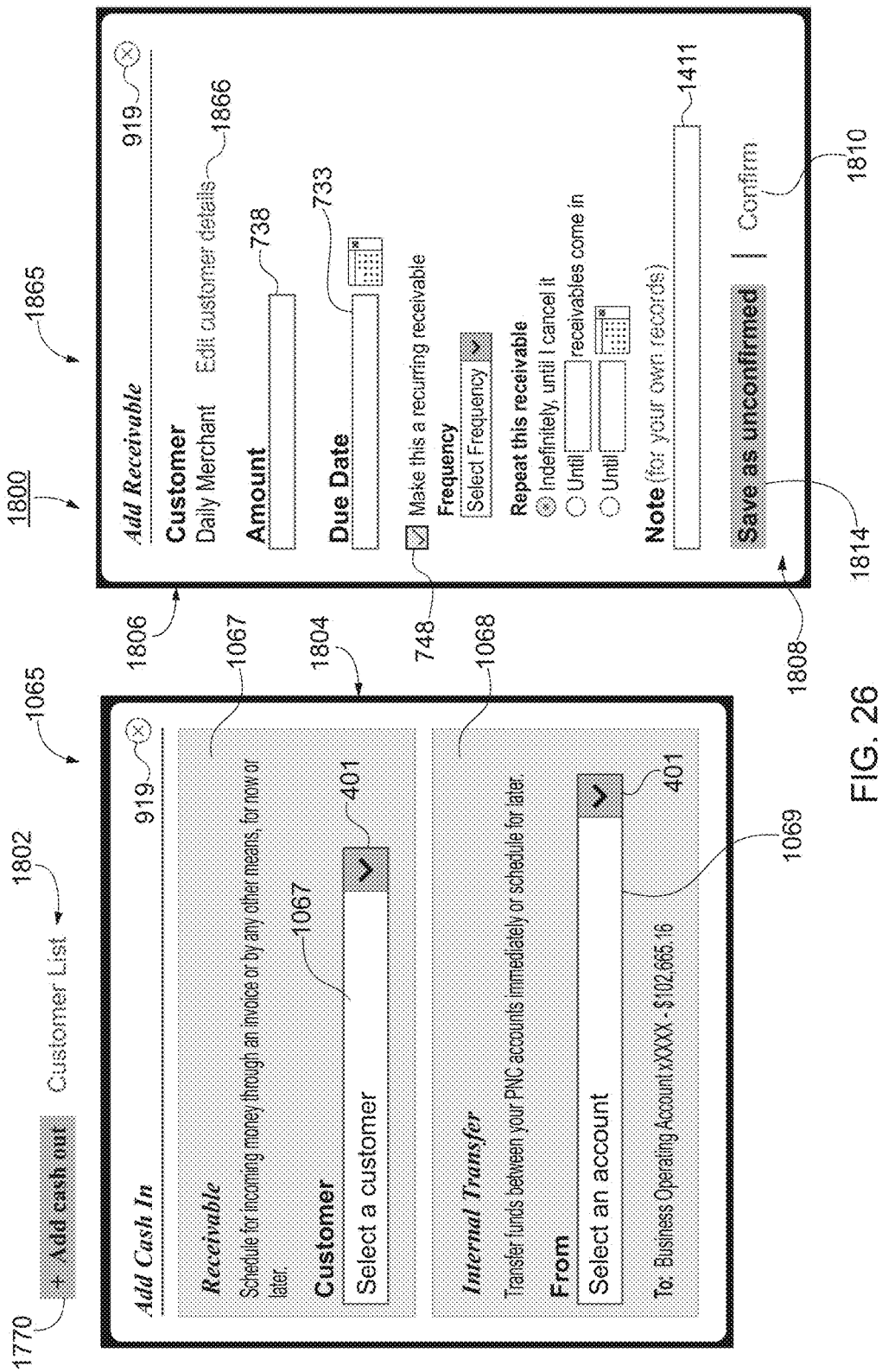
FIG. 26 illustrates an exemplary embodiment of the GUI shown in FIG. 25 when an Add Cash In UI element is selected.
Figure 28:
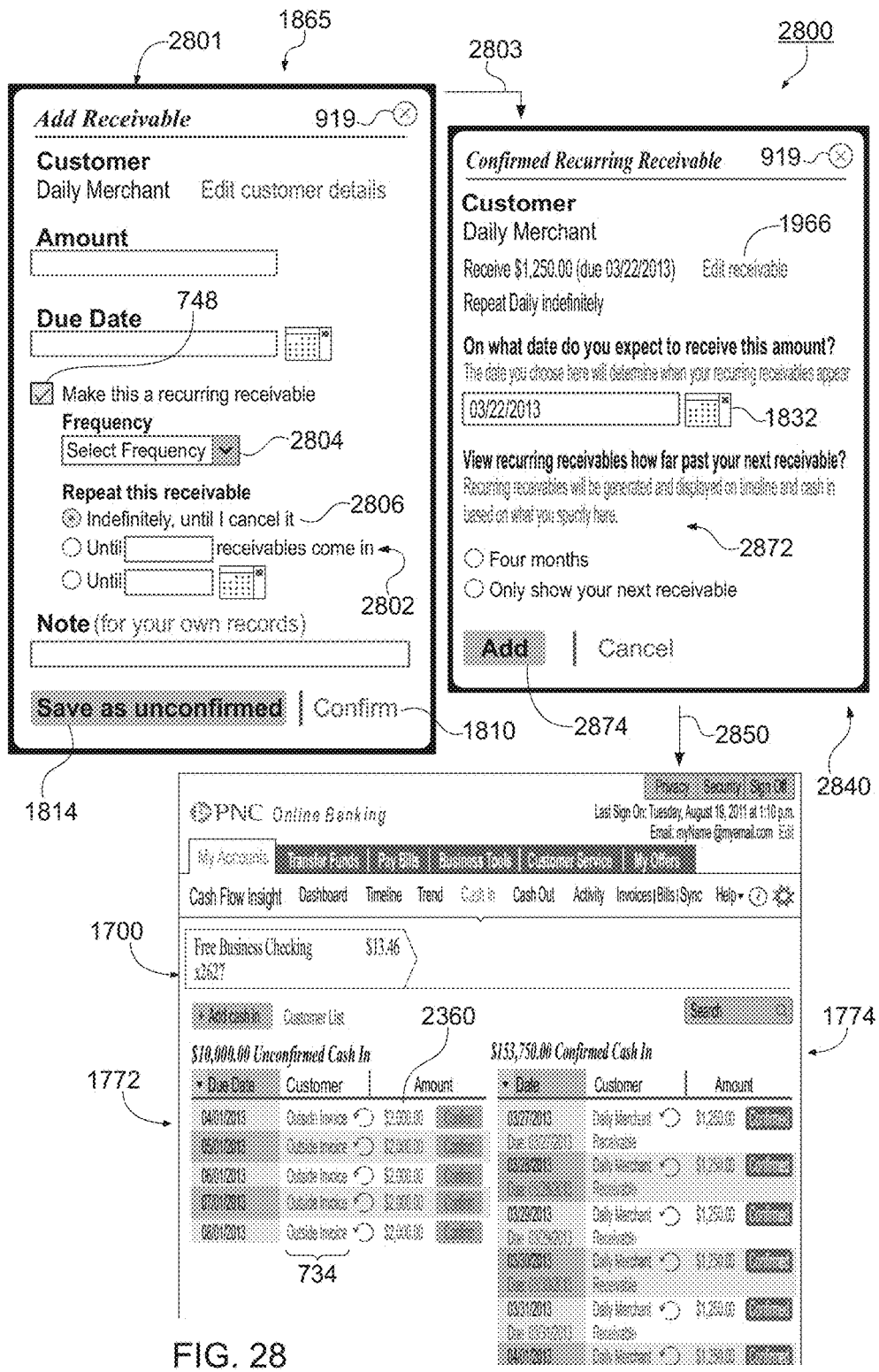
FIG. 28 illustrates exemplary embodiments of the GUI when a Schedule Recurring Receivable UI element is selected.

In another embodiment, a recurring checkbox, such as the recurring checkbox 748 in FIGS. 20, 26, and 28, can be displayed next to a date 732 or a transaction description 734. Upon detecting a selection of the recurring checkbox, enterable data fields may be displayed to accept user input of the transaction frequency and end date for the recurring transaction (similar to 1409 in FIGS. 19, 23, 24, 28, and 29). Although referred to herein as a recurring checkbox, this UI element is not limited to a checkbox. For example, the recurring checkbox can be embodied as a selectable icon 748, as shown, for example, in FIGS. 7, 11, and 17.

Interfaces for Editing Items

Figure 10:
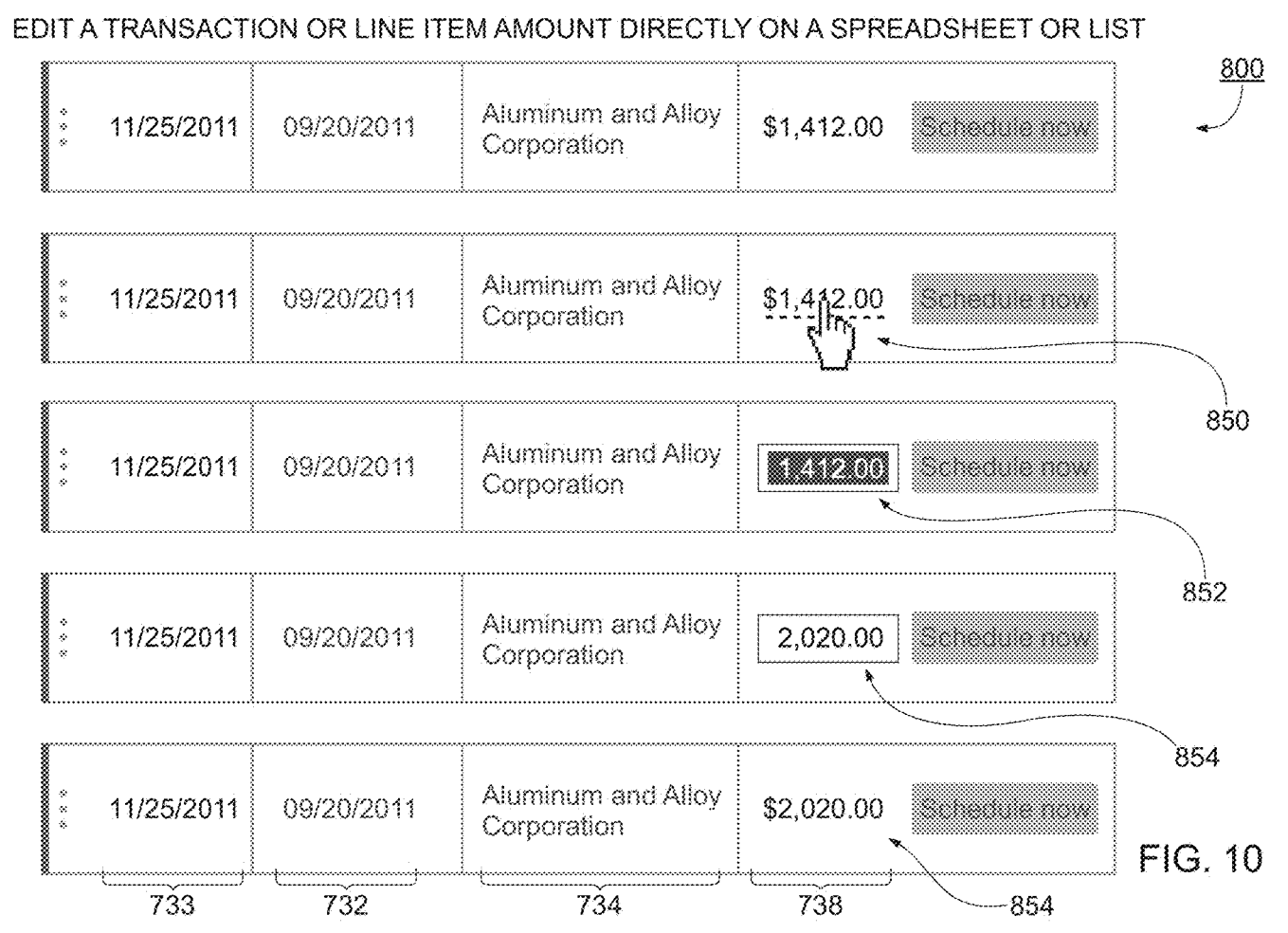
Figure 11:
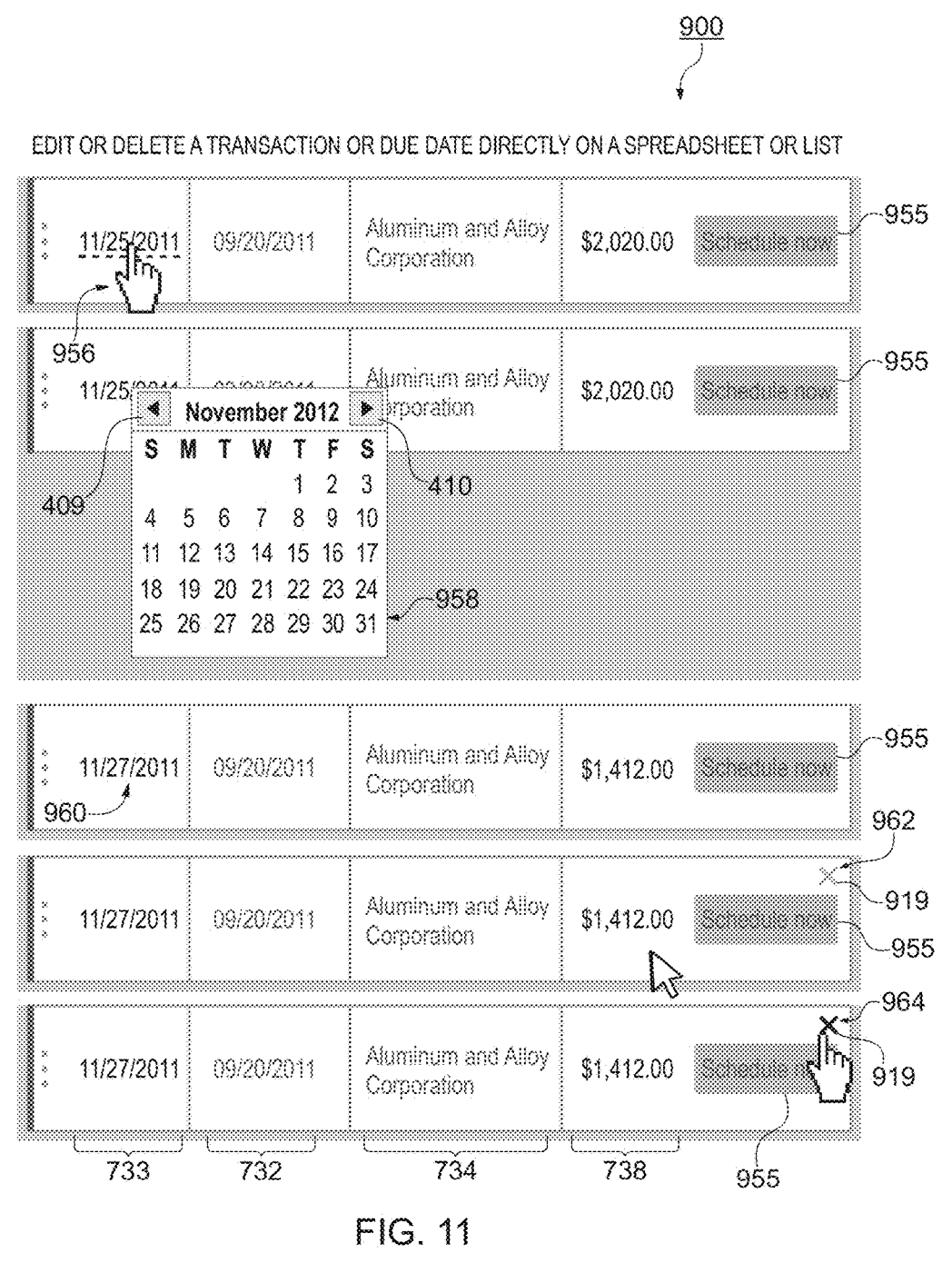

FIGS. 10 and 11 depict exemplary interfaces for editing items in the spreadsheet and list portions of the GUIs shown in FIGS. 4, 7, and 11. FIGS. 8 and 9 are described with continued reference to the embodiments illustrated in FIGS. 1, 2, 3A, 3B, and 7 and to the embodiment provided in FIG. 11. However, FIGS. 8 and 9 are not limited to those example embodiments.

In one embodiment, the transaction editing interfaces shown in FIGS. 10 and 11 enable a user to perform in-line editing processes 800 and 900 to edit transactions directly from the spreadsheet view 700 of the cash flow timeline 400.

In accordance with further embodiments, the processes 800 and 900 and interfaces illustrated in FIGS. 10 and 11 can also be initiated from the uncommitted Cash Out transactions 1172 and committed Cash Out transactions 744 described below with reference to FIG. 16. Accordingly, processes 800 and 900 enable in-line editing of a transaction directly on the spreadsheet 700, the uncommitted Cash Out transactions 1172, and committed Cash Out transactions 744.

FIG. 10 depicts an exemplary editing process 800 for editing transactions and line items directly in the spreadsheet view 700 described above with reference to FIG. 8 and the uncommitted Cash Out transactions 1172 and committed Cash Out transactions 744 described below with reference to FIG. 11. By interacting with selectable UI elements in the spreadsheet display 700, a user can perform in-line editing of transactions. In an embodiment, the user can interact with the UI elements using an input device 229. The exemplary embodiments of FIGS. 10 and 11 illustrate editing processes 800 and 900 for editing an amount and date of a bill, respectively, but it is to be understood that similar principles and interfaces can be used in other embodiments to edit data fields for other line items and transactions such as, but not limited to, expenses, transfers, payments, and other Cash In and Cash Out transactions 406 and 406.

By completing process 800, a transaction amount for a bill can be changed. The data and display flow to change an amount of a bill using process 800 is described below with reference to FIG. 10.

As shown in FIG. 10, in step 850, in response to detecting navigation/hovering/mousing over a bill amount, an indication (i.e., dotted line and/or cursor change) can be displayed to indicate that amount can be edited. At this point, control is passed to step 852. In step 852, a text box can be displayed in proximity to the amount with the existing amount highlighted and user input/selection of a new amount can be received. Once a new transaction amount, such as bill amount, is received, control is passed to step 854, wherein in response to receiving input for the new amount in step 852, the new amount is saved for that transaction or line item (i.e., a bill in the example of FIG. 10).

FIG. 11 shows the data and display flow for changing a transaction date or bill due date. In particular, FIG. 11 illustrates additional in-line editing interfaces and techniques for editing and deleting transaction items. By completing process 900, a transaction date 732 or due date 733 on a bill can be changed. As shown in FIG. 11, the process 900 also includes optional steps for deleting a line item such as a bill.

If a user does not wish to reschedule or delete a given line item and instead wishes to save and schedule the corresponding transaction to be run now, the Schedule now button 955 can be selected. If the line item is a transfer, selecting the Schedule now button 955 will cause step 314 of process 300 shown in FIG. 3A to execute. If the line item is an expense, electing the Schedule now button 955 will cause step 315 of process 301 shown in FIG. 3B to execute.

The process 900 begins in step 956, when a user hovers or mouses over either a transaction date 732 or due date 733. In response to detecting such navigation, a dotted line can be displayed and/or the cursor can change to show the user the date can be selected and edited. At this point, control is passed to step 958.

In step 958, an interactive calendar is displayed above the date to allow the user to choose a new date. In the step, the interactive calendar can be displayed in proximity to the date and user input/selection of a new date can be received. In this step, left scroll button 409 can be used to select a month and date prior to the month the transaction is currently scheduled for and the right scroll button 410 can be used to select a month after the month the transaction is currently scheduled for. Once the user selects a new date, control is passed to step 960, where the entered date is populated in the due date field to change the bill's due date 733.

In step 960, in response to receiving selection of the new date, the new is populated in the corresponding database field to change the bill.

FIG. 11 also illustrates the data and display flow for deleting a line item (i.e., a bill in the exemplary embodiment of FIG. 11). The deletion process begins at step 962, when, in response to detecting navigation/hovering/mousing over a line item, a delete button 919 (i.e., an "X" in the exemplary embodiment of FIG. 11) can be displayed in proximity to the transaction or line item. At this point, control is passed to step 964.

In step 964, user input/selection of the delete button 919 element can be received and the bill is deleted. In one embodiment, step 964 can comprise optionally confirming the deletion with the user via a dialog box or modal window prior to deletion. For example, a delete modal window or dialog can be displayed to confirm the deletion.

In embodiments, the delete button 919 has a context-sensitive appearance and/or functionality. In any exemplary embodiments of FIGS. 4-29, the delete button 919 can be displayed as a clickable icon (e.g., an icon with an encircled "X" as shown, for example, in FIG. 11 or a rectangular button 1419 labeled 'delete' as shown in FIG. 19) or as merely a clickable icon "X" as shown in other contexts. Additionally, besides being selectable to delete an existing item, in certain embodiments, the delete button 919 can be selected to cancel editing or creation of an item. As illustrated in the varying contexts of the figures, the delete button 919 can be selected to cancel editing or creation of incoming and outgoing transactions such as transfers, expenses, bill, payments, payables, and receivables in addition to cancelling scheduling (or rescheduling) of items.

In cases where the delete button 919 is clicked in an editing or scheduling interface, instead of deleting the item being edited or scheduled, the selection serves to cancel any unsaved changes. Clicking the delete button 919 in some of the modal windows shown in FIGS. 10-19 will close the window and return control back to the parent interface that invoked the modal window. In cases where delete button 919 is clicked in a creation interface, instead of deleting a new item being created, the selection can serve to cancel creation of the item without saving any data entry performed in the creation interface.

Figure 12:
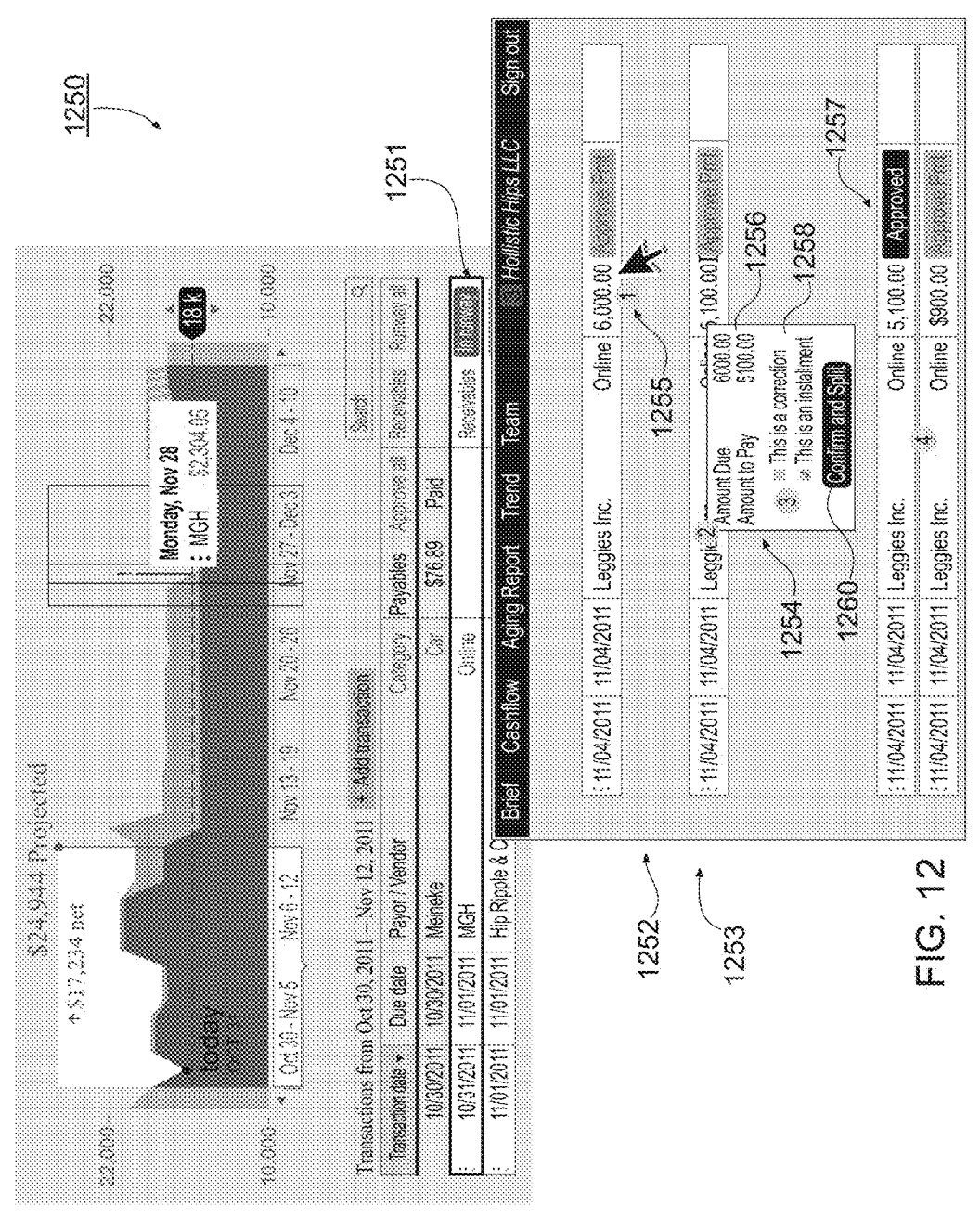

FIG. 12 illustrates another preferred embodiment of the present disclosure where process 1250 involves splitting a single transaction into multiple transactions. By choosing and activating a transaction, in a way consistent with this disclosure, in step 1251 and control is passed in step 1253 to the Transaction Splitting window 1252.

According to an embodiment, the Transaction Splitting window 1252 is displayed in response to receiving a selection of a Cash Out transaction 406 from the Cash Out Center 1100 or a Cash In transaction 404 from the Cash In Center 1700. In certain embodiments, such selections can be made when a user, using an input device 229, clicks on a transaction date 723, a due date 733, a transaction description 734 (i.e., a hyperlink for the payee and/or transaction category 736), an amount 738, or a status 740 of an uncommitted Cash Out transaction 1172 or a committed Cash Out transactions 744 displayed in the Cash Out center 1100. Similar selections can be made for the Cash In Center 1700. In another embodiment, the Transaction Splitting window 1252, or an element that launches the Transaction Splitting window 1252, is displayed when a user, using an input device 229 or gesture, mouses or hovers over a transaction in the spreadsheet view 700 to initiate editing of a transaction.

In step 1255, a user may then select a transaction that it wishes to split into multiple instances. A Transaction Splitting pop up box 1254 may then be displayed. In the example of FIG. 12, the transaction is an original payment of $6,000 that is due to Leggies, Inc. By selecting or inputting an Amount to Pay 1256, a user can make an installment on such a payment, $5,100 as shown in FIG. 12. The Transaction Splitting pop up box 1254 may have selection fields 1258 to allow a user to provide record keeping of the splitting of the transaction, such as whether the split portion of the transaction, the Amount to Pay, is a correction or an installment. Further selection fields may be provided as appropriate. After a user selects the confirm and split element 1260 control is passed in step 1257 and the split transaction will appear in a transaction list as multiple transactions.

Cash Shortfall Interface

Figure 13:
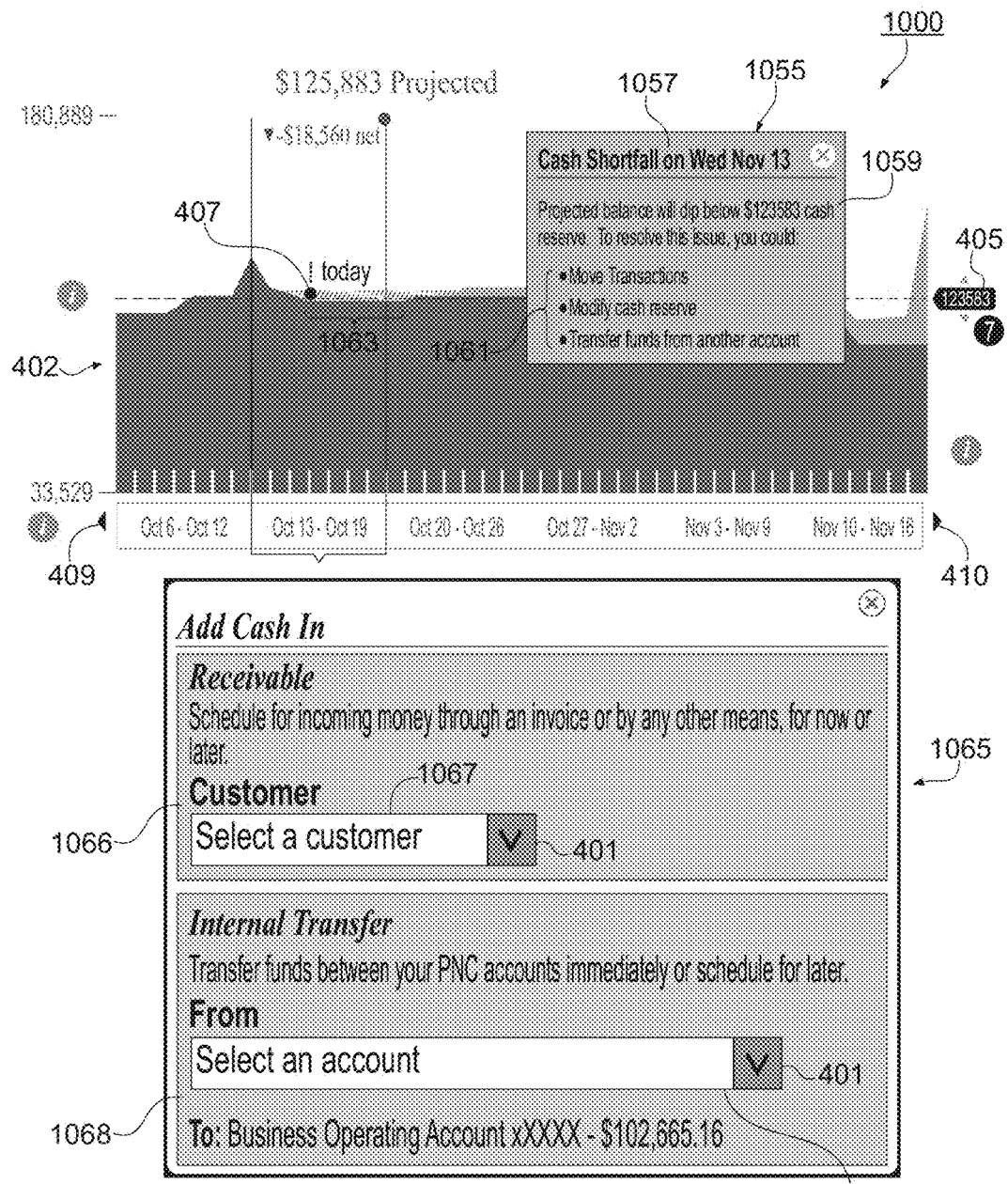
FIG. 13 illustrates exemplary embodiments of a cash shortfall interface.

FIG. 13 illustrates exemplary embodiments of an interactive Cash Shortfall interface 1000. As shown in FIG. 13, a Cash Shortfall Pop-Up Box 1055 can be displayed when a user hovers over or clicks on a Cash Shortfall indicator 407. In the exemplary embodiment of FIG. 13, the Cash Shortfall Pop-Up Box 1055 includes a Title with the unconfirmed date 1057 of the cash shortfall, an Explanation 1059 of the Cash Shortfall (e.g., in terms of a unconfirmed balance falling below a cash reserve 7 previously set using the cash reserve UI element 405, and remediation options 1061 to mitigate or resolve the cash shortfall. According to one embodiment, the remediation options 1061 can include a link to 'Get Paid', which when selected, will launch the Cash In center 1700 (shown in FIG. 17). In that embodiment, the link to the Cash In center 1700 enables a user to perform collections activities to address a cash shortfall. In an alternative embodiment, the Get Paid link is not be included as a remediation option 1061. By selecting the Transfer Funds remediation option 1061, a user will be able to initiate an incoming funds transfer directly from the Cash Shortfall Pop-Up. Such incoming funds transfers may be limited to transfers from accounts administered by the host institution or host system 12.

With continued reference to FIG. 13, a Danger Zone 1063 can be displayed in the graph area 402 if a danger period continues over or spans multiple days. According to an embodiment, a Cash Shortfall indicator 407 will only appear on the first page of the cash flow timeline 400 and will not be persistently displayed if a user scrolls forward in time using the scroll right button 410. As shown in FIG. 10, in addition or instead of the Danger Zone 1063, individual Cash Shortfall indicators 407 can be displayed in graph area 402 for each dip below the cash reserve 7 set using the cash reserve 405 UI element 405. If the cash reserve 7 is adjusted by sliding, dragging, or scrolling the cash reserve UI element 405 it will stay the same the next time the cash flow timeline 400 is rendered for the given account(s) for the entity.

Selecting one or more of the remediation options 1061 enables an entity to address a Cash Shortfall In-Context. For example, if a user selects the transfer funds remediation option 1061, the Add Money In interface 1065 can be rendered, which enables a user to schedule or save a Cash In transaction 404 such as a receivable or incoming transfer. As depicted in FIG. 13, the Add Money In interface 1065 can be embodied as a modal window with a receivable pane 1066 that allows a user to select a customer from a customer list 1067, which can be expanded using the expand/collapse button 401. A transfer pane 1068 of the Add Money In interface 1065 can also be used to create an internal, incoming transfer from another account associated with or linked to the entity.

In the embodiment provided in FIG. 13, the transfers are limited to internal accounts administered by the host institution or the host system 12. In an alternative embodiment, the account list 1069 can include external or foreign accounts unaffiliated with the host institution. In either embodiment, a user can select an account to transfer funds from using account list 1069, which can be expanded using the expand/collapse button 401. For both the customer list 1067 and the account list 1069, a user can enter a portion of an existing customer name or account identifier (i.e., account name and/or account number) and the Add Money In interface 1065 can suggest auto-completions of the full customer name or account identifier for the user to select. Alternatively, if a user knows the full customer name or account identifier, that information can be entered into the Add Money In interface 1065.

Calendar View

Figure 14:
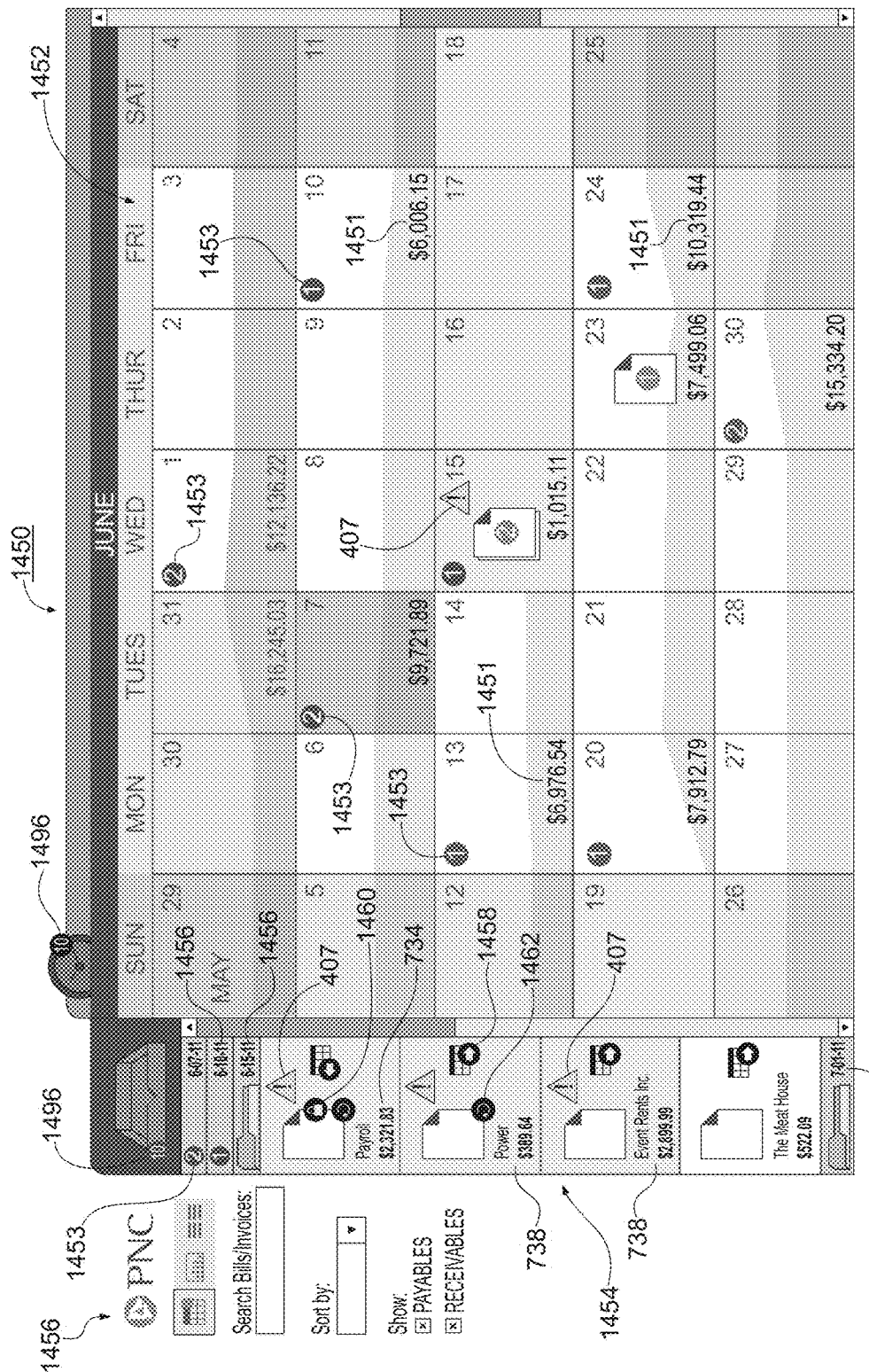
FIG. 14 illustrates a GUI for a Cash Flow Calendar of an exemplary system.

In a preferred embodiment, the attributes and aspects of the cash flow timeline 400 may be represented in a cash flow calendar form. As shown in FIG. 14, the cash flow calendar 1450 consist of a daily view section 1452, a folder section 1454, and a controls section 1456. The daily view section 1452 is laid out like a typical calendar and displays cash out 406 or cash in 404 transactions based on the days that a transaction is scheduled to take place. Transaction indicators 1453 are provided in the days that a cash out 406 or cash in 404 transaction is to take place. The number of transactions for a day may indicated by a number in the transaction indicator 1453. Further, the type of transaction, cash in or cash out, may be indicated by a different color, shape, or other visual cue. The daily view section 1452 may also include an total transaction indicator 1496 that displays how many transactions are scheduled for that time period, a month in the example of FIG. 14. In other preferred embodiments, the time period for the total transaction indicator may be based on a user defined time period and can be any appropriate period of time. In the example of FIG. 14, there are ten scheduled transactions for the month of June. A running balance 1451 may also be displayed for each day that a transaction is scheduled. The running balance is calculated in the same manner as the balance in the timeline header 1 of FIG. 4. Similar to the cash flow timeline 400, the daily view section 1452 may include a cash shortfall indicator 407.

The folder section 1454 provides a folder element 1456 for each of the days that transactions are to take place. The folder elements 1456 are expandable and may be expanded based on the current day or selection of a user. Each folder element 1456 may include a number of indicators to express information regarding transactions including a cash shortfall indicator 407; a description 734 of a transaction that may include an amount 738 of the transaction; a secure transaction indicator 1463; an indicator 1458 to show the type of transaction for a given day (which is shown as an arrow pointing left for a cash in transaction and an arrow pointing right for a cash out transaction in FIG. 14). Certain elements may only be shown when a folder is not in an expanded mode, such as the transaction indicators 1453. The folder section 1454 may also display a total transaction indicator 1496 for a given time period.

Further, the controls section 1456 may include a global field for selecting whether cash in ("RECEIVABLES") or cash out ("PAYABLES") transactions are shown. A search field may also be provided similar to the search dialog 747 discussed herein. In addition, a field for sorting transaction by a predefined or user submitted selection may be provided. Additional fields or controls for effecting the overall display of the cash flow calendar 1450 may also be provided. Such fields or controls may include displays for colors, formatting, positioning, size, or any other aspect of the calendar 1450 that may be adjusted or optimized as understood by one of ordinary skill.

Aging Report

Figure 15:
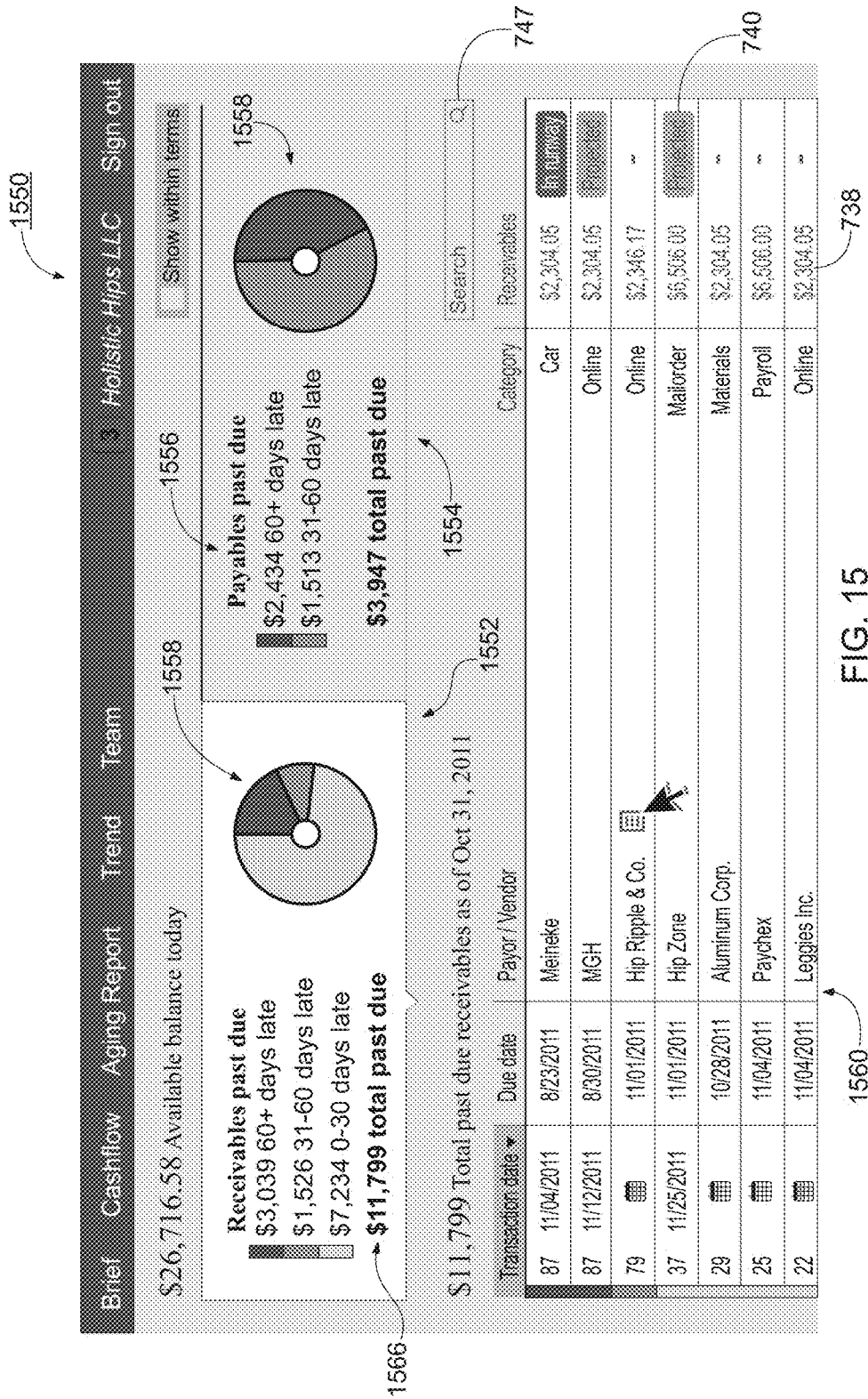
FIG. 15 illustrates a GUI for an Aging Report of an exemplary system.

As shown in FIG. 15, an Aging Report 1550 may be presented as part of or in addition to the cash flow timeline 400. The Aging Report may include a Cash In Past Due section 1552 (shown as "Receivable past due") and a Cash Out Past Due section 1554 (shown as "Payables past due"). Either of these sections 1552, 1554, may include both a textual 1556 and a graphical display 1558 that provides information about past due amounts. As shown in FIG. 14, the Cash In Past Due section 1552 and Cash Out Past Due section 1554 have text 1556 and graphical information 1558. The text 1556 may include a breakdown of a total past due amount for Cash In or Cash Out, along with the total, as shown in FIG. 15. In another embodiment, the Cash In Past Due section 1552 and Cash Out Past Due section 1554 may be displayed in separate windows along with separate display fields for text 1556 and graphical information 1558.

Furthermore, the Aging Report may also include a list of Past Due Transactions 1560 based on which of the Cash In Past Due section 1552 and Cash Out Past Due section 1554, is selected. In the example of FIG. 15, the Past Due Transactions 1560 shown are cash in (shown as "Total past due receivables"). As demonstrated, the Past Due Transactions 1560 are displayed with all the details and information similar to that of the transaction list 414 in FIG. 4 and the interactive spreadsheet view 700 of FIG. 8. For example, the status 740 and amount of past due receivables is shown in 1560. In addition, a search dialog 747 may be provided to search past due transactions.

Additionally, past due transactions may be shaded or color coded in the Past Due section 1552 and Cash Out Past Due section 1554 to provide an aging indicator. For example, one such color code (with shading in parentheses) may be as follows:

Yellow (lightest shading)=1-30 days late (current date exceeds due date by 1-30 days);

Orange (medium shading)=31-60 days late (current date exceeds due date by 31-60 days); and Red (darkest shading)=61 days or greater late (current date exceeds due date by 61 days or greater).

Cash Out Center

FIGS. 16-24 depict exemplary embodiments of a Cash Out center comprising a plurality of selectable UI elements, some of which invoke actions to create, edit, schedule, and delete data objects such as payees and Cash Out transactions such as payments, transfers, and expenses. In embodiments, each of these data objects have a plurality of data fields associated with them, some of which are user editable using the interfaces shown in FIGS. 16-24. The UI elements can also invoke modules and routines that cause system 200 to render the interfaces, windows, modal windows, and dialog boxes shown in FIGS. 16-24 to perform the above-noted actions. Additionally, unconfirmed and confirmed cash out transactions may be color coded to provide an aging indicator. For example, one such color code may be as follows:

Yellow=1-30 days late (current date exceeds due date by 1-30 days);

Orange=31-60 days late (current date exceeds due date by 31-60 days); and

Red=61 days or greater late (current date exceeds due date by 61 days or greater).

FIG. 16 illustrates a graphical user interface ("GUI") for a Cash Out center 1100. As discussed herein, outgoing, Cash Out transactions are not limited to accounts payable for an entity. Similarly, while the transactions are labeled in FIGS. 16-24 alternatively as 'Cash Out' and 'money out' transactions, it is to be understood that the transactions created, edited, scheduled, or committed, and deleted using the interfaces of FIGS. 16-24 are not limited to actual cash transactions as they encompass electronic transfers and can include credit card payments and/or payments from an entity's line(s) of credit.

As shown in FIG. 16, the Cash Out center 1100 provides a consolidated view of future Cash Out transactions 406 that are either un-scheduled or uncommitted Cash Out transactions 1172 or scheduled or committed Cash Out transactions 744, such as payments. The embodiment of the Cash Out center 1100 provided in FIG. 16 does not display past transactions or receivables, but can display some of the same information as the cash flow timeline 400, excluding Cash In transactions 404, such as receivables. In embodiments, the uncommitted Cash Out transactions 1172 and/or committed Cash Out transactions 744 can be color coded. For example, late bills can be colored red, orange, and/or yellow as relative lateness indicators for bills with varying degrees of lateness (i.e., a day, days, a week, or weeks overdue). The Cash Out center 1100 allows a user to create a Cash Out transaction 406, but not a Cash In transaction 404.

With continued reference to FIG. 16, the Cash Out Center 1100 includes a Cash Out header. The Cash Out header 1120 includes high-level account information, such as, for example the account type, balance, and the last few digits of the account number. In accordance with an embodiment, the balance displayed in the Cash Out header 1120 is the amount of funds available today in the account. In a preferred embodiment, when there is more than one account associated with an entity, an expand/collapse button may be displayed adjacent to or within the Cash Out header 1120. By clicking, using an input device 229, an account header drop-down, an actionable list or drop-down menu of the entity's accounts and any linked accounts can be displayed. When a user selects an expand/collapse button to expand the list of accounts, a drop-down list of accounts and linked accounts associated with the entity may be displayed and the user can select one or more of the accounts in the drop-down list to display a Cash Out Center 1100. A user can select another account from the list of accounts and that account's information will then be displayed in the Cash Out center 1100. In cases where multiple accounts are selected, the information displayed in the Cash Out center 1100 may be presented as a consolidated view for the selected accounts. In such cases, un-scheduled or uncommitted Cash Out transactions 1172 and scheduled or committed Cash Out transactions 744 for more than one account can be consolidated in the Cash Out center 1100.

Figure 18:
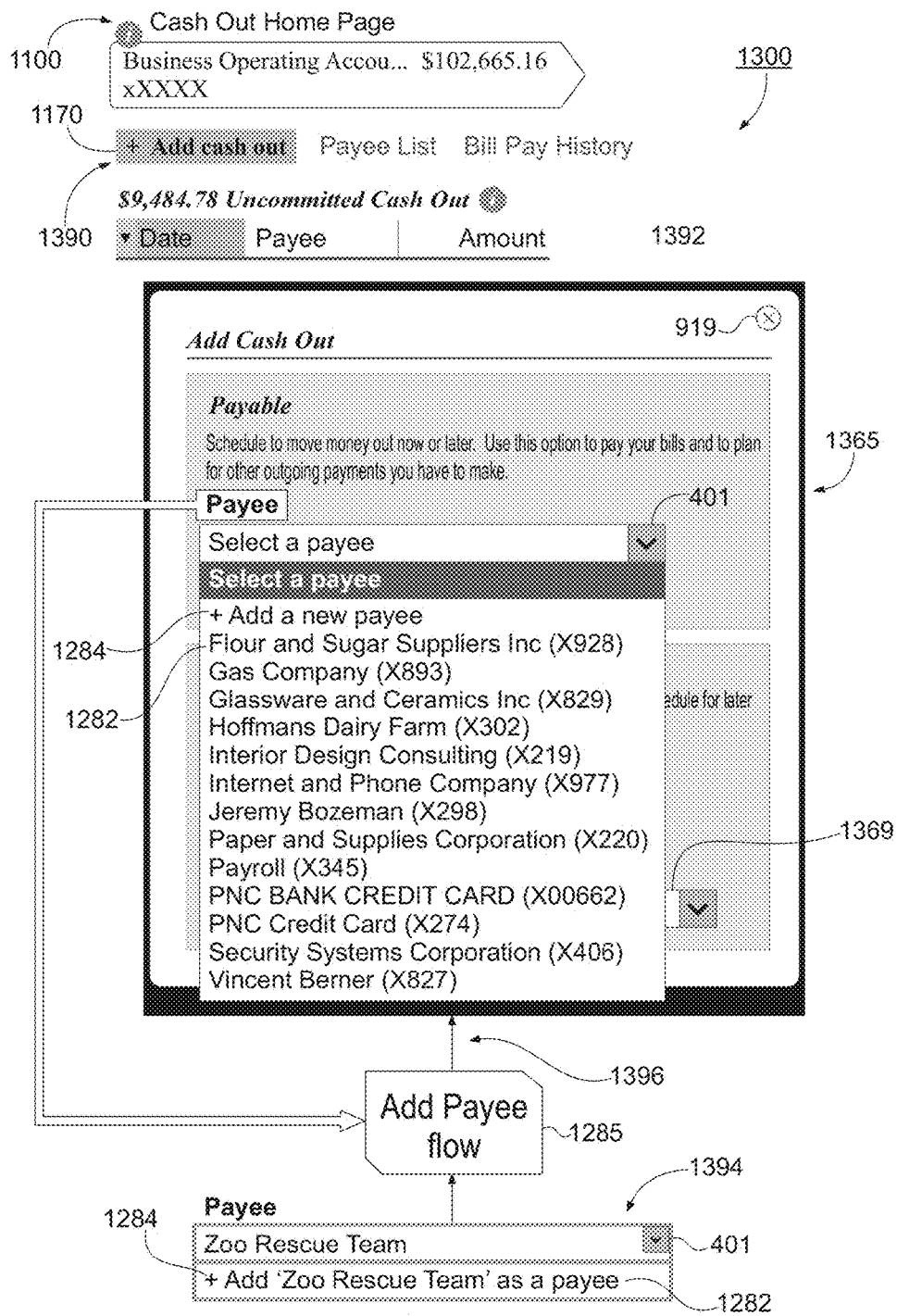

The Cash Out center 1100 can also include an Add Cash Out button 1170 (labeled as 'Add cash out' in the exemplary embodiment of FIG. 16) and a Payee List button 1180 that enables sub-navigation to the Payee List 1282 shown in FIG. 18 and a Bill Pay History button 1181 that enables sub-navigation to Bill Pay History pages. Selecting the Bill Pay History button 1181 can link a user to an online bill payment history interface in an Online Banking interface for the entity or to an enhanced bill pay history interface that displays, among other information, bill reminders for the entity.

An embodiment of the Cash Out center 1100 includes a drag and drop functionality whereby a user can drag an un-scheduled or uncommitted Cash Out transaction 1172 into the scheduled or committed Cash Out transactions 744 and vice versa. The drag and drop functionality can also be used to re-sequence or reschedule transactions within the lists of un-scheduled Cash Out transaction 1172 and scheduled Cash Out transactions 744.

The editable Payees list 1282 is displayable by selecting the Payee List button 1180. Selecting the Payee List button 1180 will allow customers to view and edit payees in an interface or modal window, such as the Payee List window 1282 described below with reference to FIG. 18. In one embodiment, the Payee List window 1282 is populated with payees for payments handled by Fiserv, Inc. or their CashEdge division (formerly CashEdge, Inc.).

As seen in FIG. 16, the Cash Out center 1100 can display a total unscheduled value 1171 for uncommitted Cash Out transactions 1172 and a total committed value 1173 of committed and scheduled Cash Out transactions 744. Although the exemplary Cash Out Center 1100 shown in FIG. 16 labels the total uncommitted or unscheduled value 1171 as "Uncommitted Cash Out" it is to be understood that this total amount can include other unscheduled Cash Out transactions 1172 besides payments. Similarly, while FIG. 16 indicates that the total scheduled value 1173 is for committed payments, it is to be understood that this total amount can include other committed or scheduled Cash Out transactions 744 besides payments.

The Cash Out center 1100 can optionally display uncashed checks with the scheduled Cash Out transactions 744. In one embodiment, the uncashed checks are collapsed by default, but can be listed by selecting the expand/collapse button 401. In another embodiment, uncashed checks are persistently displayed with the scheduled Cash Out transactions 744 (e.g., at the top of the list), but are collapsed/closed by default. In another embodiment, expansion of uncashed checks by selecting the expand/collapse button 401 will show all uncashed checks. In addition, a search dialog 747 allows a user to search for a Cash Out transactions 406 such as uncommitted Cash Out transactions 1172 and committed Cash Out transactions 744.

In accordance with embodiments, the Cash Out center 1100 can display categorizations or groupings of future/scheduled Cash Out transactions 744 by one or more of payee, transaction type (e.g., uncashed checks), category 736 (e.g., Online, Transfer, Check, or Other), and/or status 740 (e.g., Processing, Scheduled, or Committed). In one embodiment, the Cash Out center 1100 is integrated with credit card accounts associated with the entity so that credit card payments are displayed as uncommitted Cash Out transactions 1172 and/or committed Cash Out transactions 744.

In certain embodiments, the expand/collapse buttons 401 in the column headings of the Cash Out center 1100 can be selected within a displayed, expanded list of uncommitted Cash Out transactions 1172 or committed Cash Out transactions 744 to sort the listed Cash Out transactions 406. For example, by right clicking or hovering over the expand/collapse button 401 above the Cash Out transaction dates 732, a user can sort a displayed list in ascending or descending order. Also, for example, numerical sorting can be performed for transaction amounts 738. Further, for example, sorting using the expand/collapse button 401 can be alphabetical for Cash Out transaction descriptions 734 and/or Cash Out transaction status 740.

According to embodiments, the date columns for the lists of uncommitted Cash Out transactions 1172 and committed Cash Out transactions 744 can display a date 732 a Cash Out transaction 406 is expected to be processed. For online bill payments, this transaction date 732 can be a Fiserv expected payment date. (offered by Fiserv, Inc. or their CashEdge division and chosen by the user). For other payments, such as checks and payments in the Other category 736, the transaction date 732 will be the user's expected transaction date (e.g., the date an Automated Clearing House/ACH transaction will hit the entity's account or the date the entity actual prints or writes a check). The due date 733 for a Cash Out transaction 406 can be displayed as date that the payment is due and is not necessarily the same as the transaction date 732.

With continued reference to FIG. 16, the various columns of the exemplary Cash Out center 1100 can display the sortable, selectable data fields described below. The payee column can display the names of payees in the descriptions 734 of un-scheduled Cash Out transactions 1172 and scheduled Cash Out transactions 744. The amount column can display the transaction amounts 738 for the uncommitted Cash Out transactions 1172 and committed Cash Out transactions 744. According to embodiments, the status column can indicate a status 740 of a payment as follows: pre-scheduled payments can be labeled as 'Schedule now' or 'Commit', scheduled or committed payments can be labeled as Scheduled or Committed if the user can still make changes to the transaction, scheduled payments are labeled as Processing if they are online bill payments that are already in-flight. In one embodiment, uncashed checks appear in a collapsed state by default in the committed Cash Out transactions 744 list, but can be expanded to see all by selecting the expand/collapse button 401. As shown in FIG. 16, committed Cash Out transactions 744 can have different transaction categories 736. In the exemplary embodiment of FIG. 16, these transaction categories 736 can be listed in dark gray text underneath the descriptions 734 as one of: Online for online bill pay through Fiserv, Check for a check the entity has issued or written, Transfer for any type of outgoing transfer, and Other for any other scheduled Cash Out transaction 744 that the host institution or host system 12 does not process or cannot track.

Example Methods for Adding and Editing Payees in the Cash Out Center

Figure 17:
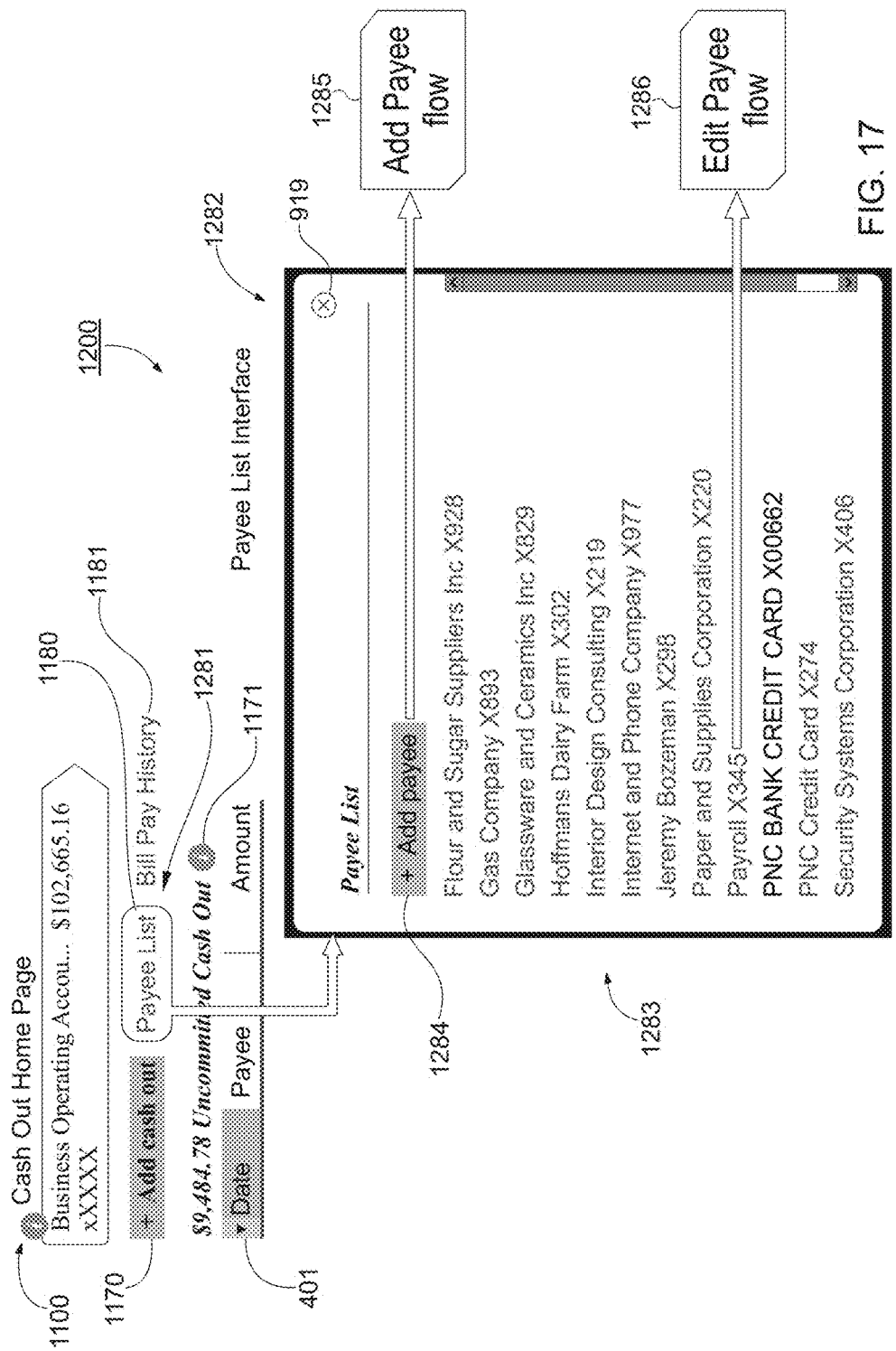
FIGS. 17 and 18 illustrate exemplary embodiments of the GUI shown in FIG. 16 when Payee List and Add Payee user interface (UI) elements are selected.

FIG. 17 illustrates an exemplary embodiments of the GUI shown in FIG. 16 when the Payee List 1180 button is selected in the Cash Out center 1100. FIG. 17 depicts a screen flow for a process 1200 to add or edit a payee from a Payee List interface 1284 from the Cash Out center 1100. In an embodiment, payees displayed in the Payee List interface or window 1282 are listed as selectable hyperlinks, that if selected, display payee information, including any editable payee data fields.

As shown in FIG. 17, the process 1200 starts in step 1281 when a user, using an input device 229, selects the Payee List button 1180 is selected in the Cash Out header. At this point, control is passed to step 1283 where a Payee List window 1282 with an entity's list of existing Payees is displayed. In the exemplary embodiment of FIG. 12, the Payee List window 1282 is a modal window, but it is to be understood that other interfaces, such as a tiled window partially overlaying the Cash Out center 1100 or a dialog box, can be used to perform this step. In step 1283, a determination is made as to whether a selection of the Add payee button 1284 has occurred. If it is determined that a user has selected the Add payee button 1284 in the Payee List window 1282, control is passed to step 1285. Otherwise, if it is determined that a user has selected a payee to edit from the Payee List window 1282, control is passed to step 1286.

In step 1285, a process for adding a payee is performed. In an embodiment, the add payee process 1285 involves displaying one or more tiles or windows, such as modal windows, to enable a user to enter payee information for a new payee, such as, but not limited to the payee name, account(s) associated with the payee (see, e.g., the payee account 1369 in FIGS. 18 and 20), and other payee preferences and information such as payment terms, due dates 733, accepted payment types/modes, early payment incentives, late payment penalties, etc. In one embodiment, adding a payee in this step involves a process similar to the data screen flow for adding a transfer or expense shown in FIGS. 3A and 3B. A user can return to the Payee List window 1282 to add additional payees by repeating steps 1281-1285. After the user has added the final or only payee in step 1285, the process 1200 ends.

In step 1286, a process for editing a payee is performed. In an embodiment the edit payee process performed in this step involves displaying one or more tiles or windows, such as modal windows, to enable a user to edit payee information for a selected, existing, payee ('Payroll X345' in the example of FIG. 17). In one embodiment, step 1286 involves a process similar to the data/screen flow for in line editing of a transfer or expense shown in FIGS. 3A and 3B. A user can return to the Payee List window 1282 to edit additional payees by repeating steps 1281-1286. After the user has finished editing the payee(s) selected in step 1283, the process 1200 ends.

Adding a Payee when Scheduling a Transaction in the Cash Out Center

FIG. 18 depicts an exemplary embodiment of the GUI shown in FIG. 17 when the Add Payee button 1284 is selected. In particular, FIG. 18 shows steps of a process 1300 for adding a payee while using an Add Cash Out interface 1365 to add an expense. Although FIG. 13 shows an embodiment of the process 1300 in the context of adding an expense, it is to be understood that the process 1300 can be used to add a payee when adding other types of Cash Out transactions 406, such as, but not limited to, payments and outgoing transfers.

The process 1300 begins in step 1390 when a user clicks on the Add Cash Out button 1170 (labeled as 'Add cash out' in the exemplary embodiment of FIG. 18). As shown in FIGS. 16 and 18, in one embodiment, this step can be initiated from the Cash Out Center 1100. In an alternative embodiment, step 1390 can be initiated from the cash low timeline 400 after the Add transaction button 403 is selected and the Add cash out button 1170 is selected from the resulting dialog box in the cash low timeline 400. After the Add cash out button 1170 has been selected, control is passed to step 1392.

In step 1392, the Add Cash Out interface 1365 is displayed with a Payee List window 1282 rendered within it as a drop-down list. In the embodiment shown in FIG. 18 the Add Cash Out interface 1365 is a modal window, but it is to be understood that other interfaces, such as a tiled window partially overlaying the Cash Out center 1100 or a dialog box, can be used to perform step 1392. In the non-limiting, exemplary embodiment of FIG. 18, the Add payee button 1284 is displayed under the Expense header of the Add Cash Out interface at the top of the drop-down Payee List window 1282 and labeled "Add a new payee", but it is to be understood that other Add payee buttons 1284, icons, or selectable UI elements can be displayed within the Add Cash Out interface 1365. In this step, a determination is made as to whether a selection of the Add payee button 1284 has been received. If it is determined that a user has selected the Add payee button 1284, control is passed to step 1285, which is performed as described above with reference to process 1200 of FIG. 17.

After step 1285 has completed, control is passed to step 1396. Alternatively, if it determined that if the user has begun to type in a name of a new payee in the Payee List window 1282 that does not exist, control is passed to step 1394. Otherwise, the Add Cash Out interface 1365 remains displayed so that the user can select a payee account 1369 from a drop-down list or dialog box that the expense will be paid to. Payee accounts 1369 can be displayed as a drop-down list, sorted, and selected in the Add Cash Out interface 1365 by clicking on the expand/collapse button 401.

In step 1394, user input is accepted to add a payee in the Payee List window 1282 with a user-entered or user-supplied payee name. In the embodiment shown in FIG. 18, after the payee name has been supplied or entered and it has been determined that the payee name is new, the Add payee button 1284 is displayed adjacent to the new name (e.g., 'Zoo Rescue Team' in the example of FIG. 18). Upon receiving a selection of the Add payee button 1284 in step 1394, control is passed to step 1285 where the new payee is added as described above with reference to FIG. 17. After step 1285 has completed, control is passed to step 1396.

In step 1396, the user is returned to the Add Cash Out interface 1365 and the Payee List window 1282 is refreshed to include the newly-added payee. At this point, the user can select the newly-added payee from the Payee List window 1282 for the expense being created in the Add Cash Out interface 1365, select a payee account 1369 to send the expense to, add additional payees, or end the process 1300.

Editing a Payee when Scheduling a Transaction in the Cash Out Center

FIG. 19 illustrates an exemplary embodiment of the GUI shown in FIG. 16 when the Edit Payee button 1466 is selected. In particular, FIG. 19 shows steps of a process 1400 for using an Edit Expense interface or window 1465 invoked from the Cash Out Center 1100 to edit a payee when scheduling and/or editing an expense. According to an embodiment, the Edit Expense window 1465 is displayed in response to receiving a selection of a Cash Out transaction 406 from the Cash Out Center 1100. In certain embodiments, such selections can be made when a user, using an input device 229, clicks on a transaction date 723, a due date 733, a transaction description 734 (i.e., a hyperlink for the payee and/or transaction category 736), an amount 738, or a status 740 of an un-scheduled Cash Out transaction 1172 or a scheduled Cash Out transactions 744 displayed in the Cash Out center 1100. In another embodiment the Edit Expense window 1465 is displayed when a user, using an input device 229 or gesture, mouses or hovers over a transaction in the spreadsheet view 700 to initiate editing of a transaction.

The payee editing process 1400 begins in step 1402 when the Edit Payee button 1466 is selected while a user is scheduling or editing an expense. In an embodiment, step 1402 can be initiated when step 317 of process 301 is performed. After the Edit Payee button 1466 is selected, control is passed to step 1286, which is performed as described above with reference to FIG. 17. As described above with reference to the exemplary embodiment of FIG. 17, step 1286 can comprise presenting one or more modal windows to prompt a user to edit and enter payee information for the expense being edited. After step 1286 completes, control is passed to step 1404.

In step 1404, the user is returned to the Edit Expense window 1465 after the user is finished editing a payee so that the expense details can be edited. As shown in FIG. 19, data entry for the following fields can be received in the Edit Expense window 1465 in this step. In an embodiment, the data entry is received from a user of a client 14 using an input device 229. An amount 738 for the expense is received. In embodiments, this is a required, mandatory field and has a maximum value, which can be adjusted by the host system 12. In one embodiment, the maximum value may be $999,999,999.99. A due date 733 can also be received via the Edit Expense window 1465. In embodiments, this is a mandatory field (i.e., that cannot be left blank, empty, or null) and can be a date from the past.

With continued reference to FIG. 19, a transaction date 732 can also be entered in the Edit Expense window 1465. According to embodiments, this is a required field that initially defaults to a due date 733, but can be changed by a user. The transaction date 732 can be the current day (e.g., today) or in the future. In a preferred embodiment, a recurring checkbox can also be selected in the Edit Expense window 1465 to select a recurring option for the payment or expense. In such an embodiment, if the recurring checkbox is selected, it will be applied to both the transaction date 732 and the due date 733. For example, a recurring expense with a transaction date 732 of May 8 and due date 733 of May 10 with a monthly recurrence one month recurring would mean next payment will have a transaction date 732 of June 8 and a due date 733 of June 10. In other embodiments, other UI elements may perform the same functions as the recurring checkbox.

Upon detecting that a selection for a recurring cash out transaction has been made, recurring transaction fields 1409 may be displayed in the Edit Expense window 1465. The recurring transaction fields 1409 can include, but are not limited to, a payment frequency, a duration for the recurring payment, and termination date for the recurring payment. In the exemplary embodiment of FIG. 19, a recurring time increment 611 is displayed with the recurring transaction fields 1409 and an Edit recurring payment element 1467 may enable a user to select an increment of time (e.g., daily, weekly, monthly, quarterly, semiannual, or yearly) for the payment frequency and radio buttons and data entry fields are used to indicate whether the payment should be repeated for the selected payment frequency indefinitely, for a set number of payments, or until a specified date. In addition, an optional note 1411 field can be entered as free text or from a drop-down of previously used notes to indicate any details the entity or user wishes to memorialize for the expense.

After the desired expense details have been entered, the Save button 1413 can be selected to save the changes as an uncommitted cash out transaction so that cash out transaction will added as a placeholder. The Commit now button 955 can be selected to save and run the edited expense now as described above with reference to step 315 of method 301 of FIG. 3B and method 900 of FIG. 11. Alternatively, the edits to the transaction since the last time it was saved can be discarded without saving by selecting the delete button 919 or the transaction can be deleted entirely by selecting the delete transaction button 1419.

As described below with reference to FIG. 20, the above-described data fields can also be entered and edited in the Add Cash Out window 1365 as part of a process 1500 for adding Cash Out transactions such as expenses and outgoing transfers.

Example Methods for Adding Cash Out Transactions

The system will enable the user to select an historical, scheduled, or committed transaction, by hovering or clicking on a row in a list within the Cash Flow Timeline Utility or Account Activity, or other utility within the Online Banking experience. The selected transaction can then be specified to recur one or more times, via modal prompting for additional information such as future date, frequency, duration, amount, payee/biller or customer or other description (e.g., payroll net pay, payroll taxes, merchant services, owner bonus, SEP investment). It will also have the ability to search for additional past recurrences of the transaction, based on criteria chosen by the user such as transaction description, from within the accessible history and supply an average amount and average frequency to assist in the assignment of values for future dated transactions.

Additionally, if the historical, scheduled, or committed transaction is classified as a "Cash Out" transaction, the default selection for the future dated transactions modeled after the historical, scheduled, or committed transactions will be "Cash Out," although the user has the ability to override the default transaction type to "Cash In." If the historical, scheduled, or committed transaction is classified as a "Cash In" transaction, the default selection for the future dated transactions modeled after the historical, scheduled, or committed transactions will be "Cash In," although the user has the ability to override the default transaction type to "Cash Out." The originating transaction(s) (historical, scheduled, or committed) upon which the newly created transaction is modeled will be hyperlinked to the new transaction.

Figure 21:
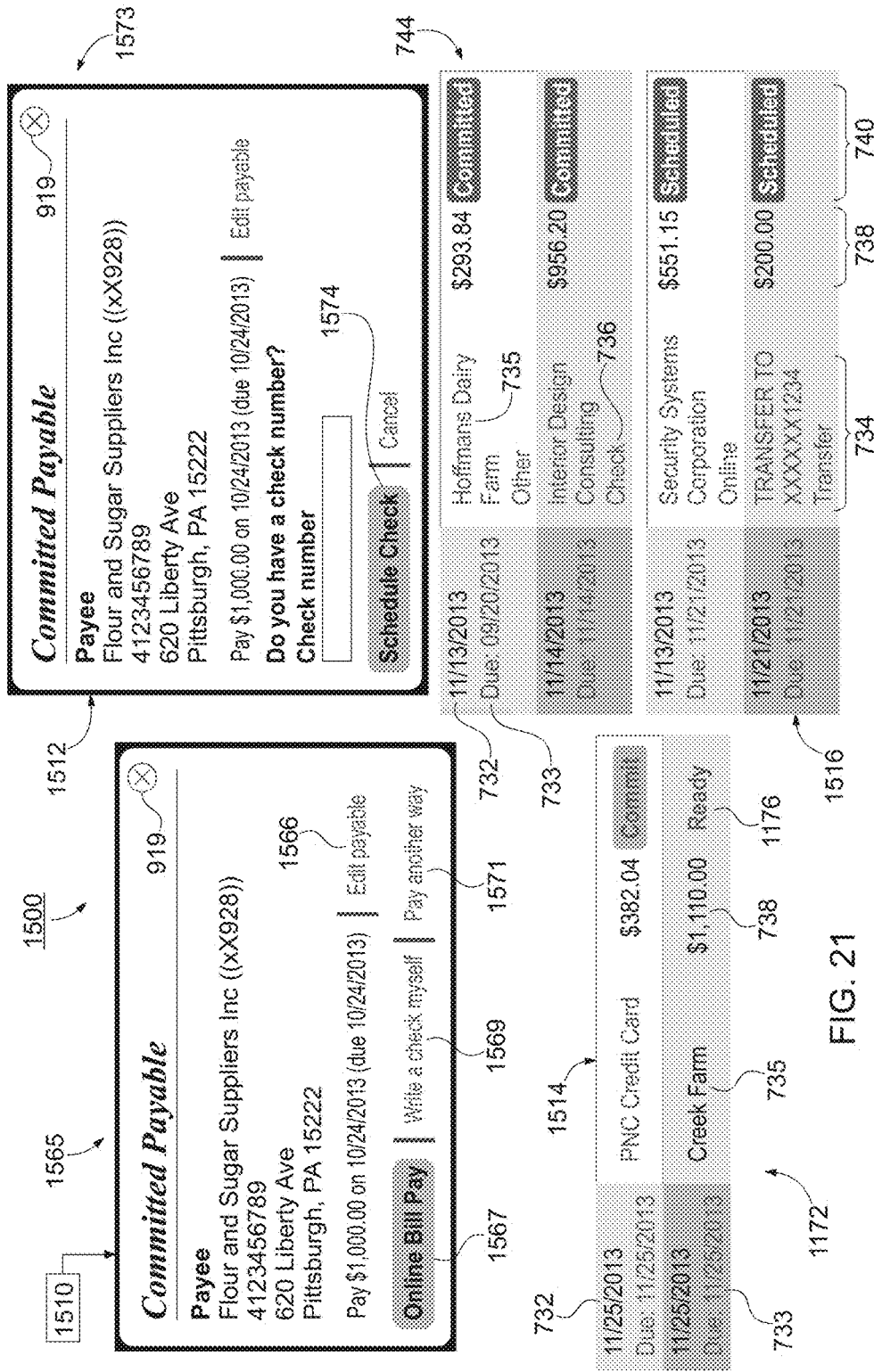

FIGS. 20 and 21 illustrate exemplary embodiments of the GUI shown in FIG. 16 when the Add Cash Out button 1170 is selected. In particular, FIGS. 20 and 21 depict an interface and logic flow for a process 1500 for adding, editing, and scheduling a Cash Out transaction 404, such as an expense or an outgoing transfer, from the Cash Out center 1100. In an alternative embodiment, the process 1500 and the interfaces shown in FIGS. 20 and 21 can be invoked from the cash flow timeline 400 by invoking the Add transaction button 403. Although the example embodiments of FIGS. 20 and 21 depict adding, editing, and scheduling an expense or an outgoing transfer, it is to be understood that similar interfaces and steps can be used to add, edit, schedule, commit, un-schedule, and uncommit other Cash Out transactions 404 discussed herein.

The process 1500 begins as shown in FIG. 20 with step 1502 when a user selects the Add transaction button 403 and the Add Cash Out button 1170 from the cash flow timeline 400 or the Add Cash Out button 1170 in the Cash Out center 1100. Either selection passes control to step 1504. In step 1504, an Add Cash Out window 1365 is displayed with an expense portion or pane comprising a selectable Payee List window 1282, which is embodied as a drop-down list in FIG. 20, and can be used to select or add a payee.

As described above with regard to FIGS. 17 and 18, if a payee for the expense has yet to be saved as a payee in the Payee List window 1282, a new payee can be added via selection of a blank field in the payee drop-down 1282 or by typing in a new payee name that does not exist in the Payee List 1282 for the entity. As shown in FIG. 20, in step 1504, a payee account 1369 to transfer funds from can be selected from a payee account 1369 drop-down list displayed within an Internal Transfer pane. In one embodiment, the list of selectable payee accounts 1369 is limited to internal accounts affiliated with the host institution or host system 12. In an alternative embodiment, the list of selectable payee accounts 1369 can include external, foreign accounts associated with the entity, but unaffiliated with the host institution or host system 12. In response to receiving indication of selections (or creation) of a payee in the Payee List 1282 and a payee account 1369 from the account drop-down menu in the Add Cash Out window 1365, control is passed to step 1506.

In step 1506, data entry for the following Cash Out transaction 406 (e.g., for an expense in the example of FIG. 20) fields can be received. In an embodiment, the data entry is received from a user of a client 14 using an input device 229. An amount 738 for the expense can be received in this step. In embodiments, this is a required, mandatory field and has a maximum value, which can be adjusted by the host system 12. In one embodiment, the maximum value is $999,999,999.99. In this step, a due date 733 can also be received. In embodiments, this is a required, mandatory field and can be a date from the past. In step 1506, a transaction date 732 can also be received. In embodiments, this is also a required field that initially defaults to a due date 733, but can be changed by a user. The transaction date 732 can be the current day (e.g., today) or a date in the future. A recurring checkbox 748 can also be selected in this step to select a recurring option for the payment or expense. If the recurring checkbox 748 is selected, it will be applied to both the transaction date 732 and the due date 733 for the payment. For example, a recurring expense with a transaction date 732 of May 8 and due date 733 of May 10 with a monthly recurrence one month recurring would mean next payment will have a transaction date 732 of June 8 and a due date 733 of June 10. Lastly, an optional note 1411 field can be entered as free text or from a drop-down of previously used notes to indicate any details the entity or user wishes to memorialize for the expense. After the data entry and selections are complete, control is passed to step 1508. In embodiments noted above with required data fields, a user cannot continue to step 1508 without entering valid values for the required fields.

In step 1508, after the desired expense details have been entered, the Save for Later button 1413 can be selected to save newly-added expense or the Schedule now button 955 can be selected to save and run the new expense transaction now as described above with reference to step 315 of method 301 of FIG. 3B and method 900 of FIG. 11. If the Save for Later button 1413 is selected, control is passed to step 1510, which is depicted in FIG. 21. Otherwise, selection of the Commit now button 955 will schedule the expense to be run immediately and control will be passed to step 1516, which is also depicted in FIG. 21. Otherwise, the user can optionally cancel creation of the expense by clicking on the cancel icon 919 (depicted as an 'X' in the example embodiment of FIG. 20), which ends the process 1500.

As shown in FIG. 21, the process 1500 continues with step 1510 when, in response to detecting that a user has selected the Save for Later button 1413, the user is presented with a Schedule Cash Out window 1565 that enables selection one of the payment options using the buttons discussed in the following paragraphs.

In the exemplary embodiment of FIG. 15B, the Schedule Cash Out window 1565 is a modal window entitled 'Committed Payable,' but in alternative embodiments, other interfaces can be used can be used to schedule, commit, un-schedule, and uncommit expenses, outgoing transfers, and other Cash Out transactions 406. For example, in the case of a Cash Out transaction 406 that is a recurring, outgoing payment via Fiserv, sub-navigation to interfaces displayed as tiles partially overlaying the Schedule Cash Out window 1565 or in other, separate modal windows, can enable the user to edit a Cash Out transaction 406 such as an expense. A user can edit just a single payment, edit recurring payments which edits the recurring transaction fields 1409, un-schedule or uncommit a single payment, and/or un-schedule or uncommit all recurring payments that are part of a recurring payment. While the UI elements of the Schedule Cash Out window 1565 are shown as buttons and links, in alternative embodiments, other actionable, interactive, and selectable UI elements can be used. The Schedule Cash Out window 1565 includes an Edit Payable link 1566, which, if selected by a user, causes the Edit Payable window 1465 described above with reference to FIG. 19 to be displayed so that the user can edit data for the expense that is being scheduled or committed.

In step 1510, if the user clicks on the Online Bill Pay button 1567, an error message may be displayed if the transaction date 732 is too soon in the future to be satisfied within the constraints of the entity's or host system's 12 online bill payment system. If the online bill payment requires processing time such that the transaction's due date 733 cannot be met, an error may be displayed in the Schedule Cash Out window 1565. Otherwise, selection of the Online Bill Pay button 1567 sets up the expense to be paid through an online billing system used by the entity, which may be offered by the host institution. In one embodiment, if a user clicks on the Online Bill Pay button 1567, the first payment and all subsequent payments will be scheduled through Fiserv and any recurring payment details (i.e., entered as recurring transaction fields 1409) will be held on the Fiserv side and not on the host system 12.

If the Write a check myself 1569 button is selected at step 1510, an optional step 1512 may be executed. In step 1512, a check window 1573 is displayed to allow the user to provide a check number and to schedule a payment of the check using a schedule check button 1574. While the check window 1573 is depicted as a modal window in FIG. 15B, it is to be understood that other types of interfaces, such as a dialog box or tile partially overlaying the Schedule Cash Out window 1565 can be rendered to prompt a user for a check number. In one embodiment, the check window 1573 allows the user to enter a check number for a first payment and schedule the first check payment, but then all subsequent payments will come in with a status 740 of Un-scheduled or Uncommitted. For a recurring check payment, the second payment will appear immediately with the un-scheduled or uncommitted cash out transactions 1172 and will be populated with the recurring transaction fields 1409.

In step 1510, if the Pay another way 1571 button is selected, this will enable the user to provide alternative payment methods, such as, but not limited to, a PayPal™ account, a personal credit card account not linked to the entity, or other payment forms that do not fall under the Online bill payment or check categories. After the payment options are selected and entered (including check options for optional step 1512 as needed), control is passed to step 1514.

In step 1514, the newly-created expense entry appears in the uncommitted Cash Out transactions 1172 of the Cash Out center 1100 with the appropriate status indicator in the transaction status 740. In an alternative embodiment, the new expense can also be depicted in the spread sheet portion 700 of the cash flow timeline 400 as a scheduled or committed Cash Out transaction 744. In this step, if the new expense entry has been saved using the Save for later button 1413 in step 1508, it will be displayed with uncommitted Cash Out transactions 1172 with status indicator in the transaction status 740 indicating an unscheduled or uncommitted transaction and the process 1500 ends.

In step 1516, when the user selected the Schedule now button 955 for the new entry in step 1510, a check payment has been scheduled in step 1512, or the Cash Out transaction 406 has subsequently scheduled for a future transaction date 732 using the Schedule button 1176, the entry will be displayed with either the scheduled Cash Out transactions 744 of the Cash Out center 1100 or with the scheduled Cash Out transactions 744 with a status 740 of Scheduled in the spreadsheet view 700 and the process 1500 ends.

Example Process for Scheduling a Payment in the Cash Out Center

Figure 22:
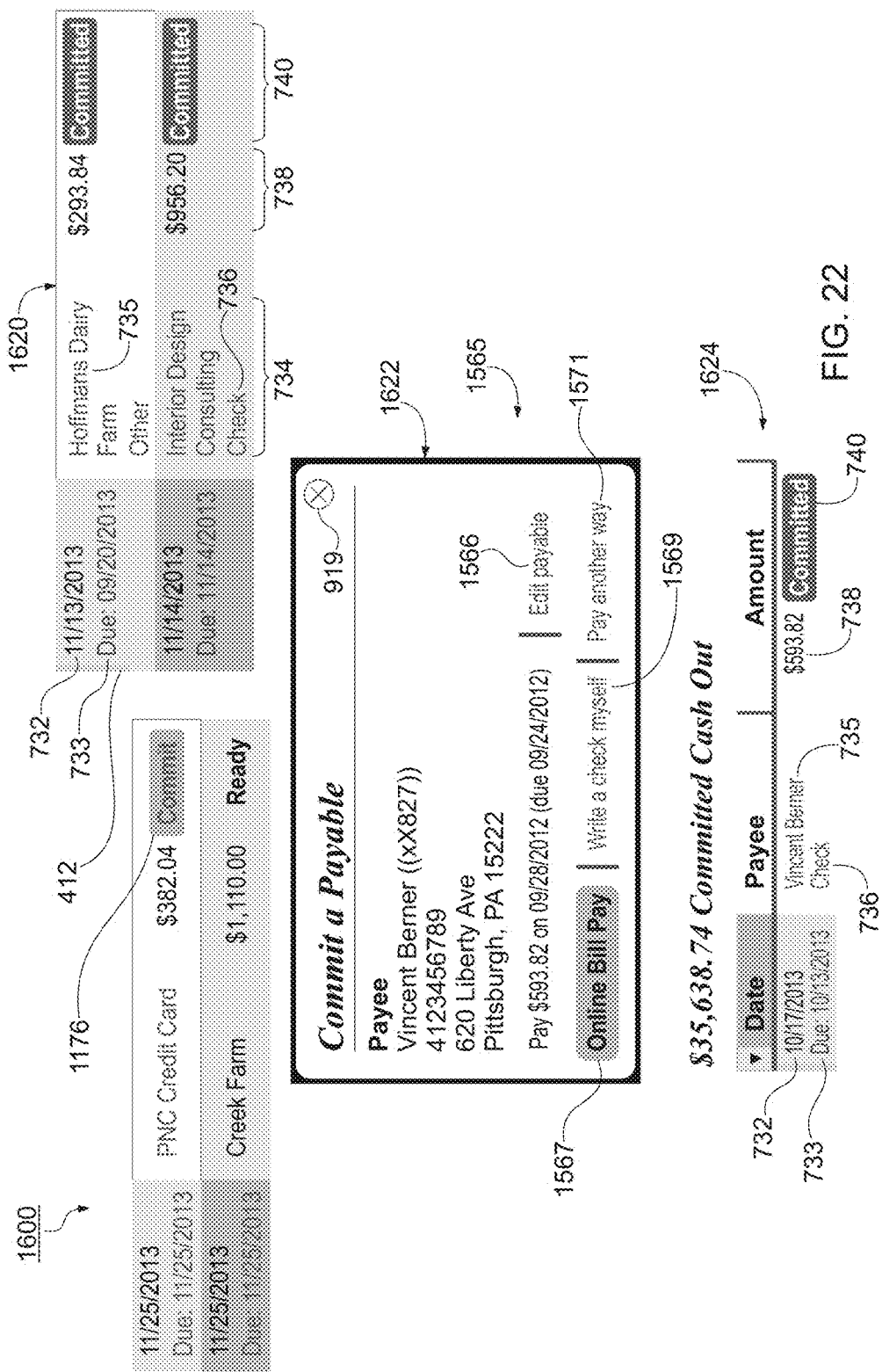
FIG. 22 illustrates exemplary embodiments of the GUI shown in FIG. 16 when a Commit Payment UI element is selected.

FIG. 22 illustrates an exemplary embodiment of a Cash Out center interface for scheduling, committing, un-scheduling, or uncommitting a payment. In particular, FIG. 22 illustrates the interfaces used for a process 1600 for scheduling and un-scheduling payments listed in either the uncommitted Cash Out transactions 1172 or committed Cash Out transactions 744 of the Cash Out center 1100.

The process 1600 begins in step 1620, when a Commit button 1176 is selected for a transaction in the uncommitted Cash Out transactions 1172 or when a committed transaction is selected for editing (i.e., rescheduling or un-scheduling) from the committed Cash Out transactions 744. In an embodiment, the status 740 in the committed Cash Out transactions 744 may be a selectable button, and upon selecting a button for a status 740 for a transaction that has been scheduled, but is not in a paid category, or that is in a pending category and has not begun processing (e.g., is not in the processing category), the previously-scheduled transaction can be re-scheduled using the process 1600. After a payment transaction has been selected for scheduling or un-scheduling, control is passed to step 1622.

In step 1622, the Schedule Cash Out window 1565 is presented with buttons to select one of the following payment options, which are described above with reference to FIG. 21, Online Bill Pay 1567, Write a check myself 1569, and Pay another way 1571. After a selection of a payment option is received, control is passed to step 1624.

In step 1624, status 740 in the payment transaction item is displayed as "Committed" for the scheduled Cash Out transaction 744 in the spreadsheet view 700 of the cash flow timeline 400 and/or in the scheduled Cash Out transactions 744 of the Cash Out center 1100. In either embodiment, the payment method selected in step 1622 using the Schedule Cash Out window 1565 (i.e., "Check" in the example shown in FIG. 22) is indicated in the transaction category 736.

Figure 23:
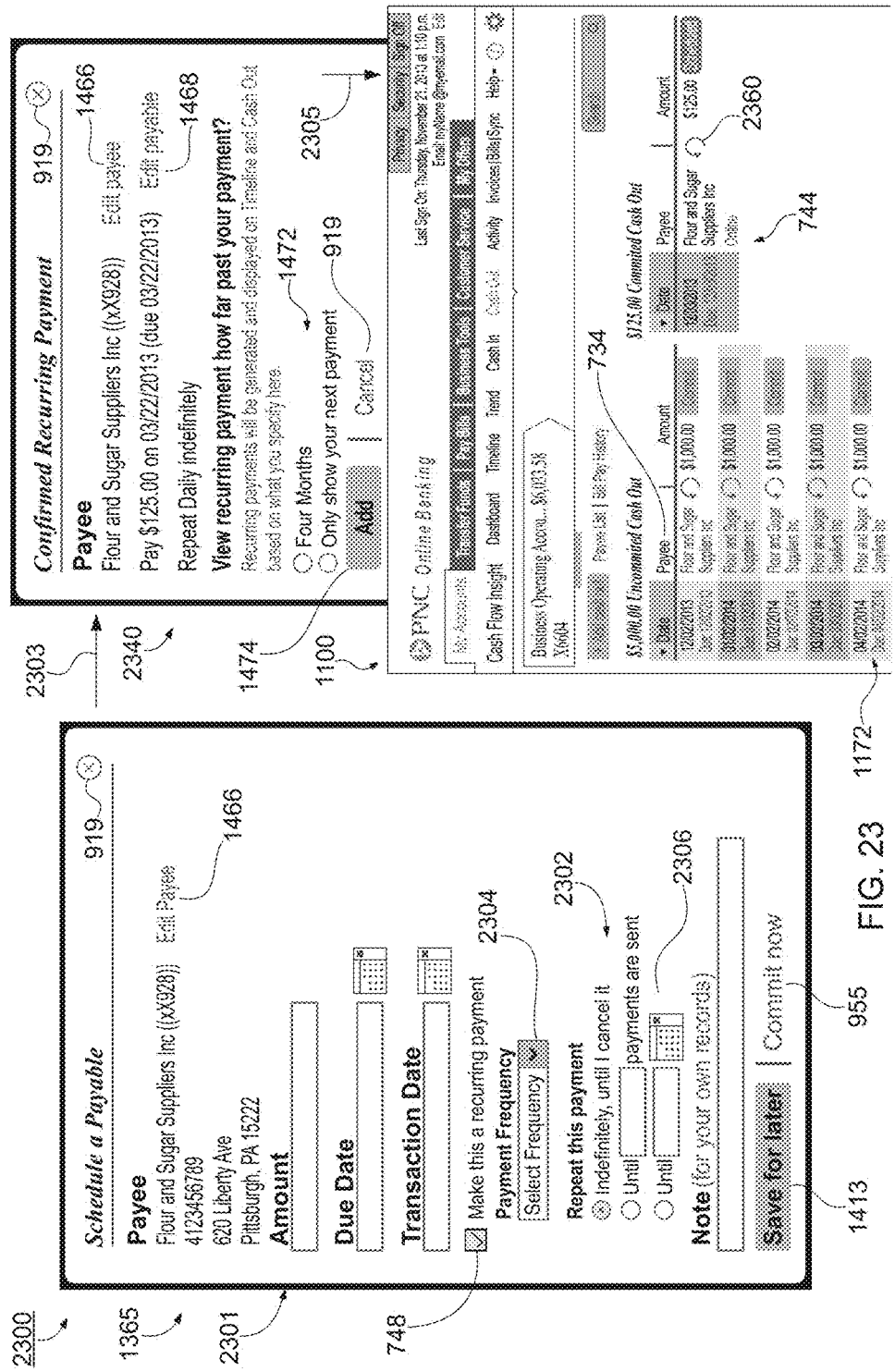
FIG. 23 illustrates exemplary embodiments of the GUI when a Schedule Recurring Payment UI element is selected.

FIGS. 23 and 24 illustrate embodiments of the processes dealing with scheduling and interfaces for editing a recurring cash out transaction. FIG. 23 demonstrates process 2300 for scheduling a recurring cash out transaction, which begins with step 2301 in which a user enters information in the Add Cash Out interface 1365 as described above with regard to FIGS. 20 and 21. Upon checking the recurring payment checkbox 748, the user is then able to input information about the Recurring payment parameters 2302. In the embodiment shown in FIG. 23, this includes a payment frequency 2304 field and a time limits 2306 fields for repetition of the payment. The payment frequency 2304 field includes a drop down selection menu as shown in FIG. 23, however, in other embodiments the payment frequency may input in any acceptable way known to one of ordinary skill. Similar inputs may be provided for the time limits for repetition of a payment.

After the Recurring payment parameters 2302 are input, a user can then select the Save for later button 1413 or the Commit now button 955. By selecting the Save for later button the recurring payment is saved as a placeholder. By selecting the Commit now button 955, control passes in step 2303 to the Confirmed Recurring Payment window 2340. As shown in FIG. 23, the Confirmed Recurring Payment window 2340 contains an Edit payee element 1466 and a Edit payable element 1468, which link to the process for editing a payee and payable with regard to FIG. 19, respectively. The Confirmed Recurring Payment window 2340 also contains view recurring payment fields 1472 for viewing recurring payments past the initial payment. According to the example of FIG. 23, the fields 1472 consist of a option of two selections, one for up to four months out and one for only showing the next payment. However, the view recurring payment fields 1472 may be much more broadly defined and supplied as would be understood by one of ordinary skill. For example, in a preferred embodiment the time period for how far out a recurring payment may be viewed may be daily, weekly, monthly, quarterly, semi-annually, annually, etc. The fields 1472 may be user defined or provided by the host institution.

As shown in FIG. 23, a user may cancel scheduling a recurring cash out transaction by selecting the circle X 919 in the corner of the Add Cash Out interface 1365 or the Confirmed Recurring Payment window 2340. Additionally, the same effect may be accomplished by selecting the cancel element 919 at the bottom of the Confirmed Recurring Payment window 2340. Cancellation may be affected in various other ways as would be understood by one of ordinary skill as well. Alternatively, if a user decides to the select the Add element 1474 in the Confirmed Recurring Payment window 2340, in step 2305, the recurring cash out transaction appears in the Cash Out center 1100. Depending on whether the recurring cash out transaction is uncommitted or committed it will appear in the un-scheduled Cash Out transactions 1172 and scheduled Cash Out transactions 744 accordingly. In the preferred embodiment shown in FIG. 23, a recurring transaction will be indicated with a recurring transaction icon 2360 that appears in the vicinity of the description 734 of the transaction. While not shown in FIG. 23, upon selection of the Add element 1474, the recurring cash out transaction may appear in the appropriate location of the spreadsheet section 700, as described.

As shown in FIG. 24 interfaces 2410 and 2420 allow for editing a recurring cash out transaction, either in a single instance or over all of the payments of the recurring cash out transaction, respectively. Similar to the Edit Expense window 1465 discussed with regard to FIG. 19, the Edit Recurring Payment single instance window 2410 contains fields for the Payee, Amount, Due Date, and Note. Window 2410 also includes the Edit Payee element 1466, Recurring Payment Details 1409, and Edit recurring payment element 1467.

In addition, by selecting the Save element 2412, the details provided for in the fields of window 2410 will modify the single instance of the recurring cash out transaction that was selected to activate window 2410. By selecting the Delete element 2414, the single instance of the recurring cash out transaction that was selected to activate window 2410 may be removed. Additionally, selecting the delete button 919 will close window 2410.

Similar to the Edit Recurring Payment all payments window 2420 contains fields for the Payee, and Amount. In another preferred embodiment, fields such as Due Date and Note may also be included. Window 2420 also includes Recurring Payment Details 1409 which include details about next payment and the time limit for which a payment recurs. By selecting the Save element 2412 in window 2420, the details provided for in the fields of window 2420 will modify all instances of the recurring cash out transaction that was selected to activate window 2420. By selecting the Delete recurring element 2414 in window 2420, all instances of the recurring cash out transaction that was selected to activate window 2420 may be removed. Additionally, selecting the cancel element or delete button 919 will close window 2410.

In a preferred embodiment, a selection option for window 2410 or window 2420 may be activated by selecting an icon 2360 that indicates a recurring transaction. In another preferred embodiment windows 2410 and 2420 may activated sequentially by selecting an icon 2360 that indicates a recurring transaction.

According to further embodiments, the Cash Out center 1100 includes additional interfaces and windows (not shown) for changing transaction due dates and deleting transactions. For example, the Cash Out center 1100 can include an interface similar to the transaction editing interfaces shown in FIGS. 10 and 11 to allow in-line editing of transactions directly from the uncommitted Cash Out transactions 1172 and committed Cash Out transactions 744 so that a transaction date 732 or a due date 733 on a bill can be changed.

For example, as described above with reference to FIG. 10, when a user navigates to, or hovers or mouses over a transaction amount, a dotted line can be displayed appear and the cursor can change to show the user the amount can be selected for editing. Once the user selects a new amount, the amount in currency units (i.e., US dollars in the exemplary embodiment of FIG. 10) will populate in that field and change the bill.

Similarly, as described above with reference to FIG. 11, when a user navigates to or hovers or mouses over either a transaction date 732 or due date 733, a dotted line can be displayed appear and the cursor can change to indicate to the user that the date can be selected and edited. At this point, an interactive calendar can be displayed above the date to allow the user to choose a new date. Once the user selects a new date, the date will populate in that field and change the bill. As described above with reference to FIG. 11, when a user mouses or hovers over a line item, the "X" delete button 919 can appear, for example, in the top right corner as shown in the exemplary embodiment of FIG. 11. The delete button 919 may have a different appearance and different functionality depending on its context.

Cash in Center

FIGS. 25-29 depict exemplary displays of a GUI for a Cash In center. FIG. 25 illustrates a graphical user interface (GUI) for a Cash In center 1700 of an exemplary system. As discussed herein, incoming, Cash In transactions are not limited to accounts payable for an entity. Similarly, while the transactions are labeled in FIGS. 25-29 alternatively as 'Cash In' and 'money out' transactions, it is to be understood that the transactions created, edited and deleted using the interfaces of FIGS. 25-29 are not limited to actual cash transactions as they encompass electronic transfers and can include incoming payments from a merchant credit card account, incoming transfers, and/or payments from an entity's line(s) of credit.

As shown in FIG. 25, the Cash In center 1700 provides a consolidated view of future Cash In transactions 404 that are either unconfirmed Cash In transactions 1772 or Confirmed Cash In transactions 1774 such as incoming transfers and receivables. Additionally, similar to the above description for the Cash Out center and Aging Report, unconfirmed and confirmed cash in transactions may be color coded to provide an aging indicator. For example, one such color code may be as follows:

Yellow=1-30 days late (current date exceeds due date by 1-30 days);

Orange=31-60 days late (current date exceeds due date by 31-60 days); and

Red=61 days or greater late (current date exceeds due date by 61 days or greater).

The embodiment of the Cash In center 1700 provided in FIG. 25 does not display past transactions or receivables, but can display some of the same information as the cash flow timeline 400, excluding Cash Out transactions 406 such as payments and outgoing transfers. In embodiments, the unconfirmed Cash In transactions 1772 and/or Confirmed Cash In transactions 1774 can be color coded. For example, past due receivables can be colored red, orange, and/or yellow as relative lateness indicators for bills with varying degrees of lateness (i.e., a day, days, a week, or weeks overdue). The Cash In center 1700 allows a user to create a Cash Out transaction 406, but not a Cash Out transaction 406.

With continued reference to FIG. 25, the Cash In Center 1700 includes a Cash In header 1782. The Cash In header 1782 includes high-level account information, such as, for example the account type, balance, and the last few digits of the account number. In accordance with an embodiment, the balance displayed in the Cash In header 1782 is the amount of funds available today in the account. This is understood to be the same amount shown as 'Available Today' and/or as an available balance in an 'Accounts Summary Page' of a docking interface for the entity.

When there is more than one account associated with an entity, an expand/collapse button may be displayed adjacent to or within the Cash In header 1782. By clicking, using an input device 229, an account header drop-down, an actionable list or drop-down menu of the entity's accounts and any linked accounts can be displayed. When a user expands the list of accounts, a drop-down list of accounts and linked accounts associated with the entity may be displayed and the user can select one or more of the accounts in the drop-down list to display a Cash In center 1700 for. A user can select another account from the list of accounts and that account's information will then be displayed in the Cash In center 1700. In cases where multiple accounts are selected, the information displayed in the Cash In center 1700 is presented as a consolidated view for the selected accounts. In such cases, unconfirmed Cash In transactions 1772 and Confirmed Cash In transactions 1774 for more than one account are consolidated in the Cash In center 1700.

The Cash In center 1700 can also include an Add cash in button 1770 and a Customer List button 1780 that enables sub-navigation to the Customer List 1067 shown in FIGS. 13 and 26. An embodiment of the Cash In center 1700 includes a drag and drop functionality whereby a user can drag a unconfirmed Cash In transaction 1772 into the Confirmed Cash In transactions 1774 and vice versa. The drag and drop functionality can also be used to re-sequence transactions within the lists of unconfirmed Cash In transaction 1772 and Confirmed Cash In transactions 1774.

An editable Customer list 1067 is displayable by selecting the Customer List button 1780. Selecting the Customer List button 1780 will allow customers to view and edit customers in an interface or modal window, such as the Customer List window 1067 described above with reference to FIGS. 13 and 26. In one embodiment, the Customer List window 1067 is populated with customers for payments handled by Fiserv, Inc. or their CashEdge division (formerly CashEdge, Inc.).

As seen in FIG. 25, the Cash In center 1700 can display a total amount of Projected or Unconfirmed Cash In transactions 1771 and a total amount of In Runway or Confirmed Cash In transactions 1773. In an embodiment, the total amount of unconfirmed Cash In transactions 1771 is a unconfirmed sum of all Cash In the entity is unsure of, which are listed as unconfirmed Cash In transactions 1772 in a pane on the left side of the Cash In center 1700 in the exemplary embodiment of FIG. 25.

According to a preferred embodiment, the total amount of Confirmed Cash In transactions 1773 is a sum of all Cash In transactions 404 the entity is confident of receiving, which are listed as Confirmed Cash In transactions 1774 in a pane on the right side of the Cash In center 1700 in the non-limiting embodiment shown in FIG. 25. The Cash In center 1700 can optionally display incoming transfers and receivables (e.g., Cash In transactions 404 in the Transfer or Receivable categories 736) with the Confirmed Cash In transactions 1774. In one embodiment, past due receivables are collapsed by default, but can be listed by selecting the expand/collapse button 401. In another embodiment, uncashed checks are persistently displayed with the Confirmed Cash In transactions 1774 (e.g., at the top of the list), but are collapsed/closed by default. In an embodiment, expansion of uncashed checks by selecting the expand/collapse button 401 will show all uncashed checks.

In accordance with embodiments, the following categories 736 of Cash In transactions 404 can be added and edited using the Cash In center 1700 and the processes 1800 and 1900 described below with reference to FIGS. 26 and 27: sent invoices (one-time or recurring), incoming external transfers (i.e., from accounts not affiliated with the entity's host institution or host system 12), Cash In via other methods (user-entered), and received/unconfirmed to be received bill payments from the entity's customers. Some Cash In transactions 404 can be scheduled or committed, for example, incoming internal transfers (one-time or recurring) from an account affiliated with the entity's host institution or one of the entity's accounts. In addition, a search dialog 747 allows a user to search for a Cash In transactions 404 such as unconfirmed Cash In transactions 1772 and Confirmed Cash In transactions 1774.

In accordance with embodiments, the Cash In center 1700 can display categorizations or groupings of future/Confirmed Cash In transactions 1774 by one or more of customer, transaction type (e.g., past due receivables), category 736 (e.g., Transfer, Receivable, or Other), and/or status 740 (e.g., Unconfirmed, Processing, or Confirmed). In one embodiment, the Cash In center 1700 is integrated with merchant credit card accounts associated with the entity so that credit card payments to the entity from its customers via the merchant account(s) are displayed as unconfirmed Cash In transactions 1772 and/or Confirmed Cash In transactions 1774.

In certain embodiments, the expand/collapse buttons 401 in the column headings of the Cash In center 1700 can be selected within a displayed, expanded list of unconfirmed Cash In transactions 1772 or Confirmed Cash In transactions 1774 to sort the listed Cash In transactions 404. For example, by right clicking or hovering over the expand/collapse button 401 above the Cash In transaction dates 732, a user can sort a displayed list in ascending or descending order. Also, for example, numerical sorting can be performed for the transaction amounts 738. Further, for example, sorting using the expand/collapse button 401 can be alphabetical for Cash In transaction descriptions 734 and/or Cash In transaction statuses 740.

According to embodiments, the date columns for the lists of unconfirmed Cash In transactions 1772 and Confirmed Cash In transactions 1774 can display a date 732 a Cash Out transaction 406 is expected to be processed. For example, the date columns can display the date Cash In transactions 404 are expected to be processed as well as the date that a payment is due back, underneath the transaction date 732.

For online bill payments, this transaction date 732 can be an expected receipt date. For other Cash Out transaction 406, such as transfers, receivables, and those in the Other category 736, the transaction date 732 will be the entity's unconfirmed transaction date (e.g., the date an incoming check, transfer or payment is unconfirmed to arrive). The due date 733 for a Cash Out transaction 406 can be displayed as date that the payment is due and is not necessarily the same as the transaction date 732.

In embodiments, the due dates 733 indicate the dates that payments are due back or the date the Cash Out transaction 406 is expected to be processed, the descriptions 734 include the names of the entity's customers for the listed Cash In transactions 404, the amounts 738 display the amount of the respective Cash Out transactions 406, the statuses 740 indicate the status of the Cash Out transaction 406, such as, but not limited to, Cash In that is still unsure, which can be labeled as Unconfirmed, and Cash In that is expected, which is labeled as Confirmed.

With continued reference to FIG. 25, the various columns of the exemplary Cash In center 1700 can display the sortable, selectable data fields described below. The customer column can display the names of customers 735 in the descriptions 734 of unconfirmed Cash In transactions 1772 and Confirmed Cash In transactions 1774. The amount column can display the transaction amounts 738 for the unconfirmed Cash In transactions 1772 and Confirmed Cash In transactions 1774. According to embodiments, the status column can indicate a status 740 of a payment as follows: unconfirmed receivables and other Cash In transactions 404 can be labeled as Unconfirmed, scheduled or committed Cash In transactions 404 can be labeled as Confirmed if they are expected, and Cash In transactions 404 are labeled as Processing if they are incoming online bill payments that are already in-flight. In one embodiment, past due receivables appear in a collapsed state by default in the In Unconfirmed Cash In transactions 1772 list, but can be expanded to see all by selecting the expand/collapse button 401.

As shown in FIG. 25, Confirmed Cash In transactions 1774 can have different transaction categories 736. In the exemplary embodiment of FIG. 25, these transaction categories 736 can be listed in text underneath a name or identification 735 of a customer or payor in the descriptions 734. The categories may be, for example, shown as one of: "Online" for incoming online customer payments, "Check" for a check the entity has received or projects to receive, "Transfer" for any type of incoming transfer, and "Other" for any other Confirmed Cash In transaction 1774 that the host institution or host system 12 does not process and/or cannot track.

Adding a Cash in Transaction in the Cash in Center

The system will enable the user to select a historical, scheduled, or committed transaction, by hovering or clicking on a row in a list within the Cash Flow Timeline Utility or Account Activity, or other utility within the Online Banking experience. The selected transaction can then be specified to recur one or more times, via modal prompting for additional information such as future date, frequency, duration, amount, payee/biller or customer or other description (e.g., payroll net pay, payroll taxes, merchant services, owner bonus, SEP investment). It will also have the ability to search for additional past recurrences of the transaction, based on criteria chosen by the user such as transaction description, from within the accessible history and supply an average amount and average frequency to assist in the assignment of values for future dated transactions.

Additionally, if the historical, scheduled, or committed transaction is classified as a "Cash Out" transaction, the default selection for the future dated transactions modeled after the historical, scheduled, or committed transactions will be "Cash Out," although the user has the ability to override the default transaction type to "Cash In." If the historical, scheduled, or committed transaction is classified as a "Cash In" transaction, the default selection for the future dated transactions modeled after the historical, scheduled, or committed transactions will be "Cash In," although the user has the ability to override the default transaction type to "Cash Out." The originating transaction(s) (historical, scheduled, or committed) upon which the newly created transaction is modeled will be hyperlinked to the new transaction.

FIG. 26 illustrates an exemplary embodiment of the GUI shown in FIG. 25 when an Add Cash In button 1774 is selected. In particular, FIG. 26 depicts a logic and interface flow for a process 1800 for adding a receivable that can be initiated by selecting the Add cash In button 1770 in the Cash In center 1700. Although FIGS. 26 and 27 depict exemplary interfaces for adding and editing receivables, it is to be understood that similar interfaces and processes can be used to add and edit other categories 736 of Cash In transactions 404, such as, but not limited to, incoming transfers, customer credit card payments via an entity's merchant account(s), and other payments from the entity's customers.

The process 1800 begins in step 1802, when a selection of the Add Cash In button 1774 is detected in the Cash In center 1700. Alternatively, the step 1802 can also be initiated from the cash flow timeline 400 in response to a selection of the add transaction button 403 followed by a selection of the Add Cash In button 1774. At this point, control is passed to step 1804.

In step 1804, the Add Money In interface 1065 is displayed and, upon receiving a selection of a customer in the receivable pane 1066, a user can add a new customer or edit a previously saved customer by entering or selecting a customer from the customer list 1067, which can be expanded using the expand/collapse button 401. The customer editing process is similar to the edit payee flow 1286 described above with reference to FIG. 17 that is initiated when the payee list button 1281 is selected. When adding a new customer, step 1804 is similar to the add payee flow 1285 for adding a payee after the Add Payee button 1284 has been clicked as described above with reference to FIG. 17. After the customer has been added and/or edited, control is passed to step 1806. If a receivable was selected to be added in the receivable pane 1066 of the Add Money In interface 1065, control is passed to step 1806.

Step 1804 can alternatively comprise using the transfer pane 1068 of the Add Money In interface 1065 to create an incoming transfer from another account associated with or linked to the entity, which can be selected from the account list 1069. After an incoming transfer is created in the transfer pane 1068, the process 1800 ends and the added transfer is displayed as a Cash Out transaction 406 on left hand side of the spreadsheet view 700 or as a unconfirmed Cash In transaction 1172 on the left hand side of the Cash In center 1700.

In step 1806, data entry for the new receivable is received via an Add Receivable window 1865. In the embodiment shown in FIG. 18, the fields such as an amount 738 and due date 733 for the receivable are enterable or designed for user input. In embodiments, this are required, mandatory fields and has a maximum value, which can be adjusted by the host system 12. In one embodiment, the maximum value for the amount 738 is $999,999,999.99. A due date 733 can also be received via the Add Receivable window 1865. In embodiments, this is a mandatory field (i.e., that cannot be left blank, empty, or null) and can be a date from the past. The Add Receivable window 1865 includes an Edit customer details link 1866, which, if selected by a user, causes an Edit Customer window (not shown) similar to the Edit Expense window 1465 described above with reference to FIG. 19 to be displayed so that the user can edit data for the customer associated with the receivable being added.

A transaction date 732 can also be entered in a transaction date entry field (not shown), similar to 732 shown in FIGS. 19 and 20. In a preferred embodiment, the transaction date entry field is presented in the Add Receivable window 1865. According to embodiments, this is a required field that initially defaults to the due date 733, but can be changed by a user. In one embodiment, transaction dates 732 and due dates 733 can be the current day (e.g., today) or a date in the future. In accordance with other embodiments, a transaction date 732 and a due date 733 can also be a date and time later today or a date and time in the future. For these other embodiments, the time component of the transaction date 732 or due date 733 can be finely grained within a given date (i.e., a specific hour or a fraction thereof) or coarsely grained (i.e., a range of hours such as 9 A.M.-12 P.M., morning, midday, afternoon evening, after 4 P.M., etc.).

The recurring checkbox 748 can also be selected in the Add Receivable window 1865 to select a recurring option for the receivable or other Cash In transaction 404. If the recurring checkbox 748 is selected, it will be applied to both the transaction date 732 and the due date 733 for the receivable. For example, a recurring expense with a transaction date 732 of May 8 and due date 733 of May 10 with a monthly recurrence one month recurring would mean next the next receivable will have a transaction date 732 of June 8 and a due date 733 of June 10. Lastly, an optional note 1411 field can be entered as free text or from a drop-down of previously used notes to indicate any details the entity or user wishes to memorialize for the Cash In transaction 404 (in the example of FIG. 18, a receivable). After the data fields for the receivable have been entered and/or selected, control is passed to step 1808.

In step 1808, a user can select the Save as unconfirmed button 1814 or can cancel the receivable by clicking on the delete button 919. After the Project for later button 1814 is selected, the process 1800 ends and the added receivable is displayed as Cash In transaction 404 on left hand side of the spreadsheet view 700 or as a unconfirmed Cash In transaction 1772 on the left hand side of the Cash In center 1700. A user may also select the Confirm button 1810 after which the process 1800 ends and the added receivable is displayed as Cash In transaction 404 of the spreadsheet view 700 or as a confirmed Cash In transaction 1774 on the right hand side of the Cash In center 1700.

Editing a Cash in Transaction in the Cash in Center

Figure 27:
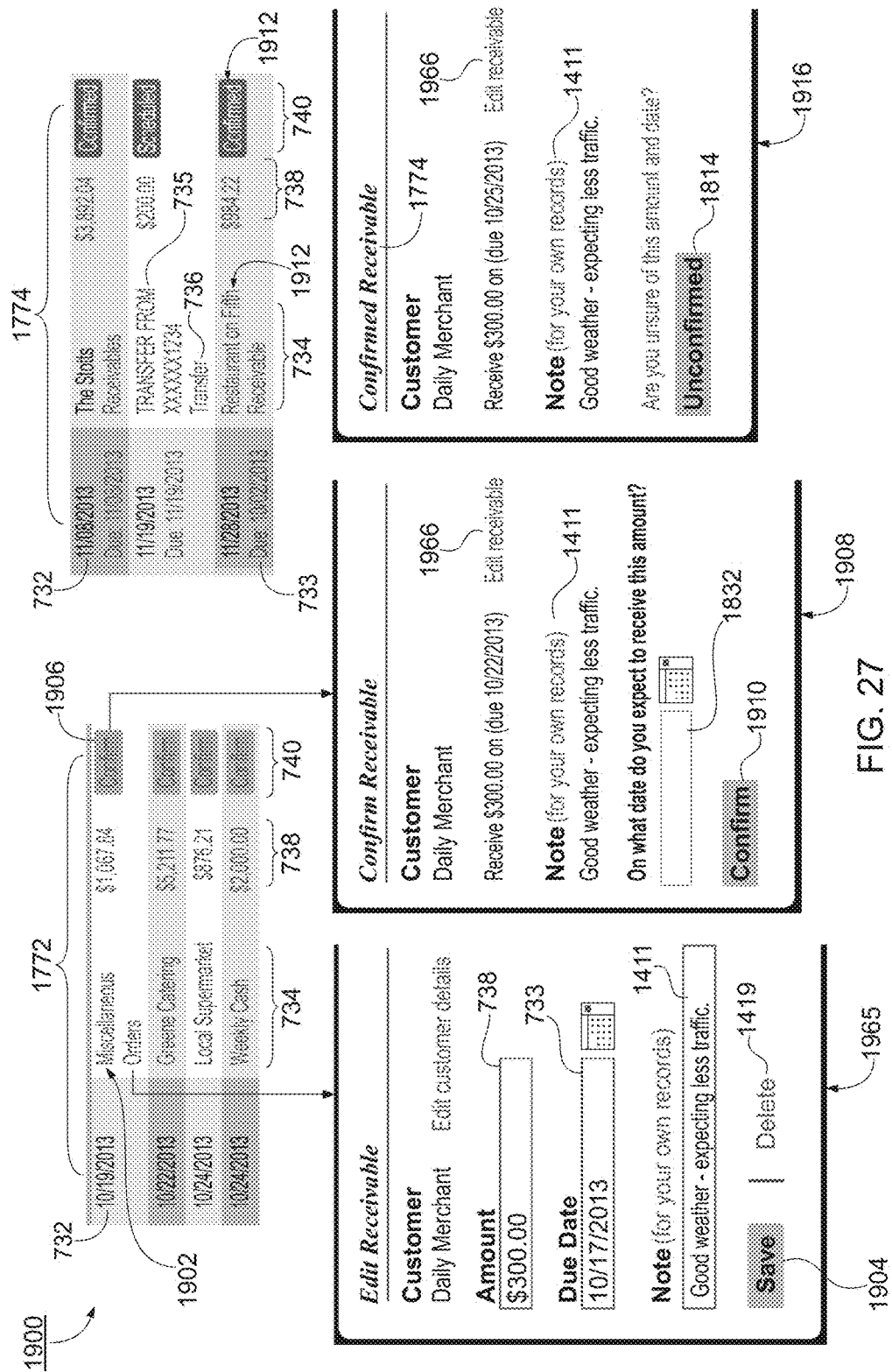
FIG. 27 illustrates exemplary embodiments of the GUI shown in FIG. 25 when a receivable is selected for editing, a Unconfirmed UI element is selected, or an Confirmed UI element is selected.

FIG. 27 illustrates exemplary embodiments of the GUI shown in FIG. 25 when a receivable is selected for editing, a button indicating a status 740 of Unconfirmed is selected, or a Confirmed button 1910 is selected. In embodiments, process 1900 can be initiated when a user navigates to, selects, or hovers or mouses over a selectable data field of an Unconfirmed Cash In transaction 1172 in either the Cash In center 1700 or the spreadsheet view 700.

Process 1900 begins in step 1902 when a selectable field, such as the customer name (e.g., "Miscellaneous Orders" in the example of FIG. 27) displayed in a description 734 of a unconfirmed receivable 1772 is clicked, causing the Edit Receivable window 1965 to be displayed with a Save transaction button 1904 and a Delete transaction button 1919. After the Edit Receivable window 1965 is displayed, control is passed to step 1906.

In step 1906, a button indicating a status 740 of Unconfirmed for a unconfirmed Cash In transaction 1772 is selected, causing a Unconfirmed Receivable window 1908 to be displayed with a Confirmed button 1910 and an Edit receivable UI element 1966, which, if selected by a user, causes the Edit Receivable window 1965 to be displayed so that the user can edit data for the Cash In transaction 404 that is being edited. In the exemplary embodiment of FIG. 27, the Edit receivable UI element 1966 is a hyperlink, but it is to be understood that it can be embodied as another actionable UI element, such as, but not limited to, a button (including a radio button), tab, icon, or checkbox. As shown in FIG. 27, the Unconfirmed Receivable window 1908 includes an enterable receivable date field 1832 based on when the entity is confident the Cash In transaction 404 (a receivable in the exemplary embodiment of FIG. 27) will arrive. As shown in FIG. 27, an optional note 1411 field can be entered as free text or from a drop-down of previously used notes to indicate any details the entity or user wishes to memorialize for the Cash In transaction 404. Once the Confirmed button 1910 is selected, control is passed to step 1912.

In step 1912, selection of a link displaying the customer name 735 in the transaction description 734 and clicking a button indicating a status 740 of Confirmed for an Confirmed Cash In transaction 1774 is selected, control is passed to step 1914.

In step 1914, a Receivable Confirmed window 1916 is rendered which displays the Unconfirm button 1814 and the Edit receivable UI element 1966. As shown in FIG. 27, an optional note 1411 field can be entered in the Receivable Confirmed window 1916 as free text or from a drop-down of previously used notes to indicate any details the entity or user wishes to memorialize for the Confirmed Cash In transaction 1774. If the Unconfirm button 1814 is selected, the process 1900 ends and the receivable is displayed as Cash In transaction 404 of the spreadsheet view 700 with a "Confirm" status 740 or it is moved from the confirmed Cash In transactions 1774 on the right hand side of the Cash In center 1700 to the unconfirmed Cash In transactions 1772 on the left hand side of the Cash In center 1700.

Figure 29A:
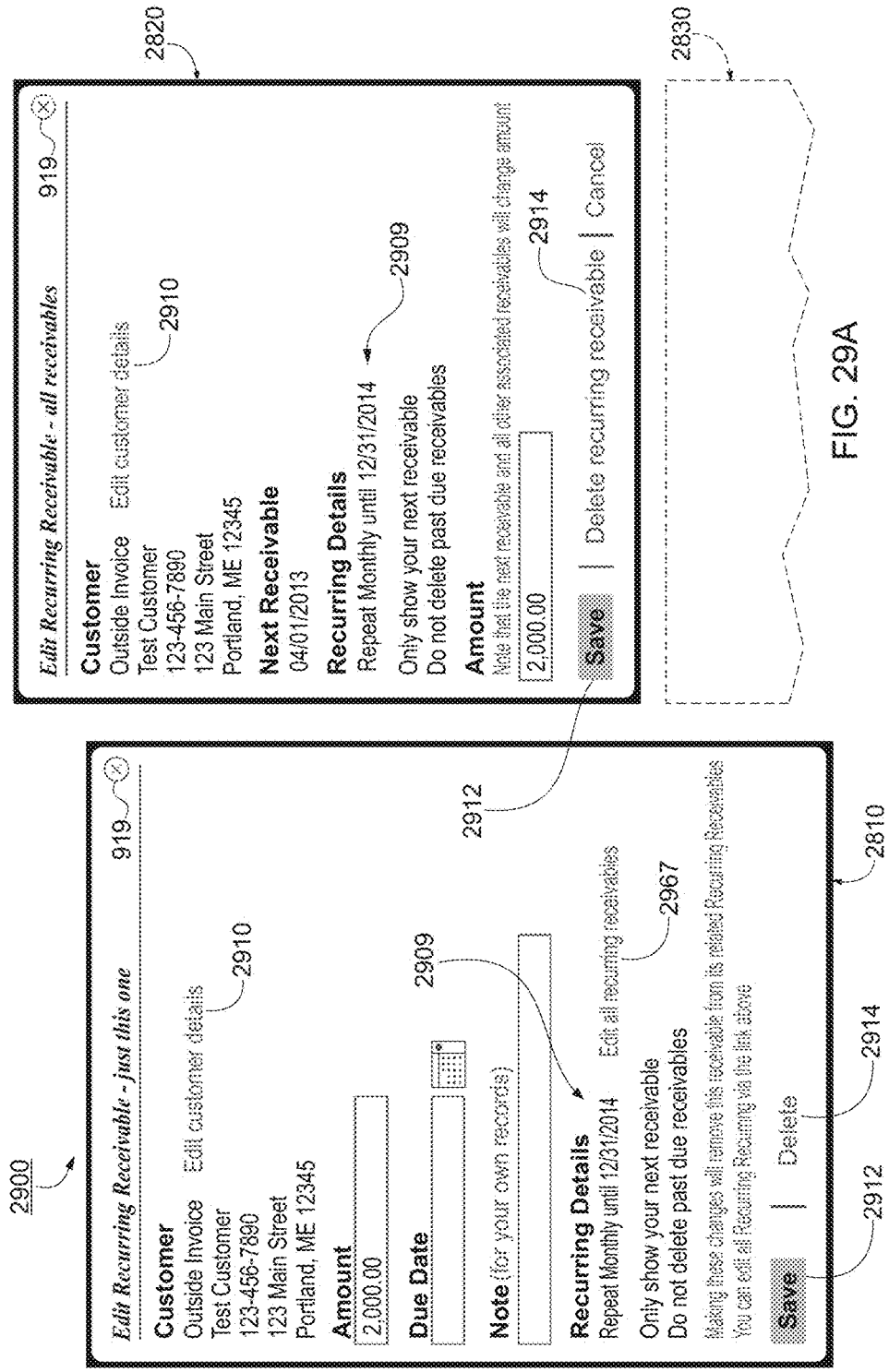
FIG. 29 illustrates exemplary embodiments of the GUI when an Edit Recurring Receivable UI element is selected.
Figure 29B:
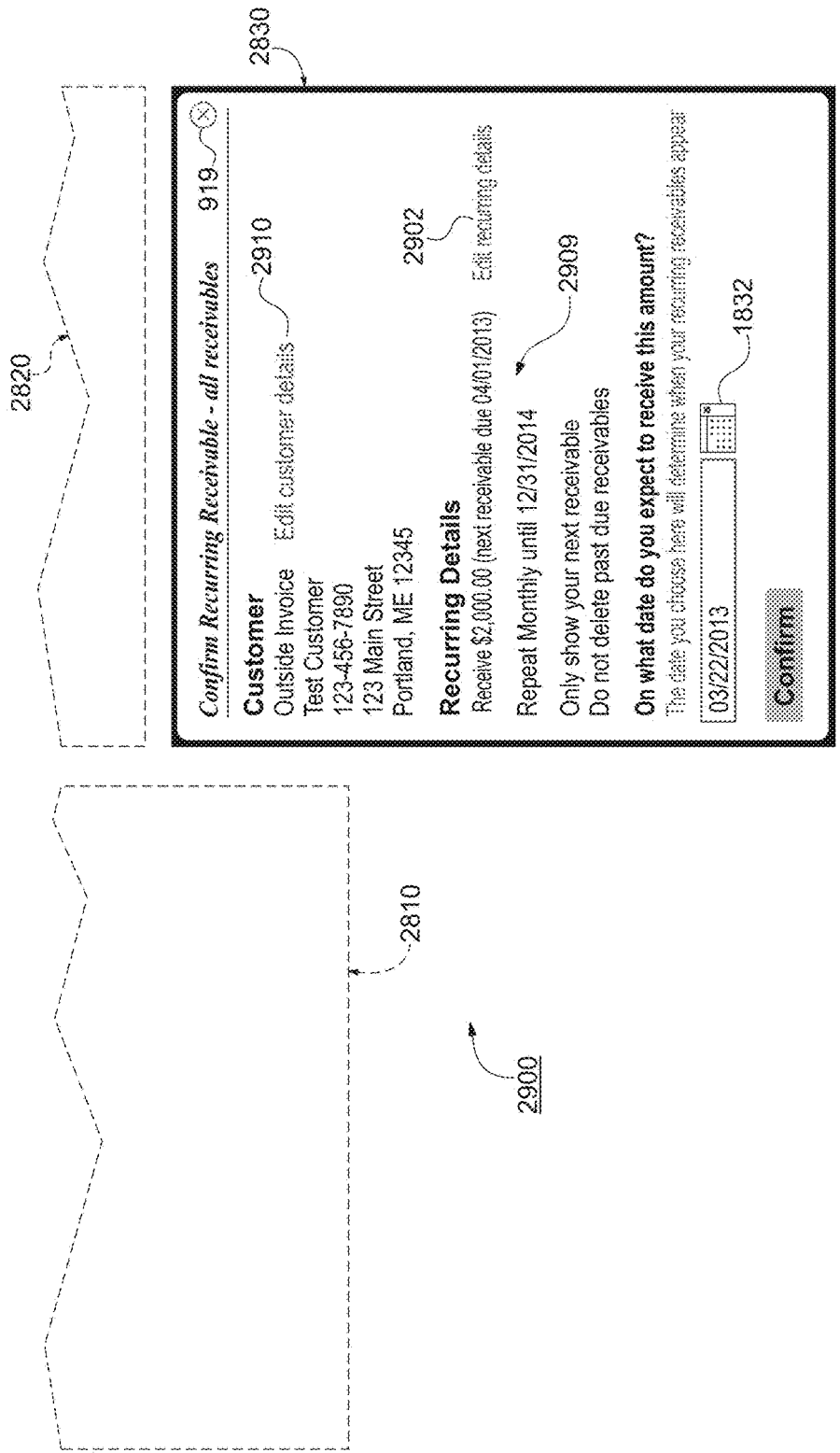

FIGS. 28 and 29 illustrate embodiments of the processes and interfaces dealing with scheduling and editing a recurring cash in transaction. FIG. 28 demonstrates process 2800 for scheduling a recurring cash in transaction, which begins with step 2801 in which a user enters information in the Add Receivable window 1865 as described above with regard to FIG. 26. Upon checking the recurring payment checkbox 748, the user is then able to input information about the Recurring receivable parameters 2802. In the embodiment shown in FIG. 28, this includes a receivable frequency 2804 field and a time limits 2806 fields for repetition of the receivable. The receivable frequency 2804 field includes a drop down selection menu as shown in FIG. 28, however, in other embodiments the receivable frequency may input in any acceptable way known to one of ordinary skill. Similar inputs may be provided for the time limits for repetition of a receivable.

After the Recurring receivable parameters 2802 are input, a user can then select the Save as unconfirmed button 1814 or the Confirm button 1810. By selecting the Save as unconfirmed button 1814 the recurring receivable is saved and the added recurring receivable is displayed as a Cash In transaction 404 in the spreadsheet view 700 or as an unconfirmed Cash In transaction 1772 on the left hand side of the Cash In center 1700. By selecting the Confirm button 1810, control passes in step 2803 to the Confirmed Recurring Receivable window 2840. As shown in FIG. 28, the Confirmed Recurring Receivable window 2840 contains an Edit receivable element 1966, which may link to the process for editing a receivable discussed with regard to FIG. 27. The Confirmed Recurring Receivable window 2840 also contains an enterable receivable date field 1832 and view recurring payment fields 2872 for viewing recurring payments past the initial payment. According to the example of FIG. 28, the fields 2872 consist of a option of two selections, one for up to four months out and one for only showing the next payment. However, the view recurring payment fields 2872 may be much more broadly defined and supplied as would be understood by one of ordinary skill. For example, in a preferred embodiment the time period for how far out a recurring payment may be viewed may be daily, weekly, monthly, quarterly, semi-annually, annually, etc. The fields 2872 may be user defined or provided by the host institution.

As shown in FIG. 28, a user may cancel scheduling a recurring cash in transaction by selecting the circled "X" 919 in the corner of the Add Receivable window 1865 or the Confirmed Recurring Receivable window 2840. Additionally, the same effect may be accomplished by selecting the cancel element at the bottom of the Confirmed Recurring Payment window 2840. Cancellation may be affected in various other ways as would be understood by one of ordinary skill as well. Alternatively, if a user decides to the select the Add element 2874 in the Confirmed Recurring Payment window 2840, in step 2805, the recurring cash in transaction appears in the Cash In center 1700. Depending on whether the recurring cash in transaction is unconfirmed or confirmed it will appear in the unconfirmed Cash In transactions 1772 or confirmed Cash In transactions 1744, accordingly. In the preferred embodiment shown in FIG. 28, a recurring transaction will be indicated with a recurring transaction icon 2360 that appears in the vicinity of the description 734 of the transaction. While not shown in FIG. 28, upon selection of the Add element 2874, the recurring cash in transaction may appear in the appropriate location of the spreadsheet section 700, as described.

As shown in FIG. 29 interfaces 2810 and 2820 allow for editing a recurring cash in transaction, either in a single instance or over all of the payments of the recurring cash in transaction, respectively. Interface 2830 allows for confirmation of a recurring cash in transaction. Similar to the Edit Receivable window 1965 discussed with regard to FIG. 27, the Edit Recurring receivable single instance window 2810 contains fields for the Payor (shown as "Customer"), Amount, Due Date, and Note. Window 2810 also includes an Edit customer details element 2910, Recurring Receivable Details 2909, and Edit recurring receivables element 2967.

In addition, by selecting the Save element 2912, the details provided for in the fields of window 2810 will modify the single instance of the recurring cash out transaction that was selected to activate window 2810. By selecting the Delete element 2914, the single instance of the recurring cash out transaction that was selected to activate window 2810 may be removed. Additionally, selecting the delete button 919 will close window 2810.

Similar to the Edit Recurring receivable single instance window 2810, the Edit Recurring Receivables all receivables window 2820 contains information regarding the Payee and an Edit customer details element 2910, and a field for including an Amount. In another preferred embodiment, fields such as Due Date and Note may also be included. Window 2820 also includes Recurring Receivables Details 2909, which includes details about the next receivable and the time period and limit for which a receivable recurs. By selecting the Save element 2912 in window 2820, the details provided for in the fields of window 2820 will modify all instances of the recurring cash in transaction that was selected to activate window 2820. By selecting the Delete element 2914 in window 2820, all instances of the recurring cash out transaction that was selected to activate window 2820 may be removed. Additionally, selecting the cancel element or delete button 919 will close window 2820.

Further, FIG. 29 shows the Confirm Recurring Receivables all receivables window 2830. Similar to windows 2810 and 2820, window 2830 contains information regarding the Payee and an Edit customer details element 2910, which includes details about the amount of the receivable, the next receivable, and the time period and limit for which a receivable recurs. In addition, an Edit recurring details element 2902 is provided that may link to an Add Receivable window 1865 for adjusting the details of a recurring receivable transaction. Further, an enterable receivable date field 1832 is also provided. If a user selects the Confirm element, the recurring cash in transaction will appear in the Cash In center 1700 in the confirmed Cash In transactions 1744.

In a preferred embodiment, a selection option for window 2810 or window 2820 may be activated by selecting an icon 2360 that indicates a recurring transaction. In another preferred embodiment windows 2810 and 2820 may activated sequentially by selecting an icon 2360 that indicates a recurring transaction.

Example Computer System Implementation

As would be appreciated by someone skilled in the relevant art(s) and described below with reference to FIG. 30, part or all of one or more aspects of the methods and apparatus discussed herein may be distributed as an article of manufacture that itself comprises a computer readable medium having computer readable code means embodied thereon.

The computer readable program code means is operable, in conjunction with a computer system, to carry out all or some of the steps to perform the methods or create the apparatuses discussed herein. The computer readable medium may be a recordable medium (e.g., hard drives, compact disks, EEPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on mobile device, POS terminal, payment processor, acquirer, issuer, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor.

Aspects of the present disclosure shown in FIGS. 1-29, or any part(s) or function(s) thereof, may be implemented using hardware, software modules, firmware, tangible computer readable media having instructions stored thereon, or a combination thereof and may be implemented in one or more computer systems or other processing systems.

Figure 30:
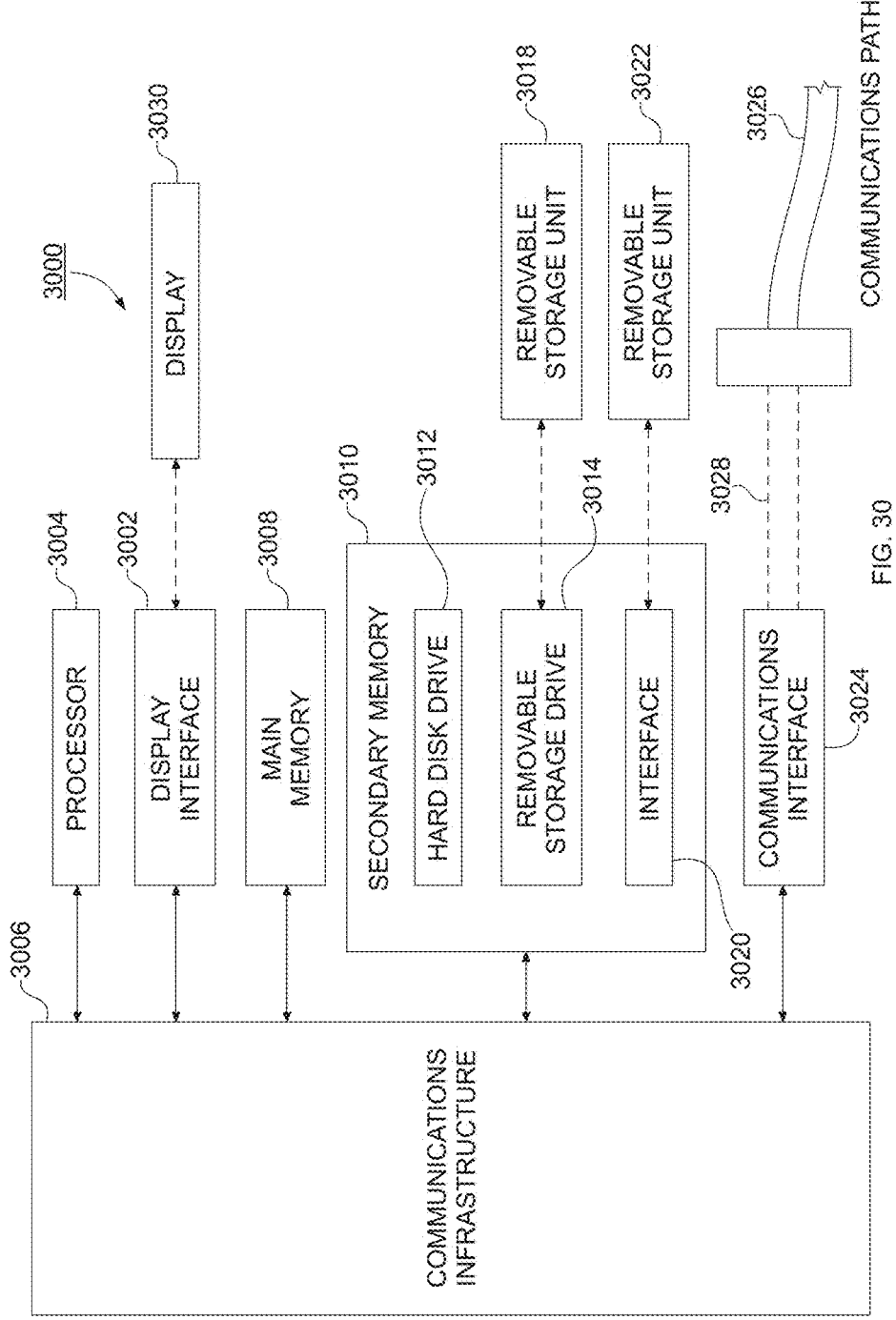
FIG. 30 depicts an example computer system in which embodiments of the present invention may be implemented.

FIG. 30 illustrates an example computer system 3000 in which embodiments of the present disclosure, or portions thereof, may be implemented as computer-readable code. For example, the various aspects of the User Interfaces depicted in FIGS. 4-29 can be implemented in computer system 3000 using hardware, software, firmware, non-transitory computer readable media having instructions stored thereon, or a combination thereof and may be implemented in one or more computer systems or other processing systems. Hardware, software, or any combination of such may embody any of the modules and components used to implement the network, systems, methods and GUIs described above with reference to FIGS. 1-29. For example, the client 14, email server 34, transaction server 42, web server 18, application server 20, and/or database server 22 described above with reference to FIGS. 1 and 2 can be implemented using computer system 3000. Also, for example, the respective display devices 228 of clients 14 and the above-listed servers can be implemented as display 3030, which, together with display interface 3002, can be configured to render the UI 28 of FIGS. 1 and 2 and the GUIs depicted in FIGS. 4-29.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 3000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

The processor device 3004 may be a special purpose or a general purpose processor device. As will be appreciated by persons skilled in the relevant art, processor device 3004 may also be a single processor in a multi-core/multiprocessor system, such system operating alone, or in a cluster of computing devices operating in a cluster or server farm. Processor device 3004 is connected to a communication infrastructure 3006, for example, a bus, message queue, network, or multi-core message-passing scheme.

The computer system 3000 also includes a main memory 3008, for example, random access memory (RAM), and may also include a secondary memory 3010. Secondary memory 3010 may include, for example, a hard disk drive 3012, removable storage drive 3014. Removable storage drive 3014 may comprise a floppy disk drive, a magnetic tape drive, an optical disk drive, a flash memory, or the like.

The removable storage drive 3014 may read from and/or writes to a removable storage unit 3018 in a well-known manner. The removable storage unit 3018 may comprise a floppy disk, magnetic tape, optical disk, Universal Serial Bus ("USB") drive, flash drive, memory stick, etc. which is read by and written to by removable storage drive 3014. As will be appreciated by persons skilled in the relevant art, the removable storage unit 3018 includes a non-transitory computer usable storage medium having stored therein computer software and/or data.

In alternative implementations, the secondary memory 3010 may include other similar means for allowing computer programs or other instructions to be loaded into computer system 3000. Such means may include, for example, a removable storage unit 3022 and an interface 3020. Examples of such means may include a program cartridge and cartridge interface (such as that found in video game devices), a removable memory chip (such as an EPROM, or PROM) and associated socket, and other removable storage units 3022 and interfaces 3020 which allow software and data to be transferred from the removable storage unit 3022 to computer system 3000.

The computer system 3000 may also include a communications interface 3024. In embodiments, the communications interface devices 200 and 201 describe above with reference to FIG. 2 can be implemented with the communications interface 2024. The communications interface 3024 allows software and data to be transferred between the computer system 3000 and external devices. The communications interface 3024 may include a modem, a network interface (such as an Ethernet card), a communications port, a PCMCIA slot and card, or the like. Software and data transferred via the communications interface 3024 may be in the form of signals, which may be electronic, electromagnetic, optical, or other signals capable of being received by communications interface 3024. These signals may be provided to the communications interface 3024 via a communications path 3026. The communications path 3026 carries signals and may be implemented using wire or cable, fiber optics, a phone line, a cellular/wireless phone link, an RF link or other communications channels.

In this document, the terms 'computer readable storage medium,' 'computer program medium,' 'non-transitory computer readable medium,' and 'computer usable medium' are used to generally refer to tangible and non-transitory media such as removable storage unit 3018, removable storage unit 3022, and a hard disk installed in hard disk drive 3012. Signals carried over the communications path 3026 can also embody the logic described herein. The computer readable storage medium, computer program medium, non-transitory computer readable medium, and computer usable medium can also refer to memories, such as main memory 3008 and secondary memory 3010, which can be memory semiconductors (e.g. DRAMs, etc.). These computer program products are means for providing software to computer system 3000.

Computer programs (also called computer control logic and software) are generally stored in a main memory 3008 and/or secondary memory 3010. The computer programs may also be received via a communications interface 3024. Such computer programs, when executed, enable computer system 3000 to become a specific purpose computer able to implement the present disclosure as discussed herein. In particular, the computer programs, when executed, enable the processor device 3004 to implement the processes of the present disclosure discussed below. Accordingly, such computer programs represent controllers of the computer system 3000. Where the present disclosure is implemented using software, the software may be stored in a computer program product and loaded into the computer system 3000 using the removable storage drive 3014, interface 3020, and hard disk drive 3012, or communications interface 3024.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

We claim:

1. A system for cash flow management for one or more financial accounts based on cash in and cash out transactions, the system comprising:
   a display;
   a processor; and
   a non-transitory computer-readable medium having instructions stored thereon, that, when executed by the processor, cause the processor to render a graphical user interface ("GUI") on the display, the GUI comprising a plurality of selectable user interface ("UI") elements, the instructions comprising:
      instructions for displaying a cash flow timeline comprising a header portion, a graph portion, a list portion, an uncommitted portion, and a committed portion;
      instructions for displaying a current available balance for the one or more financial accounts and account selector UI element in the header portion;
      instructions for displaying, in the list portion, data fields for a plurality of cash in transactions and cash out transactions for a plurality of selectable time periods comprising time increments;
      instructions for displaying, in the graph portion, an adjustable cash reserve and available balances for the time increments of the plurality of time periods, the adjustable cash reserve being part unconfirmed cash flow;
      instructions for displaying a spreadsheet portion comprising a list of all cash in transactions and cash out transactions within the list portion, the spreadsheet portion configured to facilitate drag and drop operations for at least one cash in transaction and/or at least one cash out transaction, wherein a drag and drop operation re-sequences or reschedules the cash in transactions and the cash out transactions within the list;
      instructions to perform financial transactions for the one or more financial accounts, the performing financial transactions comprising adding and editing fund transfers into and out of the one or more financial accounts via a selectable Transfer Funds remediation option UI element,
   wherein:
      the available balances represent a total value of cash out transactions subtracted from a sum of a total value of cash in transactions and a starting available balance for the time increments; and
      the plurality of UI elements includes navigation UI elements operable to receive selections of one or more past, present, and future time periods to be displayed in the graph and list portions; and instructions for displaying, in the graph portion, one or more selectable cash shortfall indicators of unconfirmed shortfalls in response to determining that an available balance for a time increment in a current or future time period will be less than the entity's current cash reserve.

2. The system of claim 1, the instructions further comprising:

in response to receiving, via the navigation UI elements, a selection of one or more time periods, instructions for displaying, in the list portion, data fields for cash in transactions and cash out transactions for the selected time periods.

3. The system of claim 2, the instructions further comprising:

instructions for displaying, in the graph portion, a current cash reserve and available balances for the time increments of the selected time periods; and in response to receiving a selection to increase or decrease the cash reserve to an adjusted cash reserve, instructions for updating the graph portion to reflect the adjusted cash reserve in the selected time periods.

4. The system of claim 3, wherein the one or more financial accounts are associated with an entity and the cash flow timeline is a cash flow timeline of the entity, the system further comprising:

at least one input device, wherein the display is configured to receive selections of the plurality of UI elements made by a user affiliated with the entity using the at least one input device, the instructions further comprising:

instructions for displaying, in the graph portion past, current, and/or unconfirmed future available balances as bar graphs in response to receiving a selection of a bar graph UI element.

5. The system of claim 4, wherein the time increments are tunable and can be one or more of hours, days, weeks, months, or selectable portions thereof, the instructions further comprising:

in response to receiving an adjusted cash reserve, instructions for updating the graph portion to reflect one or more selectable cash shortfall indicators of unconfirmed shortfalls in response to determining that an available balance for a time increment in a current or future time period will be less than the entity's adjusted cash reserve.

6. The system of claim 5, the instructions further comprising:

in response to receiving a selection of a cash shortfall indicator, instructions for displaying, in the graph portion, links to remediation actions to address the unconfirmed shortfall.

7. The system of claim 6, wherein remediation actions comprise editing and/or rescheduling cash out transactions.

8. The system of claim 4, wherein GUI further comprises:

a cash out center comprising a plurality of UI elements operable to display, add, edit, schedule, and delete future and recurring cash out transactions; and a cash in center comprising a plurality of UT elements operable to display, add, edit, schedule, and delete future and recurring cash in transactions.

9. The system of claim 8, wherein the cash in transactions comprise incoming transfers, incoming checks, and payments from customers of the entity.

10. The system of claim 8, wherein the cash out transactions comprise outgoing transfers, payments, and expenses.

11. The system of claim 2, the instructions further comprising instructions for displaying, in the graph portion, available balances for the selected time periods, wherein:

for selected time periods in the past, available balances reflect historical, previously-posted cash in and cash out transactions;

for a selected current time period, the available balance reflects the actual, currently available balance displayed in the header portion; and for selected time periods in the future, the available balances are based on unconfirmed cash in and cash out transactions of the unconfirmed cash flow.

12. A non-transitory computer readable storage medium having instructions stored thereon that, when executed by a computing device, cause the computing device to perform operations for cash flow management for one or more financial accounts based on cash in and cash out transactions, the operations comprising:

rendering a graphical user interface ("GUI") on the display, the GUI comprising a plurality of user interface ("UI") elements selectable via an input device;

displaying a cash flow timeline comprising a header portion, a graph portion, a list portion, an uncommitted portion, and a committed portion;

displaying a current available balance and account selector UI element in the header portion;

displaying, in the list portion, data fields for a plurality of cash in transactions and cash out transactions for a plurality of selectable time periods comprising time increments;

displaying, in the graph portion, a cash reserve display, an adjustable cash reserve and available balances for the time increments of the plurality of time periods, the adjustable cash reserve being part unconfirmed cash flow;

displaying a spreadsheet portion comprising a list of all cash in transactions and cash out transactions within the list portion, the spreadsheet portion configured to facilitate drag and drop operations for at least one cash in transaction and/or at least one cash out transaction, wherein a drag and drop operation re-sequences or reschedules the cash in transactions and the cash out transactions within the list;

performing financial transactions for the one or more financial accounts, the performing financial transactions comprising adjusting the cash reserve display and an actual cash reserve of the one or more financial accounts by adding and editing fund transfers into and out of the one or more financial accounts, wherein:

the available balances represent a total value of cash out transactions subtracted from a sum of a total value of cash in transactions and a starting available balance for the time increments; and the plurality of UI elements includes navigation UI elements operable receive selections of one or more past, present, and future time periods to be displayed in the graph portion; and displaying, in the graph portion, one or more selectable cash shortfall indicators of current and/or unconfirmed shortfalls in response to determining that a current or future available balance for a time increment in the selected time periods will be less than the adjusted cash reserve.

13. The non-transitory computer readable storage medium of claim 12, wherein the one or more financial accounts are associated with an organization, the operations further comprising:
in response to receiving, via the navigation UI elements, a selection of one or more time periods, displaying, in the list portion, data fields for cash in transactions and cash out transactions for the selected time periods.

14. The non-transitory computer readable storage medium of claim 13, the operations further comprising:
displaying, in the graph portion, past, current, and/or unconfirmed future available balances for the selected time periods, wherein:
the past available balances reflect historical, previously-posted cash in and cash out transactions;
the current available balance reflects an actual available balance displayed in the header portion; and
the future available balances are based on unconfirmed cash in and cash out transactions of the unconfirmed cash flow.

15. The non-transitory computer readable storage medium of claim 13, the operations further comprising:
displaying, in the graph portion past, current, and/or unconfirmed future available balances as bar graphs in response to receiving a selection of a bar graph UI element.

16. The non-transitory computer readable storage medium of claim 13, wherein:
the time increments are one or more of hours, days, weeks, months, or selectable portions or aggregations thereof; and
one of the plurality of UI elements is a slidable UI element operable to increase or decrease the organization's cash reserve to an adjusted cash reserve for selected ones of the plurality of time periods, the operations further comprising:
receiving an adjusted cash reserve for one or more selected current or future time periods.

17. A method for cash flow management for one or more financial accounts based on cash in and cash out transactions, the method comprising:
rendering a graphical user interface ("GUI") on a display, the GUI comprising a plural of user interface ("UI") elements selectable via an input device;
displaying a cash flow timeline comprising a header portion, a graph portion, a list portion, an uncommitted portion, and a committed portion;
displaying a current available balance and account selector UI element in the header portion;
displaying, in the list portion, data fields for a plurality of cash in transactions and cash out transactions for a plurality of selectable time periods comprising time increments;
displaying, in the graph portion, a current, adjustable cash reserve and available balances for the time increments of the plurality of time periods, the adjustable cash reserve being part unconfirmed cash flow;
displaying a spreadsheet portion comprising a list of all cash in transactions and cash out transactions within the list portion, the spreadsheet portion configured to facilitate drag, and drop operations for at least one cash in transaction and/or at least one cash out transaction, wherein a drag and drop operation re-sequences or reschedules the cash in transactions and the cash out transactions within the list;
performing financial transactions for the one or more financial accounts, the performing financial transactions comprising adding and editing fund transfers into and out of the one or more financial accounts via a selectable Transfer Funds remediation option UI element,
wherein:
the available balances represent a total value of cash out transactions subtracted from a sum of a total value of cash in transactions and a starting available balance for the time increments; and
the plurality of UI elements includes navigation UI elements operable receive selections of one or more past, present, and future time periods to be displayed in the graph portion; and
displaying, in the graph portion, one or more selectable cash shortfall indicators of unconfirmed shortfalls in response to determining that an available balance for a time increment in a current or future time period will be less than the business' current cash reserve.

18. The method of claim 17, wherein the one or more financial accounts are linked to a business, the method further comprising:
determining that a selection of one or more of the selectable time periods has been made via the navigation UI elements;
displaying, in the list portion, data fields for the business' cash in transactions and cash out transactions for the selected time periods; and
displaying, in the graph portion, the business' current cash reserve and available balances for the time increments of the selected time periods, wherein:
for selected time periods in the past, the cash reserve is displayed as either the current cash reserve or the cash reserve at the time of the past time periods, and the data fields for cash in transactions and cash out transactions and the available balances are actual values based upon posted, completed transactions that occurred in the past time periods; and
for selected time periods in the future, the cash reserve is initially displayed as the current cash reserve and displayed as an adjusted cash reserve based on adjustments for the future time periods, and the data fields for cash in transactions and cash out transactions and the available balances are actual values based upon posted, completed transactions that occurred in the past time periods.

19. The method of claim 18, wherein the determining comprises one or more of:
identifying default time periods previously selected by a user affiliated with the business;
detecting a selection, by the user or another user affiliated with the business, of one or more of the plurality of selectable UI elements corresponding to the one or more time periods;
receiving input, from the user, via the input device, identifying the one or more time periods as a range of time relative to a current date; and
identifying the one or more time periods based upon selections made by the user or another user affiliated with the business during a prior use of the GUI.

20. The method of claim 18, the operations further comprising:
in response to receiving an adjusted cash reserve, updating the graph portion to reflect one or more selectable cash shortfall indicators of unconfirmed shortfalls in response to determining that an available balance for a time increment in a current or future time period will be less than the entity's adjusted cash reserve; and in response to receiving a selection of a cash shortfall indicator, displaying, in the graph portion, links to remediation actions to address the unconfirmed shortfall.

\* \* \* \* \*